US012719670B2

(12) United States Patent
Lucas et al.

(10) Patent No.: US 12,719,670 B2
(45) Date of Patent: Aug. 25, 2026

(54) DATA FRAGMENTATION AND MULTI-CLOUD DISTRIBUTION SYSTEM

(71) Applicant: Bank of America Corporation, Charlotte, NC (US)

(72) Inventors: Jemlin Lucas, Coppell, TX (US); Suryanarayana Adivi, Hyderabad (IN); Pushkar Taneja, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 58 days.

(21) Appl. No.: 19/009,085

(22) Filed: Jan. 3, 2025

(65) Prior Publication Data

US 2026/0197163 A1 Jul. 9, 2026

(51) Int. Cl.
*H04L 9/08* (2006.01)
*H04L 9/32* (2006.01)

(52) U.S. Cl.
CPC .......... *H04L 9/0861* (2013.01); *H04L 9/3236* (2013.01)

(58) Field of Classification Search
CPC .................................................... H04L 9/0866
USPC .......................................................... 713/171
See application file for complete search history.

(56) References Cited

U.S. PATENT DOCUMENTS 5,315,658 A 5/1994 Micali
6,026,163 A * 2/2000 Micali .................. G06Q 50/188 705/75
8,316,237 B1 * 11/2012 Felsher ................. H04L 63/061 380/282
8,650,434 B2 2/2014 Orsini et al.
8,769,270 B2 7/2014 Orsini et al.
9,213,857 B2 12/2015 O'Hare et al.
9,264,224 B2 2/2016 O'Hare et al.
9,275,071 B2 3/2016 O'Hare et al.
9,443,097 B2 9/2016 O'Hare et al.
9,589,148 B2 3/2017 O'Hare et al.
9,749,331 B1 8/2017 Koeten et al.
9,785,785 B2 10/2017 O'Hare et al.
(Continued)

FOREIGN PATENT DOCUMENTS

CN 110177134 A 8/2019
CN 118413359 A 7/2024

*Primary Examiner* — Badri Narayanan Champakesan
(74) *Attorney, Agent, or Firm* — Banner & Witcoff, Ltd.

(57) ABSTRACT

A secure data storage solution fragments encrypted data and distributes it across multiple cloud providers, increasing data protection by preventing any single cloud provider from accessing the complete data. Using cryptographic techniques such as Shamir's Secret Sharing or Reed-Solomon coding, the system divides the encrypted data into multiple independent fragments, each of which is stored separately. Each fragment alone is insufficient to reconstruct the original data, and only a minimum threshold of fragments is required for reassembly. By distributing fragments across diverse cloud providers, the invention mitigates risks associated with single-provider failures or breaches. The system employs secure communication protocols to protect fragments during transmission and monitors the integrity of each fragment in its respective storage location, ensuring both data confidentiality and availability. This fragmentation and multi-cloud distribution method offers enhanced security and reliability for sensitive data stored in distributed cloud environments.

15 Claims, 15 Drawing Sheets

(56) References Cited

U.S. PATENT DOCUMENTS

| | | | | |
|---|---|---|---|---|
| 10,033,702 | B2 | 7/2018 | Ford et al. | |
| 10,068,103 | B2 | 9/2018 | O'Hare et al. | |
| 10,764,254 | B2 | 9/2020 | Ford et al. | |
| 11,633,539 | B1 | 4/2023 | Badik et al. | |
| 11,743,039 | B2 | 8/2023 | Pe'Er et al. | |
| 12,034,835 | B2 | 7/2024 | Park et al. | |
| 2003/0088782 | A1* | 5/2003 | Forrest | H04L 9/3231 713/186 |
| 2012/0072723 | A1* | 3/2012 | Orsini | G06F 21/6218 713/165 |
| 2013/0246807 | A1* | 9/2013 | Orsini | G06F 21/72 713/189 |
| 2014/0298012 | A1 | 10/2014 | Orsini et al. | |
| 2015/0127546 | A1 | 5/2015 | Saxena et al. | |
| 2015/0180869 | A1 | 6/2015 | Verma | |
| 2016/0196440 | A1 | 7/2016 | O'Hare et al. | |
| 2017/0041296 | A1 | 2/2017 | Ford et al. | |
| 2017/0185761 | A1* | 6/2017 | Stanwood | G06V 40/1365 |
| 2018/0285546 | A1* | 10/2018 | Greenberg | H04L 9/0891 |
| 2018/0367506 | A1 | 12/2018 | Ford et al. | |
| 2019/0132303 | A1 | 5/2019 | Kurian | |
| 2019/0222560 | A1 | 7/2019 | Ford et al. | |
| 2021/0144517 | A1 | 5/2021 | Guim Bernat et al. | |
| 2021/0234682 | A1* | 7/2021 | Lanc | H04L 9/085 |
| 2021/0297393 | A1 | 9/2021 | Mitsov et al. | |
| 2021/0328801 | A1 | 10/2021 | Sly et al. | |
| 2021/0399884 | A1* | 12/2021 | Bazin | H04L 9/3239 |
| 2022/0158977 | A1 | 5/2022 | Huang et al. | |
| 2023/0403144 | A1* | 12/2023 | Rhodin | G06Q 50/265 |

* cited by examiner

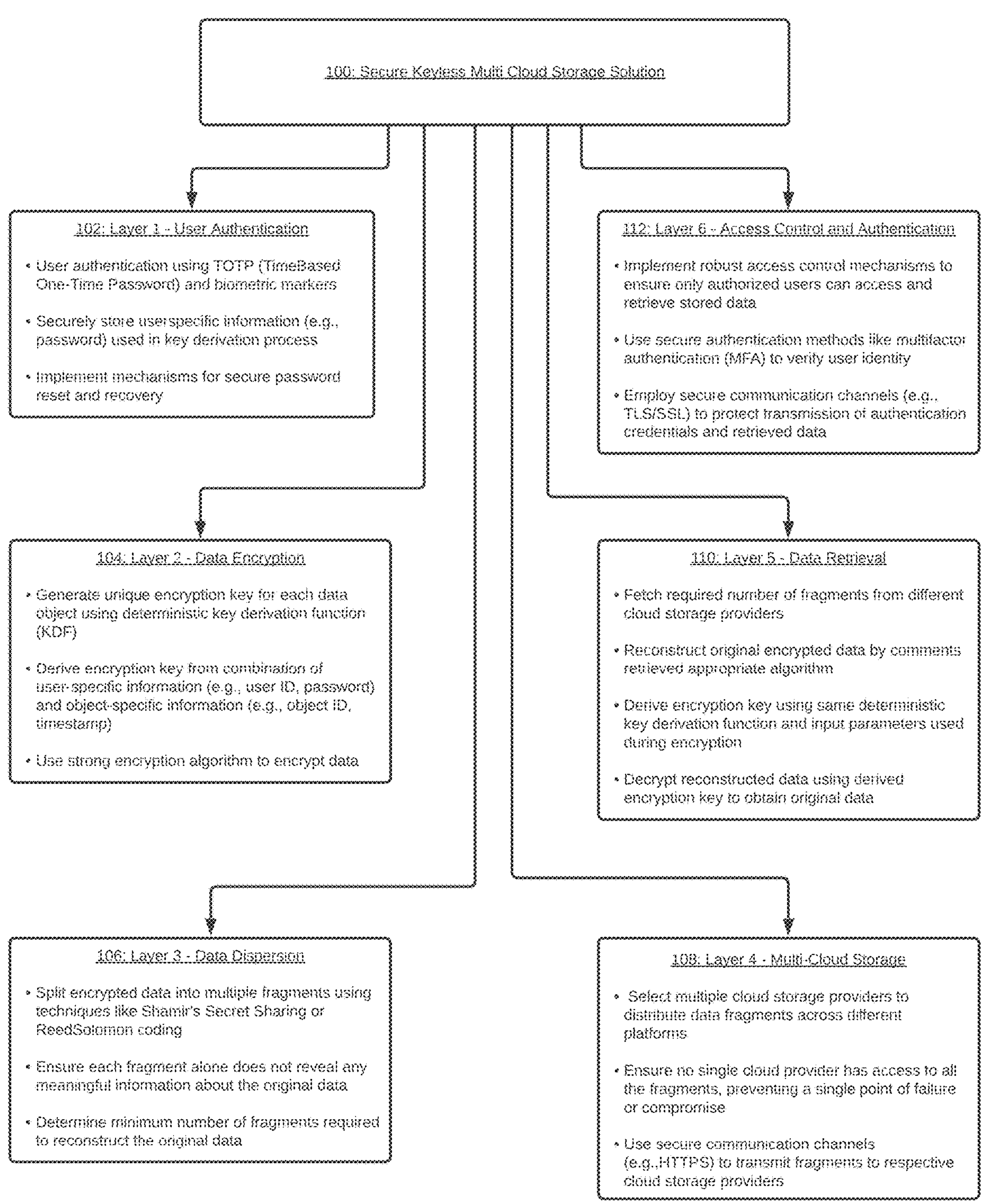
FIG. 1: Architecture Flow Diagram

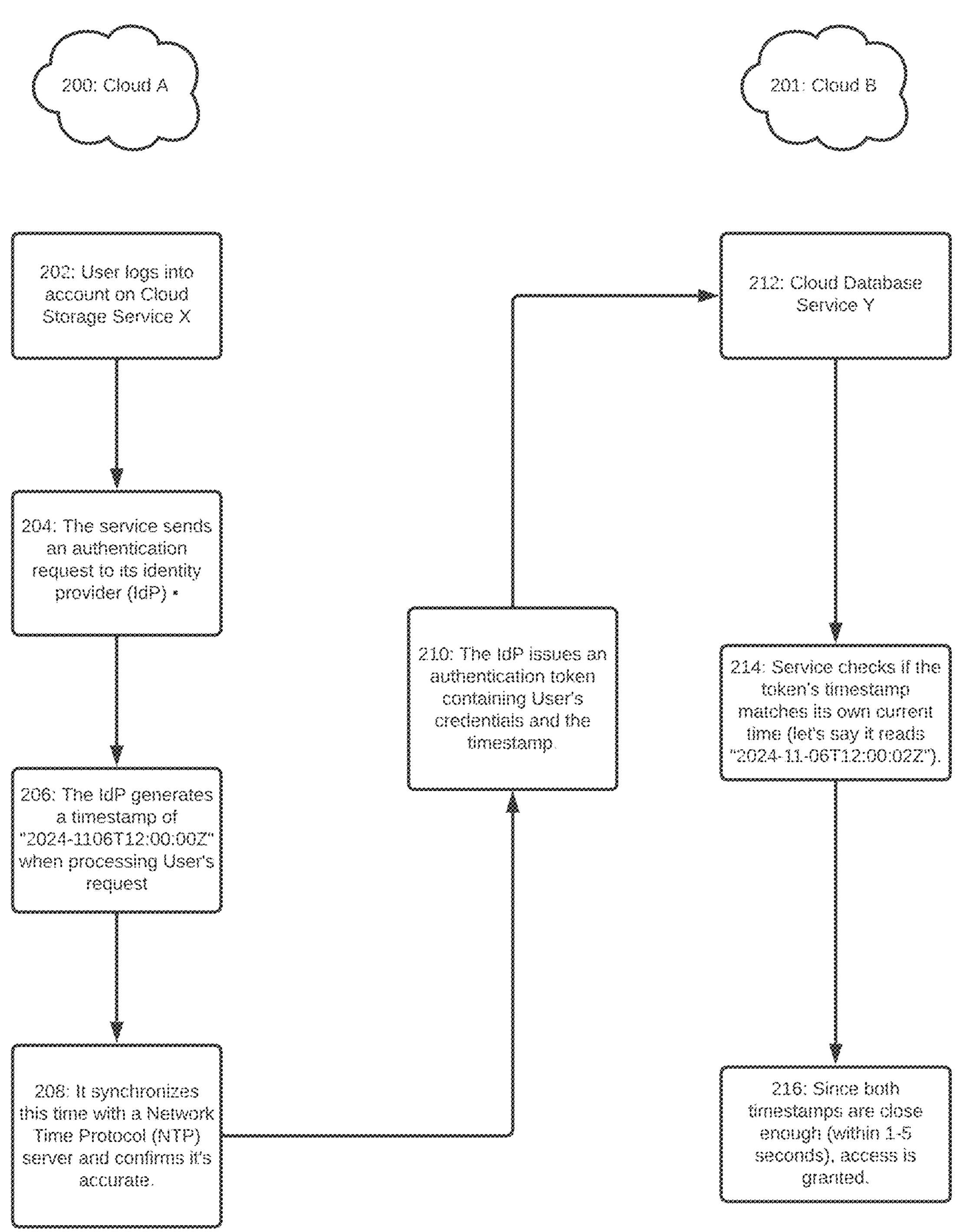
FIG. 2: Inter-Cloud Authentication with Time-Sync Verification Flow Diagram

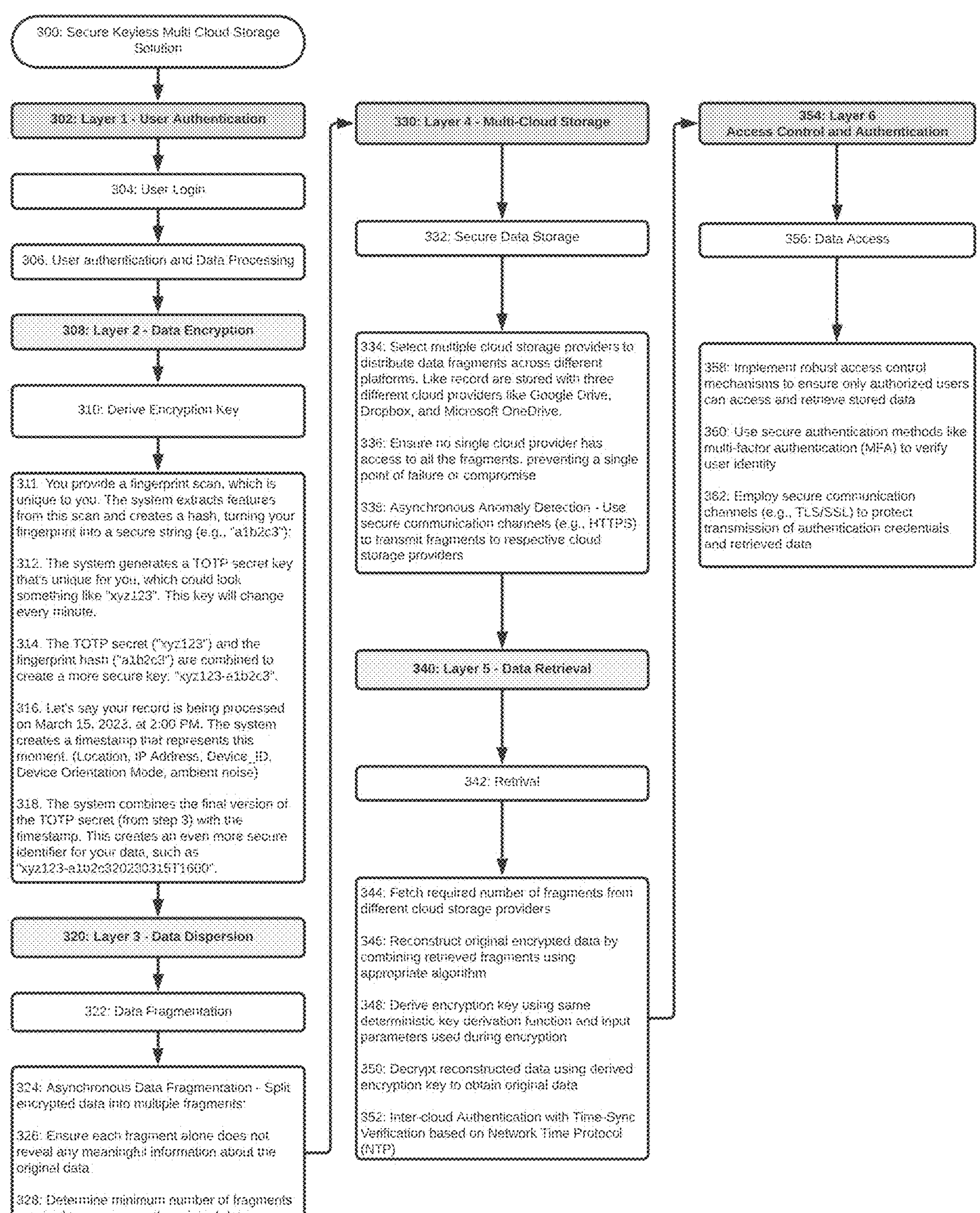
FIG. 3: Secure Keyless Multi Cloud Storage Solution Flow Example

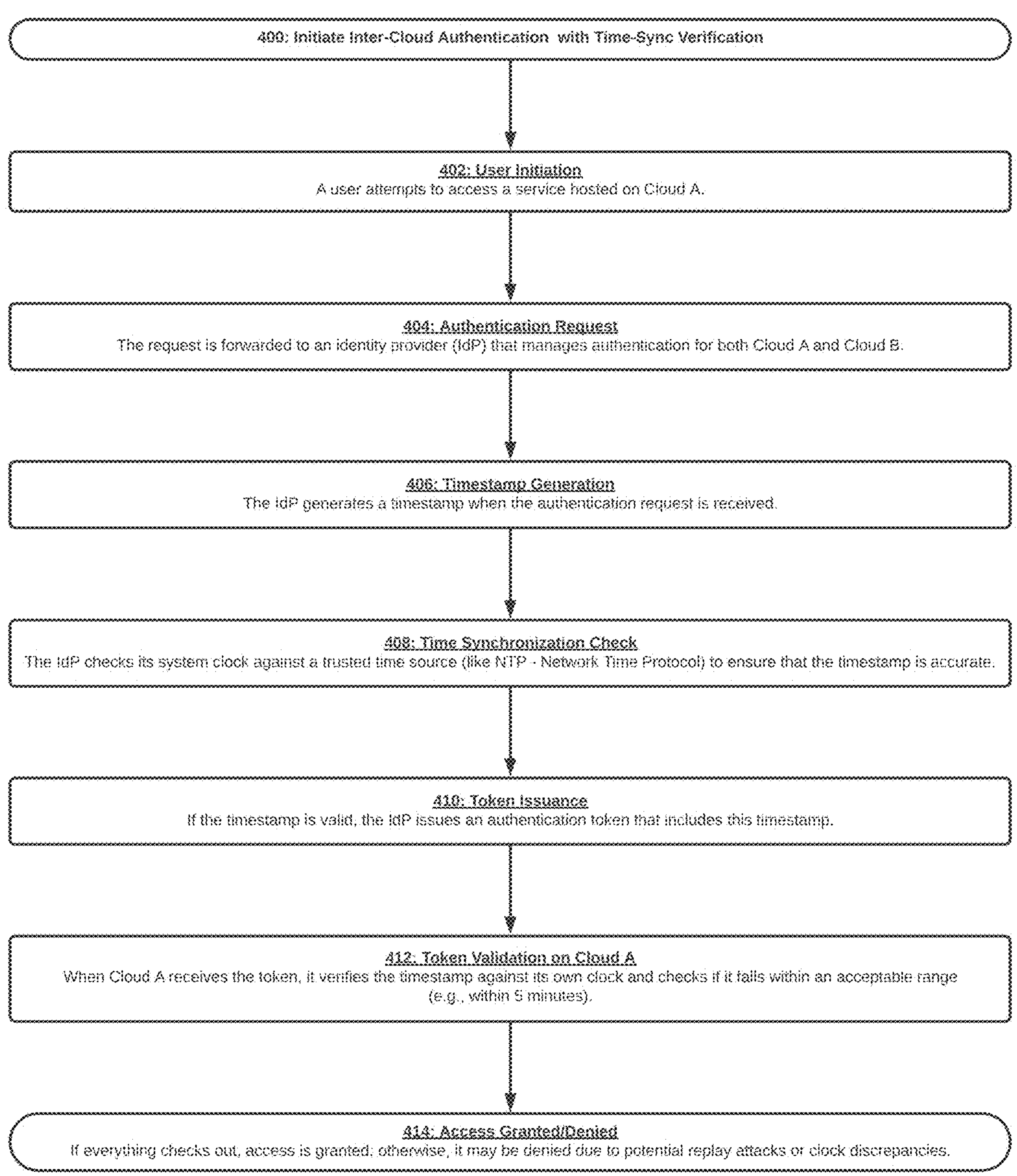
FIG. 4: Inter-Cloud Authentication with Time-Sync Verification

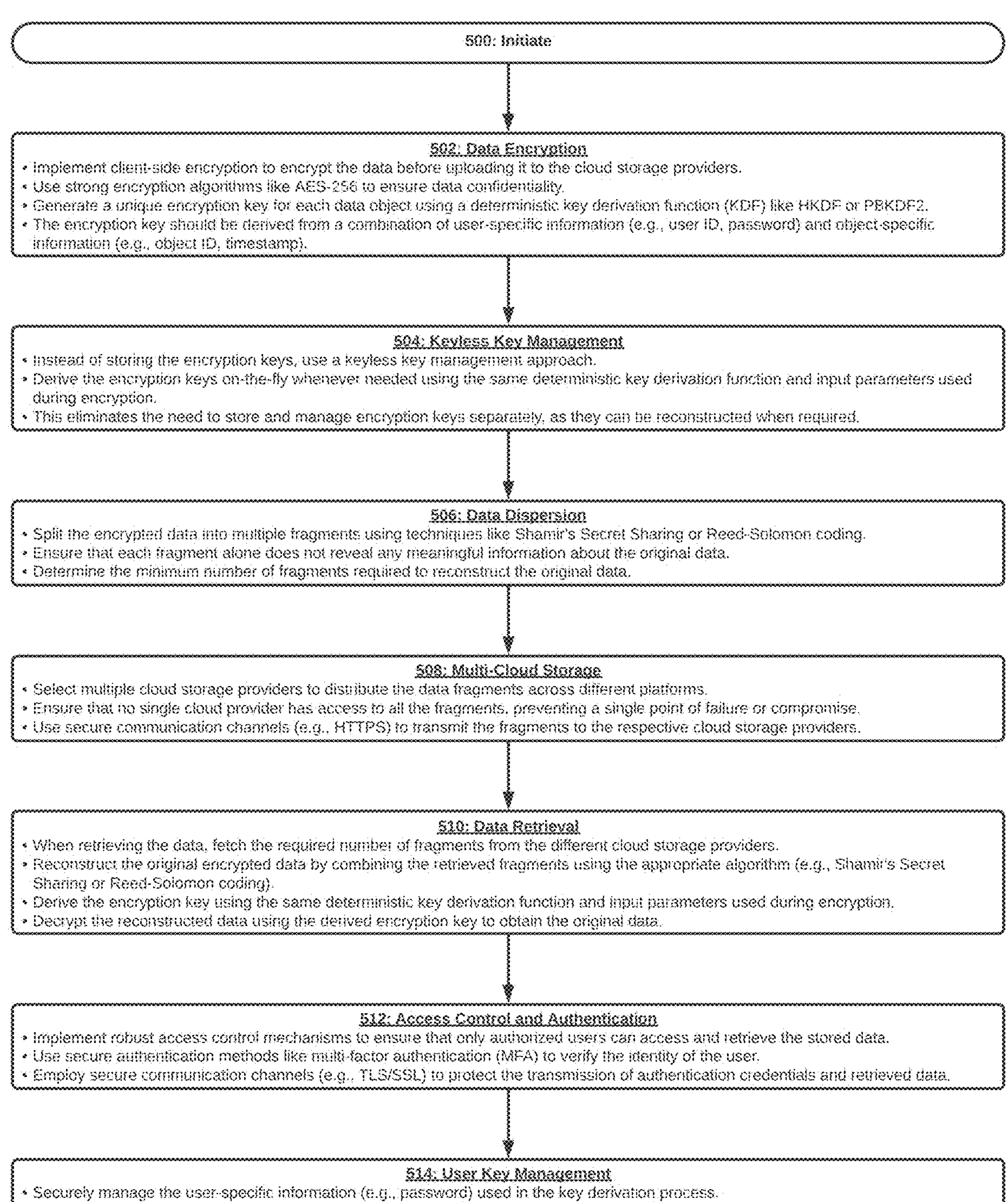
FIG. 5: Sample Solution Steps

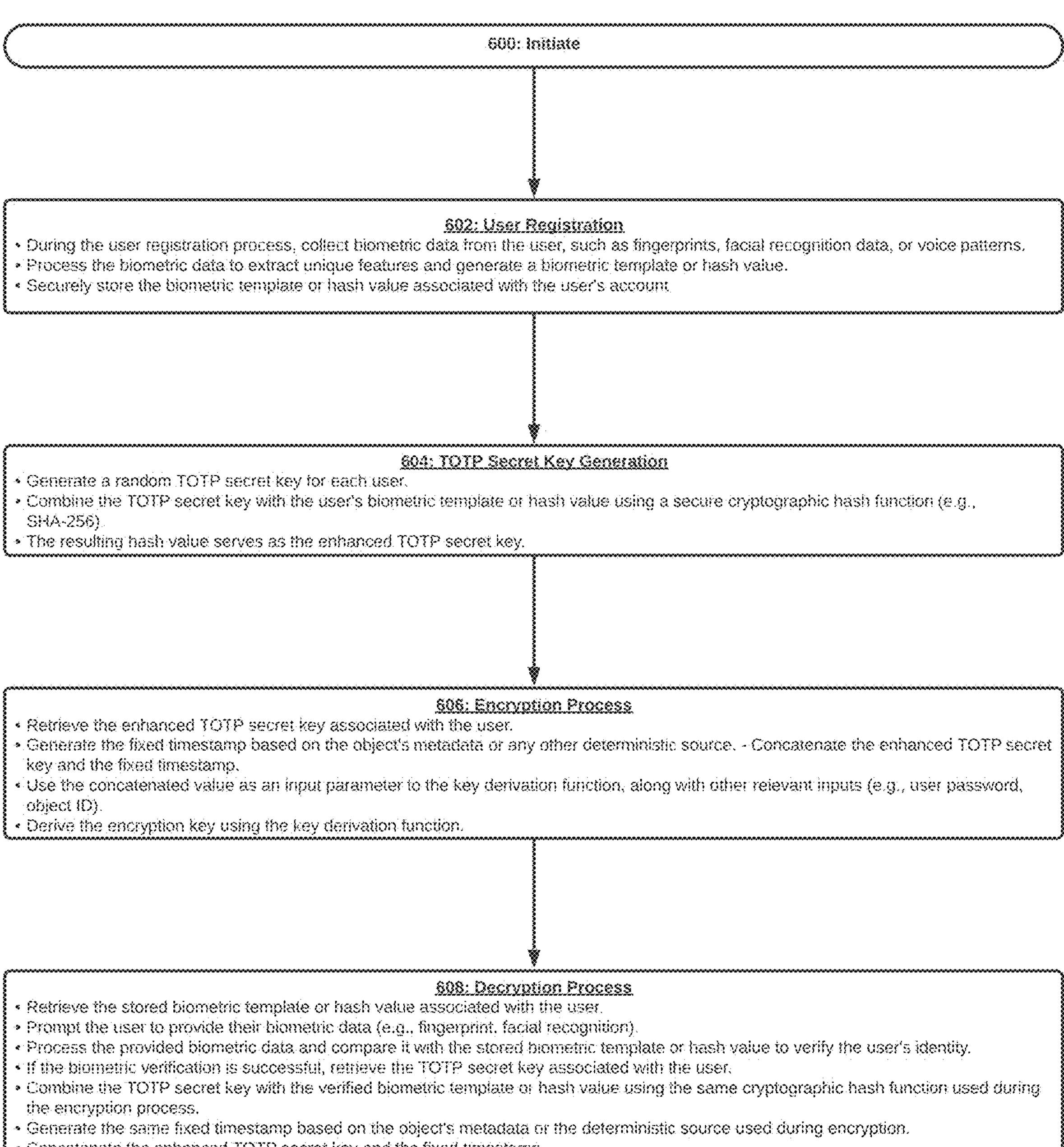
FIG. 6: TOTP (Time-Based One-Time Password) & Biometric Markers in addition to UserID, Password, ObjectID and Last saved Time Stamp

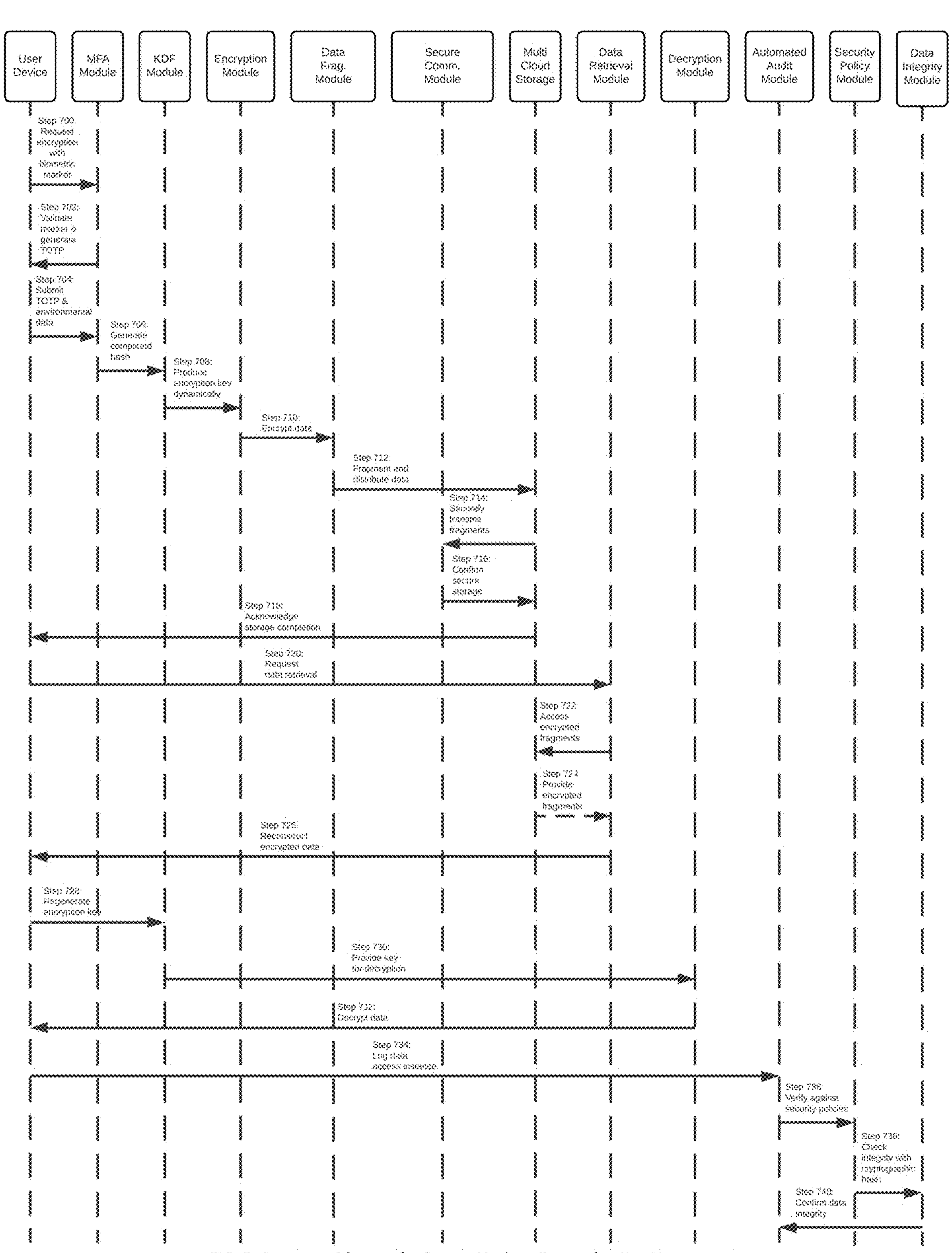
FIG. 7: Sequence Diagram for Secure Keyless Encryption Key Management

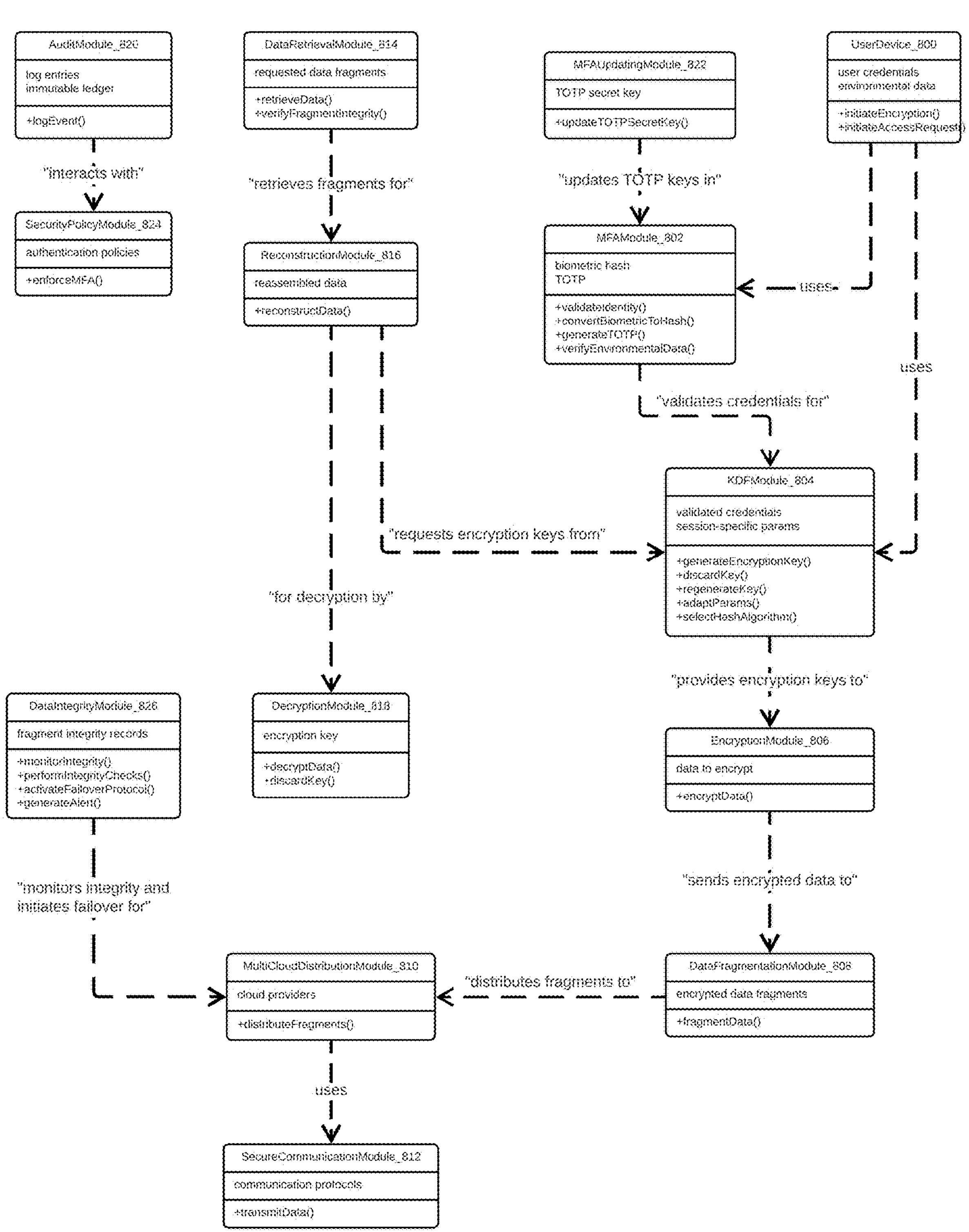
FIG. 8: Class Diagram for Secure Keyless Encryption Key Management In A Multi-Cloud Storage Environment System

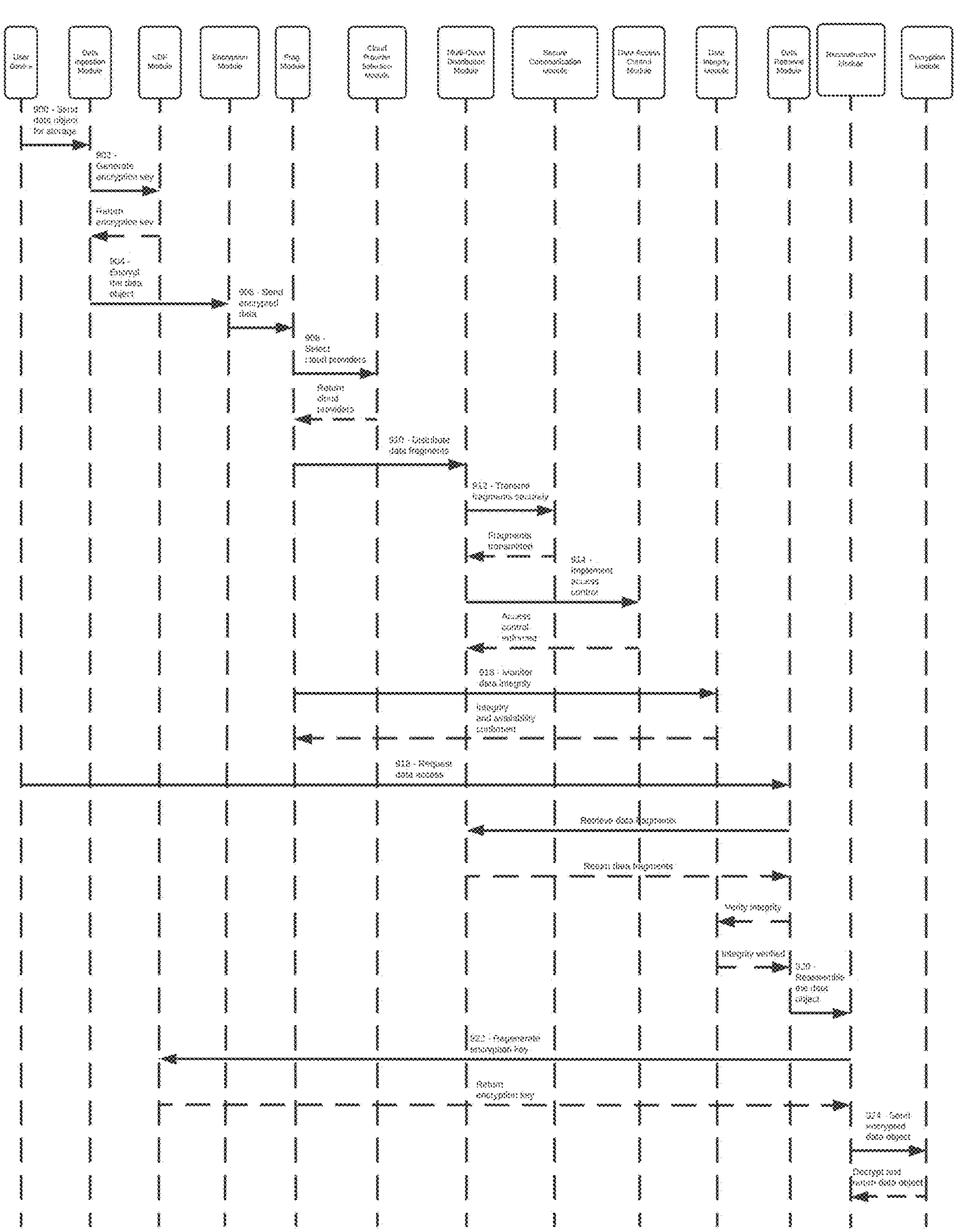
FIG. 9: Sequence Diagram for Secure Data Fragmentation, Encryption, And Distribution Across Multiple Cloud Storage Providers

KeyRegenerationModule_1026
+regeneratedEncryptionKey: object
+regenerateKey()
+applyOriginalKDF()
regenerates encryption keys for
DecryptionModule_1028
+decryptionKey: object
+decryptData()
+discardKeyAfterDecryption()
ComplianceAndMonitoringModule_1040
+complianceAlerts: object
+monitorAccessPatterns()
+generateSecurityAlert()
oversees compliance, access, and security alerts
SecurityPolicyModule_1034
+authenticationPolicies: object
+enforceMFA()
logs events and interacts with
LoggingAndAuditModule_1030
+auditTrail: object
+immutableLedger: object
+logEvent()
+recordDataAccess()
RedundancyManagementModule_1036
+redundantFragments: object
+replicateFragment()
+ensureDataAvailability()
ensures availability by replicating
DataIntegrityModule_1018
+integrityRecords: object
+performIntegrityCheck()
+monitorFragmentAvailability()
monitors integrity and availability
FragmentIntegrityValidationModule_1038
+cryptographicHashValues: object
+validateFragmentIntegrity()
validates fragments before reconstruction
DataRetrievalModule_1022
+requestedDataFragments: list
+retrieveFragments()
+verifyFragmentIntegrity()
retrieves fragments for
MFAUpdatingModule_1032
+TOTPSecretKey: object
+updateTOTPSecret()
updates TOTP secrets in
DataAccessControlModule_1016
+accessCredentials: object
+MFARequirements: object
+enforceAccessControl()
+validateUser()
restricts access across
MultiCloudDistributionModule_1012
+dataFragments: list
+assignedCloudProviders: list
+distributeFragments()
+randomizeDistributionOrder()
sends fragments via
SecureCommunicationModule_1014
+communicationProtocols: list
+establishSecureChannel()
+transmitDataFragment()
CloudProviderSelectionModule_1010
+cloudProviderList: list
+securityCriteria: object
+selectProviders()
+assignSecurityRating()
distributes fragments through
supports by providing alternate fragments
FailoverProtocolModule_1020
+redundantFragmentCopies: object
+activateFailover()
+retrieveFromBackupProvider()
ReconstructionModule_1024
+reconstructedData: object
+reassembleData()
+applyReassemblyAlgorithm()
DataIngestionModule_1000
+data: object
+receiveData()
+prepareForEncryption()
uses
KeyDerivationModule_1002
+userSpecificFactors: list
+KDFParameters: object
+generateEncryptionKey()
+adjustKDFParameters()
+discardKey()
provides keys to
EncryptionModule_1004
+encryptionKey: object
+dataToEncrypt: object
+encryptData()
+discardKeyPostEncryption()
sends encrypted data to
FragmentationModule_1006
+encryptedDataFragments: object
+splitData()
+applyFragmentationMethod()
uses
SensitivityAssessmentModule_1008
+dataSensitivityLevel: object
+determineFragmentSize()
+assessSensitivity()

FIG. 10: Class Diagram for Secure Data Fragmentation, Encryption, and Distribution Across Multiple Cloud Storage Providers

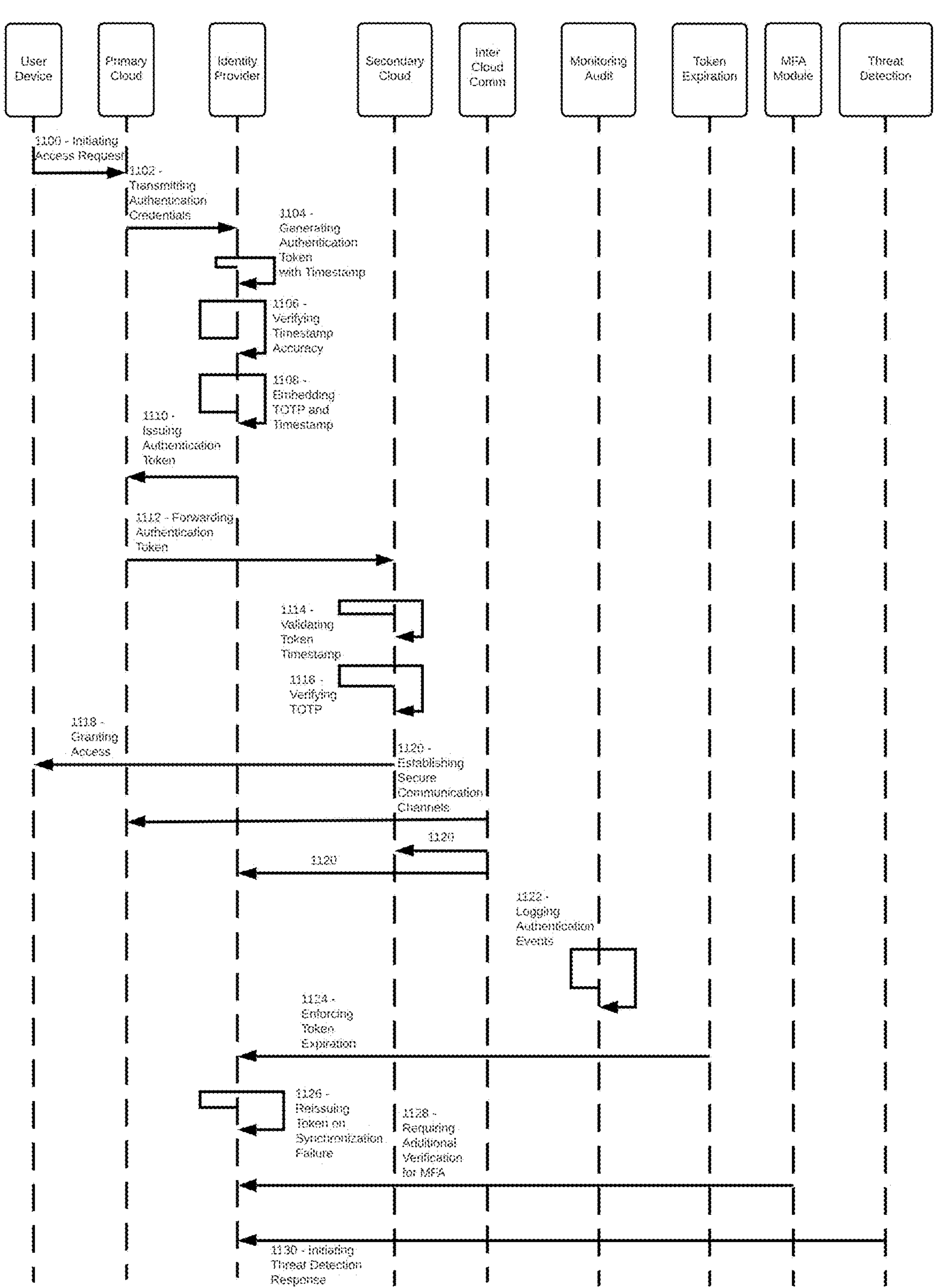
FIG. 11: Sequence Diagram for Secure Inter-Cloud Authentication With Time-Sync Verification To Control Data Access

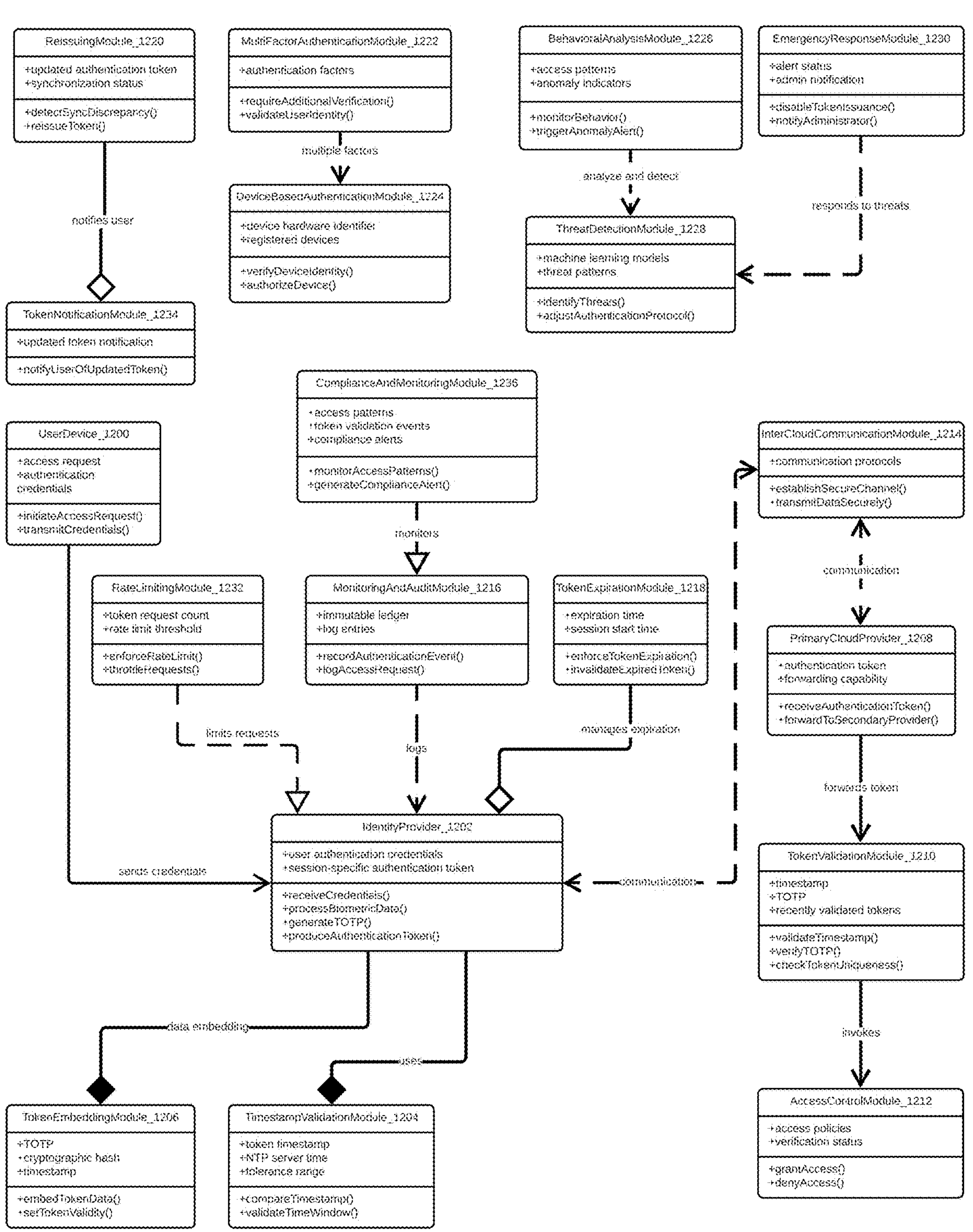
FIG. 12: Class Diagram for Secure Inter-Cloud Authentication With Time-Sync Verification To Control Data Access

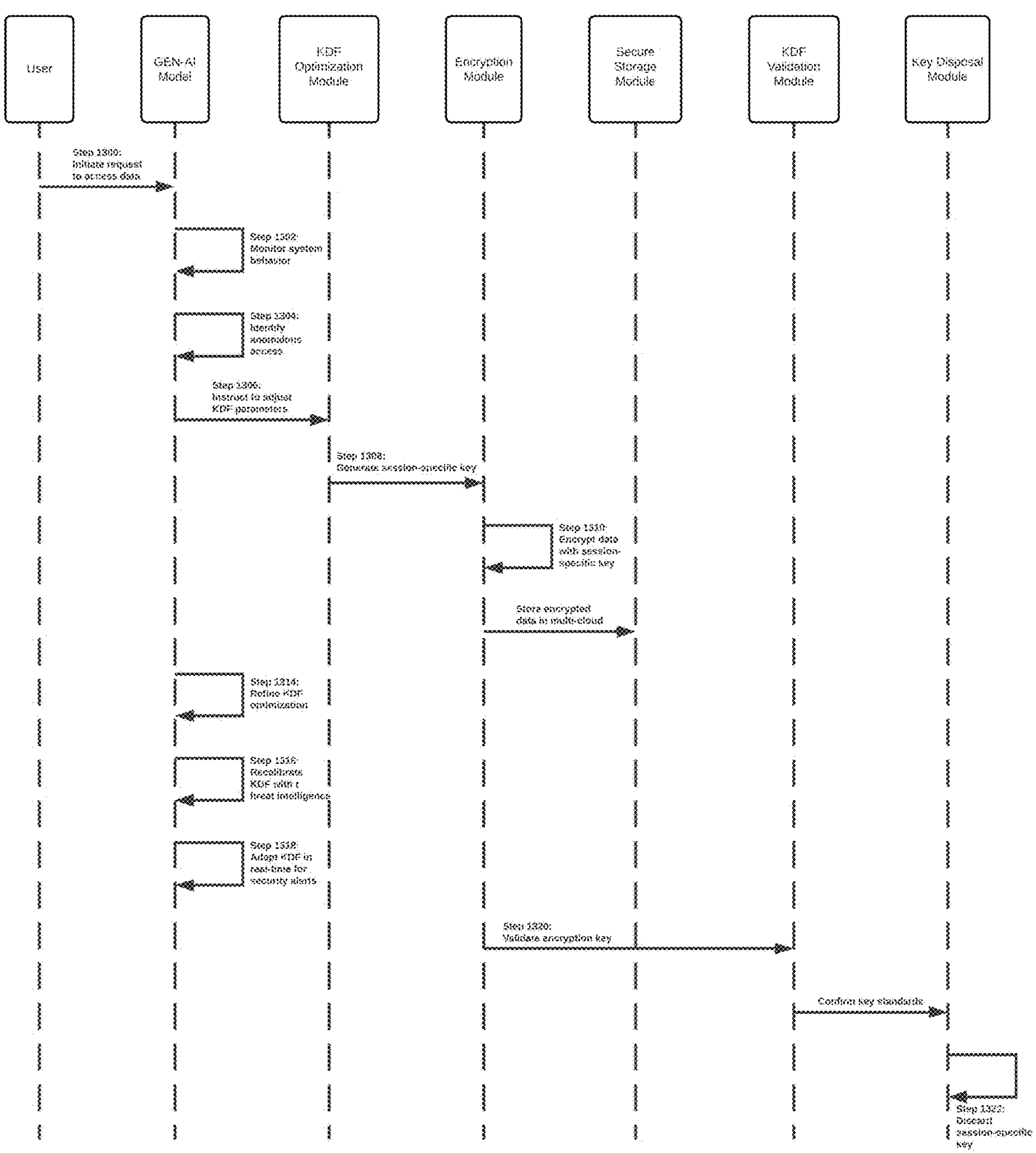
FIG. 13: Sequence Diagram for Dynamically Optimizing Encryption Key Derivation Using Generative Artificial Intelligence

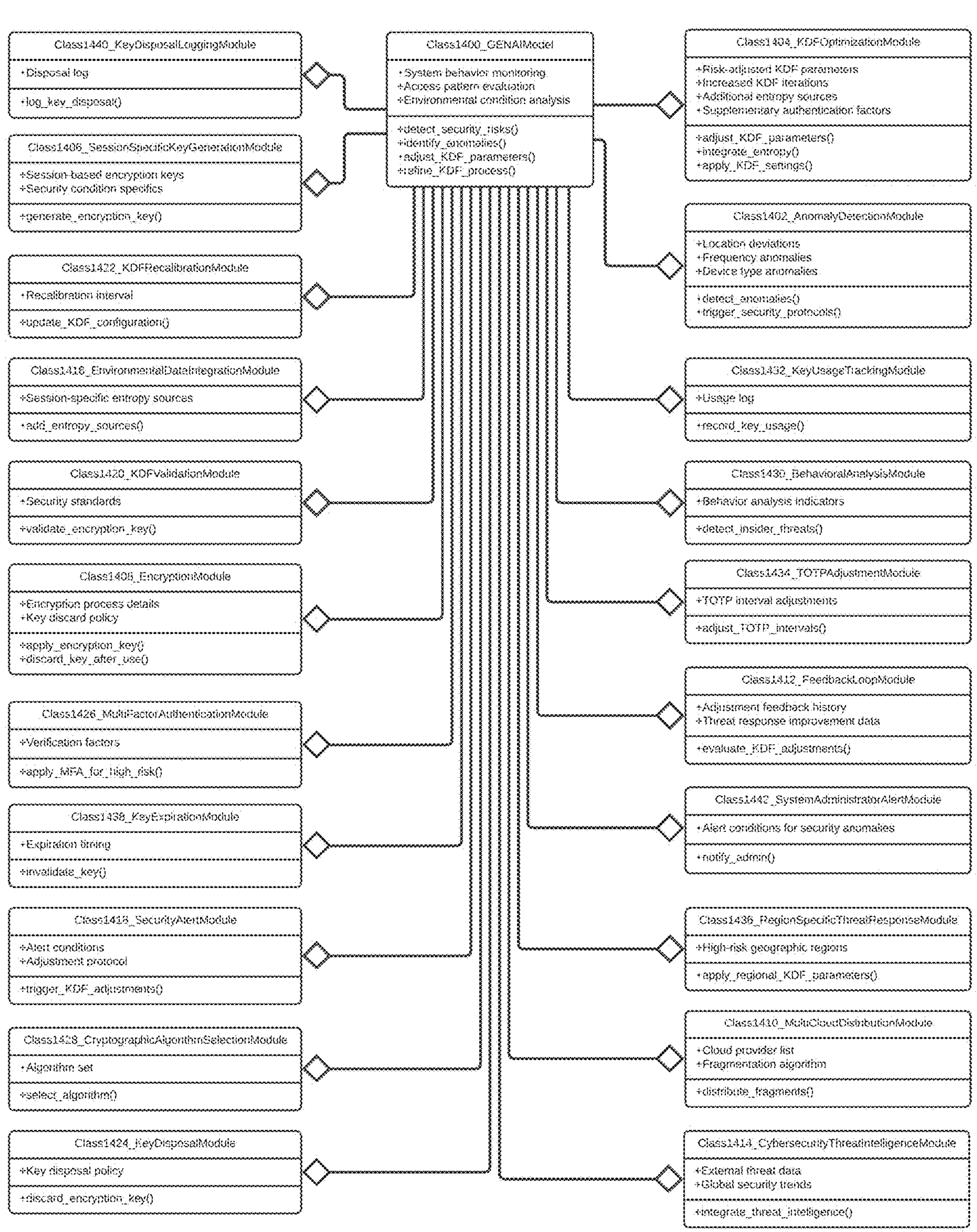
FIG. 14: Class Diagram for Dynamically Optimizing Encryption Key Derivation Using Generative Artificial Intelligence

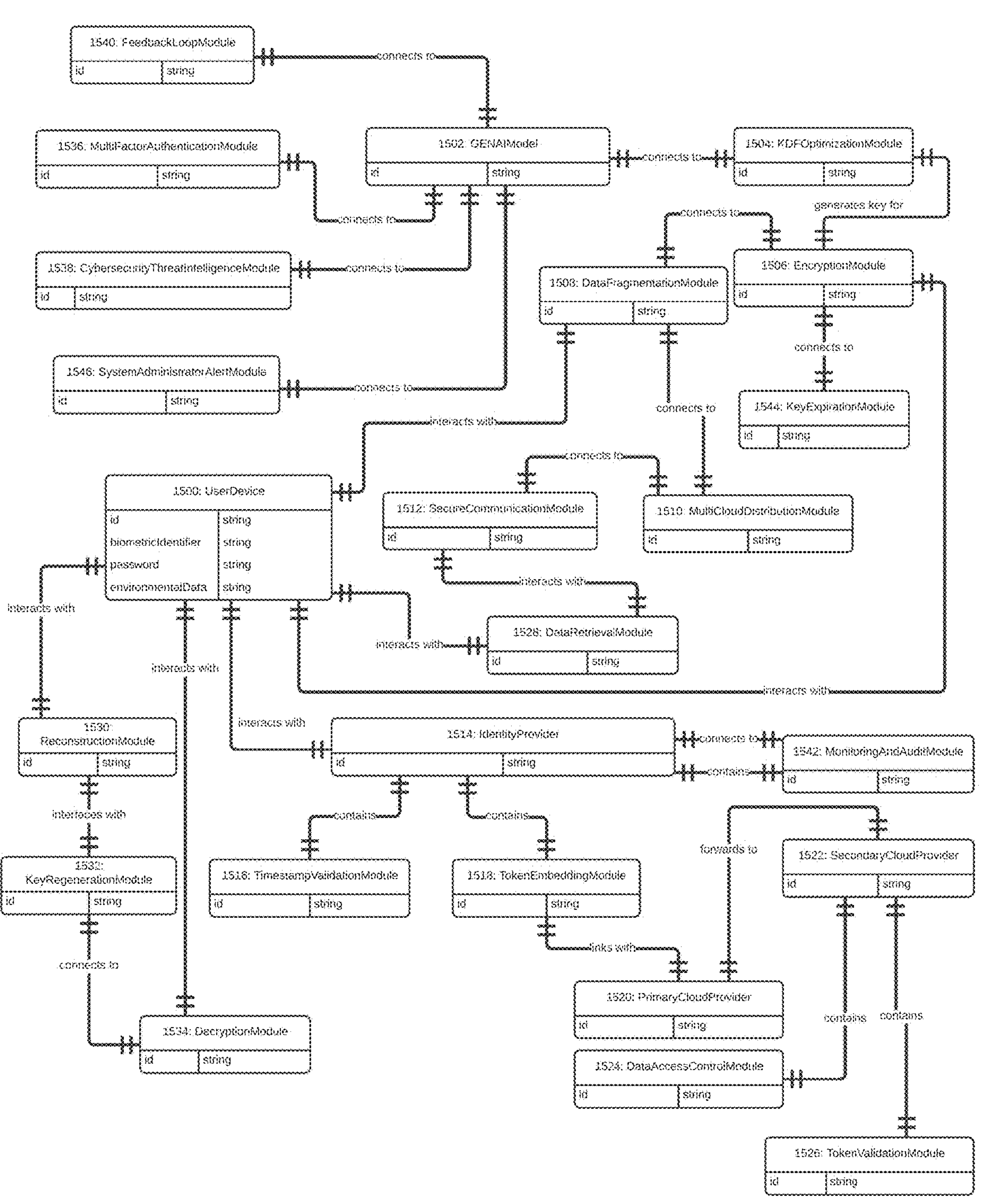
FIG. 15: Entity Relationship Diagram

DATA FRAGMENTATION AND MULTI-CLOUD DISTRIBUTION SYSTEM

TECHNICAL FIELD

The inventions disclosed herein pertain to the field of cryptography and digital data security, particularly under the class covering technologies related to cryptographic techniques and systems. The U.S. Patent Office defines this field as encompassing systems and methods for secure communications, data encryption and decryption, and cryptographic key generation and management. The disclosed inventions involve advanced methods for encryption key derivation, secure data storage, and cross-cloud authentication to safeguard sensitive information in multi-cloud storage environments. These methods utilize deterministic key derivation functions and fragmentation techniques to enhance data protection, ensuring the secure generation, management, and retrieval of cryptographic keys without traditional storage requirements. By employing keyless encryption management and novel data dispersal methods, the inventions address critical security needs in distributed data storage and communication systems.

DESCRIPTION OF THE RELATED ART

In the realm of multi-cloud storage, modern systems face substantial vulnerabilities related to data security, key management, and data access. As organizations increasingly rely on multi-cloud environments to manage, store, and process sensitive information, they encounter significant challenges in ensuring that data is securely encrypted, fragmented, and managed without creating potential points of failure. Traditional methods of encryption rely on storing keys centrally or with third-party providers, introducing severe risks. If these keys are compromised, the security of all associated data is immediately at risk, making the system susceptible to unauthorized access, data theft, or even complete data exposure. Such systems depend heavily on stored credentials and encryption keys, which remain at constant risk of compromise through various attack vectors, including hacking, insider threats, and phishing.

Another critical challenge involves the fragmentation and distribution of data across multiple cloud platforms. While splitting data into fragments for storage across several clouds can increase security, current methods for data dispersal do not fully mitigate the risk of unauthorized access. In a conventional multi-cloud environment, if a hacker gains access to any single cloud provider's storage, they may retrieve sensitive fragments that, when combined with data from other breached providers, could reveal complete information. Existing approaches often lack sufficient safeguards to prevent any single cloud provider or unauthorized entity from accessing meaningful parts of the data, ultimately making data fragmentation a weak security measure on its own.

The process of securely retrieving data in a multi-cloud environment also presents major obstacles. To maintain data integrity and accessibility, a robust method for reconstructing fragmented data is essential. Current systems often fail to securely manage inter-cloud authentication, relying on one-off security tokens or passwords that can be intercepted and used in replay attacks. When requests for data retrieval are not sufficiently synchronized or validated, they can open loopholes in the multi-cloud security chain. These gaps allow malicious entities to exploit inconsistencies in time-based authentication, gaining unauthorized access to sensitive data by replaying valid tokens. This lack of reliable inter-cloud authentication leaves multi-cloud systems vulnerable to breaches, especially during data reconstruction and retrieval processes.

Data breaches in multi-cloud environments can result in serious legal, financial, and reputational consequences. Organizations dealing with sensitive information, such as important records, financial data, or personally identifiable information (PII), face stringent data protection regulations that require robust encryption and strict access controls. Failure to comply with these regulations due to insecure storage and access protocols in a multi-cloud environment can lead to lawsuits and lasting damage to the organization's reputation. The inability to fully secure data in multi-cloud settings has left many organizations hesitant to adopt such systems, slowing innovation and limiting their ability to take advantage of the benefits of cloud-based infrastructure.

Additionally, traditional encryption models often struggle to keep up with evolving security threats. Techniques such as brute-force attacks, fuzzy testing, and machine learning-based decryption methods are growing more sophisticated, requiring systems to continually improve their encryption mechanisms. When encryption keys are stored or managed externally, they are more vulnerable to such attacks, and traditional key management protocols are not designed to handle the level of scrutiny required in a multi-cloud environment. As these threats become increasingly difficult to defend against, organizations using conventional key management strategies face growing risks of encryption failure, data compromise, and financial losses.

Authentication across multiple cloud platforms poses a unique set of problems, with each cloud provider having distinct security policies, protocols, and infrastructure. Managing secure cross-cloud authentication while maintaining synchronized timestamps is particularly challenging. Many organizations struggle with validating user identities across multiple platforms in real-time, which is essential to prevent unauthorized access during inter-cloud data retrieval processes. Existing solutions often lack a comprehensive, time-synced mechanism for cross-cloud authentication, creating security gaps that can be targeted by attackers who intercept and reuse authentication tokens. Without a synchronized approach to inter-cloud authentication, data retrieval requests cannot be securely verified, compromising the overall integrity of the system.

Organizations are also grappling with the difficulty of securely managing user credentials in multi-cloud systems, where any vulnerability in authentication protocols can lead to unauthorized data access. Multi-factor authentication (MFA) has become a standard practice to strengthen login security, but implementing MFA consistently across multiple cloud services is a complex task. Each service may have unique requirements for user validation, creating fragmented authentication processes that reduce system-wide security. Without a cohesive, multi-factor approach that spans all cloud providers, it remains difficult to enforce uniform security standards, which ultimately weakens the protection of sensitive data stored across clouds.

Privacy concerns are an additional issue, as users expect that their data will be securely managed without risk of unauthorized access by cloud providers or other third parties. However, traditional multi-cloud storage solutions do not adequately address the risk that arises when providers themselves have potential access to sensitive information. Even with encryption, if data fragments or complete encryption keys are accessible by cloud providers, there is a risk of unauthorized exposure due to either internal malicious actors or external attacks targeting the cloud provider. In practice, this scenario can lead to privacy breaches that damage user trust and expose organizations to regulatory scrutiny.

The reliance on conventional encryption and storage strategies in multi-cloud systems has also stifled scalability. As organizations expand and distribute more data across multiple clouds, they often encounter difficulties in managing encryption keys, data fragmentation, and secure access across an increasing number of cloud providers. Existing methods are inefficient and prone to bottlenecks, particularly in systems where key management or retrieval protocols were not originally designed for multi-cloud use. This inability to scale securely limits the adaptability of organizations that rely on cloud-based infrastructure to handle growing data needs, leaving them vulnerable to data breaches and unauthorized access as they expand.

Many existing solutions are overly complex or prohibitively costly to implement on a large scale. As organizations attempt to integrate secure multi-cloud storage, they find that managing encryption keys, data fragmentation, and inter-cloud communication requires specialized expertise, increasing operational costs. Additionally, the lack of unified security protocols for multi-cloud systems often necessitates custom security implementations, which are time-consuming and resource-intensive. This complexity and cost burden make it difficult for organizations of all sizes to adopt robust multi-cloud security practices, creating a barrier to widespread multi-cloud adoption and limiting data protection.

Another unresolved issue is the lack of real-time vulnerability assessment in key management processes within multi-cloud systems. Conventional security protocols often provide only periodic reviews or reactive security measures, rather than continuously assessing and optimizing key management in response to detected threats. This static approach leaves systems vulnerable to new types of attacks that target recently discovered vulnerabilities. Without a dynamic, real-time mechanism to assess potential security risks in key management, multi-cloud systems are left exposed to sophisticated attacks that can bypass outdated security protocols, making it difficult to maintain robust data protection.

Moreover, as artificial intelligence becomes increasingly integrated into cybersecurity, the need for adaptive key management that leverages AI is growing. AI-driven security can identify anomalies and adapt to potential threats faster than human-operated systems, which is essential for managing the complexity of multi-cloud environments. However, traditional encryption and storage solutions in multi-cloud systems rarely incorporate AI to improve key management, leaving security vulnerabilities unaddressed and increasing the likelihood of successful cyberattacks. This lack of AI integration highlights a significant gap in current multi-cloud security practices, which have not evolved to meet the demands of modern cybersecurity.

Organizations have long recognized the potential for AI to improve security in data storage systems, yet few multi-cloud storage solutions offer such capabilities. The lack of integrated AI tools for optimizing key derivation processes is a persistent issue that has left multi-cloud environments susceptible to unauthorized access and data breaches. As the scope of cyber threats grows, so does the need for AI-powered solutions that can dynamically adjust security parameters, respond to detected threats, and improve the resilience of encryption and data management strategies. The absence of such tools has limited the effectiveness of current multi-cloud storage practices, creating an urgent need for more advanced security measures.

This long-felt need for a secure, scalable, and AI-integrated solution has remained largely unmet, as existing multi-cloud storage and encryption strategies fail to address the combined challenges of keyless encryption, secure data fragmentation, cross-cloud authentication, and real-time AI-driven security optimization. Current systems have been unable to fully secure multi-cloud environments, leaving organizations exposed to evolving security threats, operational inefficiencies, and privacy concerns. The absence of a solution that can seamlessly manage these issues in a cohesive and scalable manner has constrained the adoption of multi-cloud systems and hindered the broader advancement of cloud-based data storage technologies.

SUMMARY OF THE INVENTION

This disclosure covers multiple aspects that relate to secure keyless multi cloud storage solutions leveraging deterministic key derivation functions.

One aspect presents a keyless key management system that eliminates the need for stored encryption keys by dynamically generating keys using a deterministic key derivation function (KDF). In this system, the encryption key is generated on-demand whenever access to encrypted data is required. By eliminating the storage of encryption keys, the system significantly enhances security and removes the need for traditional key management. This approach ensures that encryption keys are never stored, reducing the risk of key compromise and unauthorized access. The system achieves this through a unique KDF that derives keys based on a combination of multiple factors, including biometric data, time-based one-time passwords (TOTPs), and real-time environmental data, making each generated key unique to its session and securely tied to the user's identity.

A key aspect of this system is its integration of biometric markers, which serve as a fundamental input to the KDF. These biometric markers, which can include fingerprints or facial recognition, are unique to each user and provide a highly secure, user-specific component in the key generation process. This biometric data is transformed into a cryptographic hash, which becomes an essential part of the key derivation inputs. Since biometric data is highly individualized, this factor alone significantly strengthens the generated key's security by ensuring it cannot be easily duplicated or guessed. The use of biometric data also enables the system to verify the user's identity with high accuracy, adding an additional layer of security to the key generation process.

In addition to biometrics, the system incorporates a TOTP as another essential input for the KDF. The TOTP is a time-sensitive, continuously changing code that provides a temporal component to the key generation. This code is typically generated every 30 or 60 seconds, depending on system configurations, and is unique to each user. By using a TOTP in the KDF, the system ensures that each key is valid only for a specific time window, which restricts its usability to a short period. The time-based nature of the TOTP makes it an effective defense against replay attacks, as the key derived with the TOTP will no longer be valid once the code changes. Integrating the TOTP thus enhances the security of the keyless encryption method by binding each generated key to a specific moment, making it harder for unauthorized entities to gain persistent access.

Real-time environmental data, such as the user's device information, IP address, geographical location, and other contextual data, is also included as a key input to the KDF. This environmental data serves to anchor the key generation process in the current operational context, making the resulting encryption key even more unique and resistant to unauthorized reproduction. The system can use various forms of environmental data, including device-specific information like device ID, operating system version, and network details. By leveraging these environmental markers, the KDF ensures that keys are not only user-specific but also session-specific, tightly linking each key to the exact conditions under which the data access request is made. This environmental component significantly limits the likelihood that the key could be reconstructed outside its original context, providing a robust security enhancement.

The deterministic nature of the KDF means that the same inputs will always produce the same encryption key, allowing users to consistently access their data without needing to store any encryption keys. This consistency in key derivation is crucial for the practical usability of the system, as it allows users to seamlessly retrieve encrypted data as long as they can provide the necessary inputs. The KDF essentially replaces the stored key with a derived one that is regenerated each time based on user-specific factors, meaning the key exists only in transient memory during data access and is discarded immediately afterward. This process ensures that the key is never permanently stored or transmitted, significantly reducing security risks associated with key theft or exposure.

The aspect also includes a secure mechanism for handling the combination of biometric data, TOTP, and environmental data within the KDF. This mechanism is designed to protect sensitive information, particularly biometric data, from being exposed or compromised during the key derivation process. To achieve this, the system uses cryptographic hashing and secure algorithms to process each input independently, ensuring that none of the raw input data is retained or accessible once the key is derived. The combination process within the KDF is configured to operate in a secure execution environment, which protects the integrity of the data inputs and ensures they are handled only within a trusted boundary. By securing this combination process, the aspect maintains a high level of data privacy and security throughout the key derivation process.

An additional feature of this invention is the integration of multifactor authentication (MFA) at the point of key generation. This MFA requires the user to authenticate using multiple credentials, including biometric verification and a passcode or password. By requiring multiple forms of authentication, the system ensures that only authorized users can trigger the KDF and generate the necessary encryption key. This MFA process is tightly interwoven with the keyless key management system, as the successful completion of the authentication steps is necessary for the KDF to proceed. The MFA not only enhances security by preventing unauthorized access to the KDF but also strengthens the overall integrity of the data protection mechanism.

The system's flexibility allows for various biometric and environmental data types to be integrated based on the security needs and configurations of the deployment environment. For example, in a high-security setting, the system can require multiple forms of biometric data, such as both fingerprint and facial recognition, in addition to TOTP and extensive environmental data. This adaptability enables this aspect to meet a wide range of security requirements and provides organizations with the flexibility to customize the key derivation process according to their specific risk profiles. The KDF can thus be tailored to prioritize security or usability, depending on the needs of the application, making the system highly versatile and scalable.

A further advantage of this aspect is its capability to operate in distributed and multi-cloud environments without compromising security. In these environments, data is often stored across multiple cloud providers, making traditional key storage impractical due to cross-provider security risks. Since the keyless key management system does not require any stored keys, it removes the need to share or synchronize encryption keys across multiple cloud platforms. Each time the user accesses the data, the KDF generates a key that is valid only for that particular session and access context. This capability enables secure data access in multi-cloud setups while maintaining strong security protocols that are difficult to bypass.

This invention is also highly resilient to various types of cyberattacks, including man-in-the-middle (MITM) and replay attacks. Since the encryption keys are derived based on unique, real-time inputs that change with each access attempt, it is nearly impossible for an attacker to intercept or reuse a valid key. The TOTP, in particular, prevents replay attacks by limiting the key's validity to a narrow time window, while the use of biometrics and environmental data creates a complex, multi-dimensional defense that attackers cannot easily overcome. The real-time, session-specific nature of the derived key makes it challenging for malicious actors to reconstruct the conditions necessary to generate a duplicate key.

In addition to security, the system's architecture supports high efficiency in key derivation and access control, allowing for fast, seamless data access without the delays typically associated with key management. Because the KDF operates without relying on stored data, the overhead associated with key retrieval, storage management, and access verification is substantially reduced. This design ensures that the system can scale effectively even in high-demand environments, providing users with quick and secure access to encrypted data without compromising performance.

This aspect also provides a safeguard for biometric and environmental data by ensuring that these inputs are not stored or retained after the key derivation process. Each time a key is generated, the inputs are used temporarily within the KDF and then discarded, leaving no residual data that could be exposed in the event of a breach. This temporary handling of sensitive information reduces the risk of data exposure and aligns with privacy regulations, as it minimizes the retention of identifiable biometric and contextual data.

Moreover, the KDF is designed to support continuous updates to the TOTP and environmental data, allowing the system to adapt dynamically to changing security contexts. For instance, the TOTP generator can be periodically recalibrated to adjust the frequency of code changes based on risk levels, while environmental data parameters can be refined to include additional factors as needed. This adaptability enables the keyless key management system to evolve alongside emerging security requirements and respond to evolving threats, ensuring that the system remains robust and reliable over time.

This aspect's focus on real-time, user-specific key generation also enhances its usability, as it allows authorized users to access their data simply by providing biometric verification and a valid TOTP. Unlike traditional key management systems, which often require complex procedures for key storage, retrieval, and management, this keyless system operates seamlessly in the background, offering a straightforward and secure user experience. The elimination of stored keys makes data access simpler and reduces the administrative burden associated with traditional key management, offering a more streamlined and accessible solution for end-users.

Through its combination of biometric, TOTP, and environmental data, this aspect ensures that each encryption key is unique, transient, and tightly linked to the user and access conditions. This multi-factor approach prevents the possibility of key duplication or misuse, as each derived key is effectively a one-time-use code generated specifically for a particular session. This design enhances the security and privacy of the system, providing users with a highly secure and reliable method for accessing encrypted data without reliance on stored or transmitted keys, making it an ideal solution for high-stakes, data-sensitive environments.

Another invention introduces a data fragmentation and multi-cloud distribution system designed to enhance data security by dispersing encrypted data across multiple cloud providers in a secure, fragmented manner. This system employs advanced data fragmentation techniques to split data into multiple segments, ensuring that each fragment alone does not contain enough information to reconstruct the original data. By dividing the encrypted data into distinct, non-overlapping fragments and distributing these fragments across various cloud storage providers, the system minimizes the risk of unauthorized access to the complete dataset. Each fragment is securely stored in a separate cloud, so no single provider can retrieve enough information to access the original data, adding a robust layer of security to multi-cloud storage.

A core aspect of this system is the use of cryptographic data fragmentation methods, such as Shamir's Secret Sharing or Reed-Solomon coding, which ensure that each data fragment is independent and contains only partial information. These cryptographic techniques create interdependent fragments, where a minimum number of fragments is required to successfully reconstruct the original encrypted data. This threshold-based approach guarantees that even if one or more fragments are compromised, an attacker would still need access to additional fragments to reveal any usable information. The result is a high level of data protection, as unauthorized access to a single fragment or cloud provider is insufficient to compromise the stored data.

This aspect includes a secure selection and assignment mechanism to distribute the data fragments across multiple cloud providers. This mechanism selects distinct cloud providers based on predetermined security criteria, ensuring that each provider is independently secure and capable of handling its assigned fragment. By diversifying the storage locations, the system prevents any single cloud provider from gaining access to all the data fragments required for reconstruction. The system's architecture thus avoids single points of failure, as it isolates each fragment in a unique storage environment, thereby reducing the risk associated with potential provider-specific breaches or vulnerabilities.

To maintain data security during the distribution process, this aspect employs secure communication protocols, such as HTTPS or TLS, for transmitting data fragments to each cloud provider. These protocols encrypt the transmission channels to prevent interception or tampering while the data is in transit. The use of secure communication ensures that data fragments are protected not only when they are stored in the cloud but also during transfer, safeguarding the entire lifecycle of data from initial encryption to distribution. The encryption of both storage and transmission pathways enhances the system's resilience against cyberattacks aimed at intercepting data fragments during the distribution phase.

The system incorporates a dynamic fragment allocation process, which adjusts the number of fragments based on the sensitivity and security needs of the data. For highly sensitive data, the system may increase the number of fragments, requiring a larger threshold of fragments for data reconstruction. Conversely, for less sensitive data, the system may reduce the fragmentation level, balancing security with efficiency. This dynamic allocation provides flexibility, allowing organizations to customize the fragmentation settings based on the specific sensitivity of each dataset, making the system adaptable to various data security requirements and risk profiles.

This invention also includes a fragment tracking and verification process, ensuring that each fragment remains secure and accessible in its assigned storage location. Through regular checks, the system verifies that each cloud provider securely retains its assigned fragment without unauthorized access or modification. By monitoring the integrity of each fragment, the system can detect and respond to any anomalies or unauthorized access attempts. This verification process is essential for maintaining data integrity over time, particularly in a multi-cloud environment where fragments are dispersed across several independent providers with varying security policies.

Another important feature of this invention is the implementation of robust access controls at the point of data retrieval. When a user requests access to the stored data, the system retrieves the required number of fragments from the cloud providers and reconstructs the original encrypted data. However, before granting access, the system enforces strict authentication procedures to verify the user's identity and permissions. This authentication layer ensures that only authorized users can initiate data retrieval, preventing unauthorized parties from reconstructing the data even if they attempt to retrieve the fragments. The access control mechanism thus strengthens security during the data reconstruction phase.

The system's design also includes redundancy mechanisms to improve data availability and resilience. By replicating select fragments across multiple cloud providers, the system can maintain access to data even if one provider experiences an outage or becomes temporarily unavailable. This redundancy strategy enables continuous access to data fragments and reduces downtime, supporting high availability in critical applications. The ability to replicate fragments across different providers provides additional assurance that data will remain accessible under various circumstances, ensuring that service disruptions do not compromise data availability.

In addition to redundancy, this aspect includes an automated failover process that redirects fragment retrieval requests to alternative providers in case of provider-specific failures. This failover mechanism allows the system to dynamically adapt to cloud provider outages, ensuring that the minimum required number of fragments can still be retrieved for data reconstruction. The failover process supports resilience in distributed data storage, particularly for mission-critical applications that require reliable data access under all conditions. This feature aligns with the system's emphasis on high availability and robust disaster recovery capabilities.

This aspect supports scalability, allowing organizations to manage data security efficiently across an increasing number of cloud providers as storage needs grow. The fragmentation and distribution processes are designed to handle large volumes of data and adapt to expanding cloud environments, making the system suitable for organizations with extensive data storage requirements. Scalability is essential in multi-cloud environments, where data volumes can fluctuate, and the system's capacity to handle these changes ensures that data security is maintained regardless of storage scale. The system's flexibility to integrate additional cloud providers without compromising security provides a future-proof approach to multi-cloud data management.

Another inventive feature of this system is its ability to comply with regulatory requirements by ensuring that data is segmented and securely stored across multiple jurisdictions. By distributing data fragments across providers in different locations, the system allows organizations to align with data residency requirements, which mandate that data be stored within specific geographic regions. This geo-compliant fragmentation approach supports regulatory adherence and provides an extra layer of security by geographically dispersing data fragments, thus reducing the risk of a single jurisdictional breach affecting the entire dataset.

The system includes built-in encryption key management to prevent any single cloud provider from accessing the encryption keys associated with the data fragments. During the distribution process, each fragment remains encrypted, and only the derived encryption key is used during data access. The encryption key never resides within the cloud providers, maintaining a separation of data and key management functions. This keyless approach prevents cloud providers from directly decrypting any fragments, ensuring that data remains secure even if a fragment is compromised. The key management component strengthens the system's security by controlling access at the encryption layer, adding an additional safeguard.

Additionally, this aspect provides an optimized data reconstruction process that assembles the fragments in the correct sequence to recreate the original encrypted data. The system uses a structured algorithm to reassemble fragments based on their order and dependency within the threshold-based scheme, ensuring that data is accurately reconstructed without errors. This precise reassembly process is crucial to the reliability of the system, as it guarantees that the original encrypted data is fully recoverable without loss of information. The structured reconstruction algorithm aligns with the system's goal of delivering a secure and accurate data retrieval experience.

This aspect's focus on protecting data fragments at both the storage and retrieval stages ensures comprehensive security for sensitive information in multi-cloud environments. By addressing every step from fragmentation to secure distribution and retrieval, the system provides end-to-end data protection. This comprehensive approach ensures that data remains secure throughout its entire lifecycle, from initial encryption to final access. Each layer of security, from fragment distribution to retrieval access control, collectively reinforces the system's effectiveness in safeguarding data from unauthorized access and compromise.

Overall, this data fragmentation and multi-cloud distribution system represents a significant advancement in data security for distributed storage environments. Through its use of cryptographic fragmentation, multi-cloud distribution, redundancy, and secure access protocols, the system mitigates the risks associated with traditional cloud storage solutions. By allowing organizations to store data securely across multiple providers without exposing it to any single point of failure, this aspect offers a robust, scalable solution for protecting sensitive information in a fragmented, multi-cloud setting.

A further invention provides a secure inter-cloud authentication system that utilizes time-synchronization verification to ensure that user authentication requests across multiple cloud providers are legitimate and protected from replay attacks. This system enables secure access to data stored in distributed cloud environments by implementing a robust mechanism to validate user credentials and timestamps, ensuring that each authentication request is unique to a specific time frame. The system relies on a combination of a time-based one-time password (TOTP) and Network Time Protocol (NTP) synchronization to guarantee that authentication tokens remain valid only within a narrow time window, which enhances security and prevents unauthorized access attempts. This solution is especially beneficial for organizations using multi-cloud storage, as it enables consistent, secure access across different cloud platforms while safeguarding against time-based attacks.

A fundamental feature of this system is the generation of an authentication token that includes a timestamp synchronized with an NTP server. When a user requests access to data in one cloud provider, the system generates a token that incorporates the current timestamp, which is verified by an NTP server to ensure accuracy. This timestamp serves as a temporal marker, providing a strict time window during which the authentication token remains valid. The synchronization with an NTP server allows for high-precision time tracking, ensuring that authentication requests across cloud providers are processed within a securely defined timeframe. By using time-synchronized tokens, the system reduces the risk of authentication misuse or unauthorized replay of valid tokens.

The TOTP is another critical component of this aspect, adding a continuously changing, time-based code to the authentication process. The TOTP, generated for each user, is unique and refreshes every few seconds, typically within a 30- or 60-second window. By including the TOTP in the authentication token, the system further restricts the validity of each request, as the token will no longer be useful once the TOTP changes. This time-sensitive element protects against delayed or replayed authentication attempts, as any previous TOTP will be invalid after the designated time interval. The combination of the TOTP and timestamp creates a robust, multi-dimensional security layer that makes it exceedingly difficult for unauthorized users to replicate a valid authentication request.

The system employs an identity provider (IdP) to facilitate and verify inter-cloud authentication. When a user initiates an access request, this request is sent to the IdP, which manages the authentication process for all participating cloud providers. The IdP generates the authentication token with the synchronized timestamp and TOTP, and then issues this token to the requested cloud provider. The IdP also synchronizes with an NTP server to ensure that all timestamps are accurate and consistent across the network. By centralizing the issuance and verification of tokens, the IdP ensures uniform security standards across multiple cloud services, allowing secure and streamlined inter-cloud access while maintaining high security.

When the requested cloud provider receives the authentication token, it validates the token's timestamp and TOTP against its current time, allowing a small tolerance window, typically a few seconds, to account for network latency. If the timestamp and TOTP match within this predefined window, the cloud provider confirms the legitimacy of the request and grants access to the requested data. This verification process prevents replay attacks, as any attempt to use a token outside its valid time window will result in rejection. The system's reliance on precise time synchronization thus enables cloud providers to authenticate requests confidently, knowing that each token is valid only for a specific time interval and user session.

The use of NTP synchronization across all participating cloud providers ensures that time discrepancies do not interfere with authentication. The system periodically verifies its internal clock with an NTP server, aligning each provider's time settings to prevent authentication errors due to time drift. This synchronized timing forms the backbone of the security protocol, as it ensures that all cloud providers operate within the same time frame. By regularly adjusting clocks to match the NTP server, the system prevents potential security gaps that could arise from time drift, thereby maintaining consistent and accurate timestamp verification across all providers.

The system also includes an error-handling mechanism to address instances of failed synchronization or network delays. In cases where a token validation fails due to slight network delays, the system allows for a brief revalidation period. During this period, the IdP can reissue an updated token with a corrected timestamp, ensuring that users are not mistakenly denied access due to transient connectivity issues. This error-handling process ensures that legitimate users retain access while preventing any abuse of the revalidation mechanism, as each reissued token also incorporates an updated TOTP for additional security.

To further enhance security, this aspect includes multi-factor authentication (MFA) requirements that must be fulfilled before an authentication token is generated. The MFA may include biometric verification, security questions, or device-based authentication, depending on the level of security desired. By incorporating MFA, the system verifies user identity at multiple stages before even allowing the generation of a timestamped token. This layered security approach strengthens the system against unauthorized access attempts by ensuring that each request has been thoroughly vetted before a time-synchronized token is issued. The inclusion of MFA thus complements the time-synchronized verification with an additional level of access control.

The system is designed to support scalability across various cloud providers and high user volumes, making it suitable for large-scale enterprise environments. As more users and cloud services are added to the network, the time-synchronization and token verification processes can be scaled to accommodate increased traffic without compromising security. The use of a centralized IdP simplifies token issuance and validation across multiple providers, enabling efficient inter-cloud authentication at scale. This scalability ensures that the system can adapt to growing multi-cloud environments, meeting the needs of organizations with extensive data storage and access requirements.

Another notable aspect of this invention is its ability to protect sensitive data while maintaining compliance with regulatory requirements. By employing time-synchronized authentication, the system ensures that only valid, authenticated requests can access user data across clouds, thus supporting compliance with privacy regulations. The ability to restrict data access to verified requests within a specific time window aligns with security protocols required under data protection standards. This compliance-focused design ensures that organizations using the system can meet regulatory obligations for secure access control while benefiting from the distributed data advantages of a multi-cloud environment.

This aspect also includes logging and monitoring capabilities, which provide real-time insights into authentication attempts across cloud providers. By tracking each token generation, validation, and access request, the system creates a detailed audit trail that can be reviewed for potential security incidents. These logs capture information about the timestamp, TOTP, and cloud provider involved in each request, enabling administrators to identify and investigate any anomalies or suspicious activity. This real-time monitoring adds an additional layer of security by allowing for proactive threat detection and incident response.

In the event of a detected replay attack or suspicious access pattern, the system can trigger an automated response to lock down access to the affected cloud provider. This response includes notifying administrators of the security threat, blocking further access attempts, and requiring reauthentication from users before access is restored. This automated response mechanism ensures that the system can act swiftly in the face of security threats, reducing the likelihood of unauthorized access. By embedding security intelligence within the authentication process, the system continuously protects against evolving threats in multi-cloud environments.

The inter-cloud authentication system also supports secure data retrieval for applications that require multi-cloud data access, such as analytics platforms and collaborative workspaces. When a user needs to retrieve data from multiple providers simultaneously, the system enables the issuance of a synchronized token that grants temporary, time-limited access across all required providers. This feature simplifies data access across clouds while maintaining rigorous security standards, ensuring that users can efficiently work with data distributed across multiple cloud environments without sacrificing security.

This invention's reliance on time-synchronized verification and TOTP provides a comprehensive defense against time-based and token-replay attacks, which are common threats in multi-cloud systems. By ensuring that each token is valid only for a narrowly defined period, the system greatly reduces the risk of an attacker successfully using a previously intercepted token. The inter-cloud authentication system's integration of NTP synchronization, MFA, and real-time monitoring forms a secure, adaptable solution for authenticating users across distributed cloud providers.

Overall, this inter-cloud authentication with time-sync verification invention enables secure, efficient, and consistent authentication across multiple cloud providers, addressing the unique challenges of multi-cloud environments. By combining time-sensitive tokens, synchronized timestamps, and multi-factor authentication, the system ensures that only legitimate, timely access requests can retrieve data, offering organizations a robust and scalable approach to secure multi-cloud authentication.

Yet another invention integrates generative artificial intelligence (GEN-AI) to enhance and optimize the security of encryption key derivation processes in real time. This system leverages the capabilities of GEN-AI to continuously analyze and adapt the parameters of the key derivation function (KDF), thereby strengthening security and responsiveness to emerging threats. Unlike static key derivation methods, which remain vulnerable to evolving attack strategies, this invention provides a dynamic, AI-driven approach to key generation that detects potential vulnerabilities, adjusts derivation parameters, and reinforces the encryption process as needed. By incorporating AI into the core of the key derivation workflow, this invention enables an intelligent, adaptable response to the complexities of modern security demands.

The GEN-AI integration functions by monitoring system behavior and identifying patterns or anomalies that may indicate security risks. The AI analyzes data inputs from various sources, such as user interactions, environmental factors, and access history, to build a comprehensive picture of system activity. Through this monitoring, GEN-AI can detect deviations from typical patterns that may signal a potential attack, such as unusual access frequencies, atypical locations, or unexpected requests for sensitive data. By identifying these indicators in real time, the system can initiate a protective response, optimizing the key derivation function to counter the detected threat vectors.

A key aspect of this invention is its ability to adjust the KDF parameters based on the real-time analysis provided by GEN-AI. For example, if the AI detects an increase in suspicious access attempts, it may increase the complexity of the key derivation process by altering the number or type of inputs required to generate the encryption key. This could involve adding additional environmental data points or incorporating a more rigorous cryptographic hash algorithm. By dynamically adapting the KDF in response to detected threats, the system makes it significantly more difficult for unauthorized users to predict or replicate the encryption key, thereby reinforcing the system's resistance to attack.

The system also leverages GEN-AI to optimize the efficiency of the key derivation function without compromising security. Through continuous learning, the AI model refines the key derivation process, balancing security with performance by adjusting parameters in line with current risk levels. For routine access in low-risk environments, the AI may streamline the key derivation to reduce processing time, ensuring fast and efficient access. Conversely, in high-risk scenarios, the AI can increase key derivation complexity to reinforce security, adapting the system's behavior to the current threat landscape. This adaptability ensures that the KDF remains resilient while providing an efficient user experience.

Another innovative feature of this invention is the AI's capacity to predict emerging threats based on historical data patterns and external intelligence sources. The AI model is trained on a variety of data sources, including known attack patterns, anomaly types, and trends from cybersecurity research. This training allows the GEN-AI to proactively adjust the KDF in anticipation of potential attack vectors. For instance, if the AI identifies a rise in brute-force attempts within the system or across similar systems, it can preemptively modify the KDF's input complexity or frequency, thwarting potential threats before they manifest. This predictive capability ensures the system is constantly prepared for new and evolving security challenges.

The GEN-AI also improves the system's ability to protect against insider threats, a growing concern in secure data environments. By analyzing access behavior and tracking patterns in user interactions, the AI can detect anomalies that suggest malicious activity originating within the organization. If an insider attempts to bypass security measures or accesses sensitive information without authorization, the GEN-AI can immediately respond by increasing the security thresholds within the KDF or temporarily locking key derivation access. This proactive approach to insider threats helps protect sensitive data by dynamically adjusting security controls based on the user's behavior.

The system's architecture enables the AI model to access a broad array of data sources to inform its decision-making. This data can include biometric inputs, TOTP codes, environmental data, and system logs, all of which are analyzed collectively to assess potential risks. The GEN-AI evaluates these inputs holistically, allowing it to identify subtle correlations between data points that may signify a threat. For example, the AI might detect a correlation between a particular geographic location and a spike in failed access attempts, leading it to adjust the key derivation parameters for that region. By analyzing data from multiple dimensions, the GEN-AI enhances the accuracy and precision of its threat detection capabilities.

A key advantage of this invention is its real-time responsiveness, which allows it to act immediately when a threat is detected. The GEN-AI can instantly modify the KDF process, ensuring that key generation remains secure under changing conditions. This immediacy is critical in high-stakes environments where even a brief lapse in security can result in substantial data exposure. The AI's ability to adjust parameters on the fly allows the system to respond to threats faster than manual intervention, maintaining a consistently high level of data protection across all access points.

The AI-driven adjustments to the KDF also ensure that the system remains resistant to common attack types, such as brute-force and dictionary attacks. By dynamically altering the complexity of the derived key and the required inputs, the GEN-AI makes it more difficult for attackers to predict or reverse-engineer the encryption key. The invention's capacity to change the KDF structure based on real-time security assessments means that attackers would need to overcome constantly shifting parameters, making sustained attacks less effective and significantly improving the system's resilience to computational threats.

To enhance data privacy, this aspect employs secure processing for all AI-driven modifications to the KDF. The GEN-AI operates within a secure execution environment, which safeguards sensitive data inputs, particularly biometric and environmental information, from unauthorized access. This secure environment ensures that no raw data from these sources is exposed during the AI's analysis, thus upholding user privacy and regulatory compliance. The secure execution environment is a critical aspect of the system, ensuring that the GEN-AI's optimization process does not compromise data confidentiality.

This aspect's GEN-AI integration also includes a learning feedback loop that continuously refines its threat detection and optimization capabilities. After each modification to the KDF, the AI monitors the effectiveness of the changes in preventing unauthorized access or mitigating detected threats. This feedback loop allows the GEN-AI to learn from each encounter, improving its ability to respond accurately and efficiently to future threats. Over time, the AI becomes increasingly adept at detecting nuanced patterns and making preemptive adjustments, creating a self-improving security model that grows stronger with each iteration.

The system's design accommodates high scalability, allowing it to handle an expanding volume of data and access requests without sacrificing security. As the AI model's learning capabilities improve, it can efficiently manage large datasets and high-frequency access attempts across complex multi-cloud environments. The scalability of this AI-driven KDF solution ensures that it remains viable for organizations with growing data storage and access needs, adapting seamlessly to increased usage while maintaining high levels of security and performance.

Another benefit of this invention is its compliance with regulatory requirements for data security, especially in sectors where adaptive security is necessary to safeguard sensitive information. The GEN-AI's capability to dynamically adjust the KDF in response to security threats allows organizations to meet stringent compliance standards while reducing the risk of data breaches. The AI's ability to monitor and respond to access attempts ensures that only legitimate, authenticated users can derive encryption keys, thereby protecting sensitive information in line with data privacy regulations. This compliance capability makes this aspect highly suitable for industries with rigorous security mandates.

Furthermore, this aspect's use of AI to continuously improve the key derivation function aligns it with advanced cybersecurity practices, positioning it as a cutting-edge solution in data protection. As AI-driven security becomes increasingly prevalent, this system's integration of GEN-AI for KDF optimization places it at the forefront of encryption technology. The invention's ability to leverage AI for real-time security adjustments and proactive threat prevention sets a new standard for adaptive key management, providing organizations with a modern, resilient approach to securing encrypted data.

Overall, this GEN-AI integration for key derivation optimization delivers a sophisticated, AI-enhanced security solution that continuously adapts to evolving threats. By combining real-time monitoring, predictive analysis, and dynamic adjustments to the KDF, this aspect offers a powerful, intelligent response to the challenges of modern data security. The adaptive, AI-driven approach not only strengthens encryption but also ensures that the system remains highly secure, scalable, and compliant with emerging cybersecurity standards, making it a transformative solution for organizations seeking robust, proactive protection for their encrypted data.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

Regarding a first aspect, in some arrangements, a method for secure, keyless encryption key management in a multi-cloud storage environment includes dynamically generating an encryption key using a deterministic key derivation function (KDF) that combines user-specific biometric markers, a time-based one-time password (TOTP), and real-time environmental data. The KDF produces a unique encryption key for each session. The method also involves encrypting data with this generated encryption key without storing or retaining the key post-encryption, and storing the encrypted data in a multi-cloud storage system by dispersing it across multiple cloud providers to ensure that no single provider has access to all encrypted data fragments. The encryption key is then retrieved on demand by reapplying the KDF using the same biometric, TOTP, and environmental inputs.

In some arrangements, this method further includes securely retrieving the encryption key by reapplying the deterministic KDF at the time of data access, ensuring that the same combination of user-specific biometric markers, TOTP, and real-time environmental data are used to generate an identical encryption key for data decryption.

In some arrangements, the biometric markers used in the KDF are selected from fingerprint scans, facial recognition, and voiceprints, with each marker converted into a cryptographic hash using a secure hashing algorithm before being used in the KDF to provide a unique and non-reversible identifier.

In some arrangements, the TOTP is generated using a unique secret key associated with the user and synchronized with an external Network Time Protocol (NTP) server to maintain a consistent time-based sequence across distributed systems.

In some arrangements, the real-time environmental data includes at least one contextual identifier selected from geographic location, device identifier, IP address, ambient noise level, or any data point specific to the session environment. This environmental data is used to further secure the KDF-generated encryption key by anchoring it in specific environmental conditions.

In some arrangements, the method includes a periodic update process for the TOTP secret to increase security by rotating the secret key on a predefined schedule. This rotation reduces the likelihood of replay attacks and ensures temporal integrity for each generated encryption key.

In some arrangements, the generated encryption key is valid only within a predetermined time window that corresponds to the TOTP cycle. After this time, the encryption key is invalidated and discarded from memory, ensuring it is inaccessible beyond the specific timeframe for which it was generated.

In some arrangements, the method includes verifying the user's identity through multi-factor authentication (MFA) before initiating the KDF-based encryption key generation process. The MFA process includes two or more factors, such as a TOTP, a cryptographic hash of biometric markers, and a passcode or password, adding an additional layer of security to the KDF generation initiation.

In some arrangements, the multi-factor authentication (MFA) process involves combining the TOTP, biometric marker, and password into a compound hash, which is then used as an input to the KDF, ensuring that access is restricted to authenticated users only and preventing unauthorized key generation.

In some arrangements, the KDF process is structured to combine the cryptographic hash of the biometric marker, the TOTP, and real-time environmental data in a specific, sequential order to produce a unique encryption key each time data is accessed. Any variations in the inputs result in a distinct and invalid encryption key.

In some arrangements, the KDF employs cryptographic hashing algorithms, including but not limited to SHA-256, HMAC-SHA-512, or PBKDF2, configured to provide resistance against brute-force and dictionary attacks. This configuration ensures the encryption key's robustness under potential attack conditions.

In some arrangements, the method incorporates device-specific attributes within the real-time environmental data, such as device orientation, operating system version, network type, or model identifiers. This specificity enhances the session-based uniqueness of the encryption key and prevents access from unrecognized devices.

In some arrangements, the encryption key generated by the KDF is used specifically to encrypt or decrypt data fragments. Each data fragment is associated with a unique metadata identifier, so that the encryption key derived for each fragment is uniquely generated based on this metadata and cannot be reused across other fragments.

In some arrangements, the encrypted data is split into multiple fragments using a cryptographic fragmentation method, such as Shamir's Secret Sharing or Reed-Solomon coding. Each fragment is encrypted separately with a KDF-derived key and then stored across multiple cloud providers, ensuring that no single fragment contains sufficient information to reconstruct the original data.

In some arrangements, the method further includes retrieving encrypted data fragments from multiple cloud providers, where the fragments are fetched, combined, and verified to ensure they meet integrity requirements before reconstruction of the original encrypted data proceeds.

In some arrangements, the KDF is reapplied with the identical biometric, TOTP, and environmental data inputs used in initial encryption to regenerate the encryption key for each data fragment. This allows accurate decryption and data reassembly without storing or transmitting the encryption key.

In some arrangements, the method includes an automated logging and audit trail component, which records each instance of encryption key generation, data access, retrieval, and disposal in a secure ledger. This audit trail maintains compliance with data security standards and provides a verifiable access history for regulatory purposes.

In some arrangements, a method for secure keyless encryption key management in a multi-cloud storage environment includes utilizing a user device to initiate a request for data encryption by receiving authentication credentials from a user, where these credentials include a biometric marker, a time-based one-time password (TOTP), and user-specific real-time environmental data. The method involves generating, by a multi-factor authentication (MFA) module, a compound hash from the biometric marker, TOTP, and environmental data to verify the user's identity. Here, the biometric marker is processed into a cryptographic hash via a secure hashing algorithm, the TOTP is generated using a secret key associated with the user, and the environmental data includes at least one data point selected from geographic location, device identifier, IP address, and ambient noise level. This compound hash is used by a deterministic key derivation function (KDF) module within a secure processing environment on the user device to produce an encryption key dynamically on demand, based on the verified user-specific inputs. This encryption key is valid only within a predefined time window that corresponds to the TOTP cycle and is discarded immediately after the completion of data encryption. The method further includes encrypting data designated for storage using the dynamically generated encryption key without storing or retaining it post-encryption. The encrypted data is then split by a data fragmentation module on the user device into multiple data fragments based on a cryptographic fragmentation method, such as Shamir's Secret Sharing or Reed-Solomon coding, with each fragment containing only partial information insufficient to reconstruct the original data individually. The encrypted data fragments are distributed across multiple cloud storage providers, with each fragment stored with a distinct provider to ensure that no single provider has access to all fragments needed to reconstruct the original encrypted data. A secure communication module transmits the encrypted data fragments to the respective cloud storage providers over a secure communication channel using a protocol, such as HTTPS or TLS, where the channel is validated before transmission to prevent interception or tampering. Upon receiving a data access request, a data retrieval module retrieves the required number of encrypted fragments from the multiple cloud storage providers and reconstructs the original encrypted data by combining the retrieved fragments. The reconstruction process is verified to meet integrity requirements, ensuring all fragments are present and unaltered. The KDF module then regenerates the encryption key on demand for decrypting the reconstructed encrypted data by reapplying the same KDF with the original biometric marker, TOTP, and environmental data. A decryption module on the user device decrypts the reconstructed encrypted data using the regenerated encryption key, which is immediately discarded after decryption to prevent retention. This method also includes an automated audit module that logs and tracks each instance of encryption key generation, data access, data retrieval, and encryption key disposal in a secure ledger, providing a verifiable audit trail for compliance with data security standards. The secure ledger includes metadata on the timing, method, and user identity for each key generation and data access event. Additionally, the MFA module periodically updates the TOTP secret key according to a preconfigured schedule to enhance security and reduce the potential for replay attacks by generating subsequent encryption keys with a new TOTP sequence. The KDF module further incorporates real-time device-specific attributes within the environmental data, such as device orientation, network connection type, and device model, making the encryption key uniquely tied to the session and device. This ensures that only authenticated users operating in the correct context can regenerate the encryption key. A security policy module implements MFA at the key generation process's initiation, requiring successful validation of the compound hash from the TOTP, biometric marker, and password before the KDF can generate the encryption key. The KDF module configures the cryptographic hashing algorithm to resist brute-force and dictionary attacks, using algorithms like SHA-256, HMAC-SHA-512, or PBKDF2 to ensure robustness against unauthorized attempts to replicate or reverse-engineer the key. Lastly, a data integrity module maintains redundancy and integrity verification for each data fragment across the multiple cloud storage providers, monitoring the accessibility of each fragment and initiating a secure retrieval protocol to fetch a fragment from an alternative cloud provider in case of data loss or corruption, thereby ensuring high availability and security across the multi-cloud storage environment.

In some arrangements, a method for secure keyless encryption key management in a multi-cloud storage environment includes using a user device to initiate a request for data encryption by receiving authentication credentials, where these credentials include a biometric marker, TOTP, and real-time environmental data. A multi-factor authentication (MFA) module generates a compound hash from the biometric marker, TOTP, and environmental data to verify the user's identity, wherein the biometric marker is processed into a cryptographic hash via a secure hashing algorithm, the TOTP is generated using a user-specific secret key, and the environmental data includes at least one data point selected from geographic location, device identifier, IP address, and ambient noise level. This hash enables a deterministic key derivation function (KDF) module within a secure environment on the user device to produce an encryption key dynamically, valid only within a defined TOTP time window, and discarded immediately after data encryption. An encryption module on the user device uses the dynamically generated encryption key to encrypt data without storing it post-encryption. A data fragmentation module splits the encrypted data into multiple fragments based on a cryptographic fragmentation method, with each fragment only containing partial information. The fragments are distributed across multiple cloud storage providers, with each stored with a distinct provider, ensuring no provider has access to all fragments. A secure communication module transmits each fragment over a secure communication channel, such as HTTPS or TLS. Upon receiving a data access request, a data retrieval module retrieves the necessary data fragments from the cloud providers and verifies them before reconstruction. The KDF module regenerates the encryption key on demand using the original authentication inputs. A decryption module decrypts the data, discarding the encryption key after use. The method includes an automated audit module logging each encryption key generation, data access, and disposal event in a secure ledger for compliance and regulatory tracking. The MFA module periodically updates the TOTP secret key to prevent replay attacks. The KDF module incorporates session-specific environmental data, such as device orientation, network type, and model, ensuring unique key generation. A security policy module enforces MFA validation prior to KDF initiation, and the KDF module uses cryptographic hashing algorithms to provide attack resistance. A data integrity module monitors and verifies data fragment integrity across cloud providers, initiating a retrieval protocol from alternative providers in case of data loss.

In some arrangements, a system for secure, keyless encryption key management and data storage across a multi-cloud environment includes a user device configured to initiate encryption processes by receiving authentication credentials from a user, where these credentials include a biometric identifier, TOTP, and session-specific environmental data, all necessary for generating a unique encryption key without storing it. The system includes a multi-factor authentication (MFA) module operatively connected to the user device, validating user identity through multiple verification factors, including converting the biometric identifier into a cryptographic hash to secure it from exposure, generating the TOTP with a unique user-specific secret key synchronized with an external NTP server, and verifying environmental data to match predefined security criteria. The system further includes a deterministic key derivation function (KDF) module within a secure processing environment, dynamically generating an encryption key based on the validated authentication credentials. This KDF combines the cryptographic hash, TOTP, and environmental data to create a session-unique encryption key, adapts the key parameters based on session conditions, and discards it after use. An encryption module on the user device encrypts data using the generated encryption key without storing it, while a data fragmentation module splits the encrypted data into fragments based on a cryptographic fragmentation method, ensuring each fragment is insufficient to reconstruct the original data. The system includes a multi-cloud distribution module to assign and transmit each fragment to unique cloud providers, reducing the risk of unauthorized access. A secure communication module transmits each fragment over validated channels, such as TLS or HTTPS. A data retrieval module on the user device retrieves necessary fragments and verifies their integrity before reassembly. A reconstruction module reconstructs the data using the original fragmentation method, while the KDF module regenerates the encryption key for decryption using the original authentication inputs. A decryption module on the user device decrypts the data and discards the encryption key immediately after use. The system includes an automated audit module logging encryption key generation, access, and disposal in a secure ledger for compliance. An MFA updating module periodically updates the TOTP secret key, while the KDF module includes session-specific attributes, such as device orientation and network type, to prevent unauthorized device access. A security policy module enforces MFA before KDF initiation, and the KDF module uses secure hashing algorithms to resist attacks. A data integrity module ensures fragment integrity and initiates alternative retrievals if any fragment becomes inaccessible.

Regarding a second aspect, in some arrangements, a method for secure data fragmentation and distribution across multiple cloud storage providers includes receiving a data object for storage by a data ingestion module, where the data object contains sensitive information requiring encryption and secure distribution. The method further includes encrypting the data object with an encryption module using a dynamically generated encryption key derived on demand through a deterministic key derivation function (KDF) that combines user-specific authentication factors and real-time environmental data. This encrypted data object is then split by a fragmentation module into distinct data fragments, each fragment containing only a portion of the encrypted data object, ensuring that no single fragment is sufficient to reconstruct the original encrypted data. A cloud provider selection module selects a plurality of cloud storage providers based on predetermined security criteria, with each selected provider having distinct infrastructure and policies to prevent single-point failure and unauthorized access. The method continues with a distribution module that disperses these fragments across the selected cloud storage providers, ensuring that each fragment is stored with a unique provider, making it impossible for any single provider to access all fragments necessary for data reconstruction. A secure communication module transmits each data fragment to its designated cloud provider over a secure communication channel, protected by a protocol such as HTTPS or TLS to ensure data integrity during transmission. Additionally, a data access control module enforces access restrictions on each cloud provider, ensuring that only authorized users or systems can request data fragments, thereby preventing unauthorized access. A data integrity module monitors the availability and integrity of each data fragment stored across the cloud providers, performing periodic checks to verify that each fragment remains unaltered and accessible. Upon receiving a request for data access, a data retrieval module retrieves the required number of fragments from the multiple cloud providers, ensuring that each retrieved fragment meets integrity requirements prior to reassembly. A reconstruction module then reconstructs the original encrypted data object from the retrieved fragments using a fragment reassembly algorithm, such as Shamir's Secret Sharing or Reed-Solomon coding, to confirm that a sufficient number of fragments is available for accurate reassembly. Lastly, the encryption key is regenerated on demand by the encryption module by reapplying the KDF with the same user-specific and environmental inputs used during the initial encryption, ensuring secure data access without retaining or transmitting the encryption key. A decryption module then decrypts the reconstructed data object with the regenerated encryption key, discarding the key immediately after decryption to prevent key retention.

In some arrangements, this method further configures the fragmentation module to determine the optimal number and size of data fragments based on the sensitivity of the data object, with more sensitive data fragmented into a greater number of fragments to enhance security.

In some arrangements, the cloud provider selection module selects cloud providers from different geographic regions to reduce the risk of localized breaches or access by unauthorized regional entities.

In some arrangements, each cloud provider is assigned a security rating based on factors such as encryption protocols, infrastructure integrity, compliance certifications, and historical security incidents.

In some arrangements, the distribution module selects a different cloud provider for each fragment in a randomized order, reducing predictability and making targeting by malicious actors more difficult.

In some arrangements, each data fragment is uniquely encrypted with a fragment-specific encryption key generated by the KDF, ensuring that each fragment's encryption key is distinct and unusable for decrypting other fragments.

In some arrangements, the secure communication module verifies the security of each transmission channel before initiating fragment transfer, utilizing verification protocols such as SSL and VPNs.

In some arrangements, the data access control module employs multi-factor authentication (MFA) for fragment access requests, requiring users to authenticate with at least two factors, including password, biometric data, or time-based tokens.

In some arrangements, each instance of data fragment access, retrieval, and deletion is logged by the data access control module in a secure, immutable ledger, providing a detailed audit trail for compliance with data security standards.

In some arrangements, the data integrity module performs integrity checks using cryptographic hashes, ensuring that each data fragment's integrity is preserved and detecting any tampering.

In some arrangements, the data retrieval module activates a failover protocol in the event of a retrieval failure, allowing access to redundant copies of missing fragments from alternate cloud providers.

In some arrangements, the reconstruction module verifies that all retrieved fragments meet specified reassembly thresholds and initiates an alert if any fragment fails verification.

In some arrangements, the reconstruction module only reassembles the data object if all retrieved fragments meet integrity and accessibility requirements, preventing unauthorized or incomplete reassembly.

In some arrangements, the KDF used to regenerate the encryption key for decryption incorporates additional session-based parameters to further secure the regenerated key against unauthorized reuse.

In some arrangements, the KDF dynamically adjusts key derivation parameters based on the data object's security sensitivity, including increasing hash iterations or adding entropy for higher-security data.

In some arrangements, the TOTP secret key within the KDF is updated periodically to ensure temporal security for each new encryption key, preventing key reuse across sessions.

In some arrangements, the decryption module includes a timeout mechanism whereby the regenerated encryption key is valid only for a limited time during the decryption process, after which the key is automatically discarded.

In some arrangements, the data retrieval module records each retrieval request in an event log, capturing details such as user identity, time, and fragment identifiers to facilitate monitoring and improve accountability in data access events.

In some arrangements, a method for secure data fragmentation, encryption, and distribution across multiple cloud storage providers includes receiving a data object containing sensitive information for storage by a data ingestion module, which processes the data object to prepare it for encryption and secure distribution across multiple storage environments. The method further involves generating, by an encryption key derivation module, an encryption key dynamically on demand using a deterministic key derivation function (KDF). This KDF generates the encryption key based on a combination of user-specific authentication factors, such as biometric data, a time-based one-time password (TOTP), and real-time environmental data specific to the data session. Next, an encryption module encrypts the data object using this dynamically generated encryption key, with the encryption key valid only within a predefined time window and discarded immediately after encryption, ensuring that the key is neither stored nor retained post-encryption. Following encryption, a fragmentation module splits the encrypted data object into multiple distinct data fragments using a cryptographic fragmentation method, such as Shamir's Secret Sharing or Reed-Solomon coding. Each fragment contains only a portion of the encrypted data, so no single fragment can independently reconstruct the original data object. A sensitivity assessment module determines the number and size of data fragments required based on the data object's sensitivity level, where highly sensitive data is fragmented into a greater number of fragments to enhance security.

In some arrangements, a cloud provider selection module selects multiple cloud storage providers based on predefined security criteria, with each selected provider having distinct infrastructure, compliance certifications, and security protocols to minimize single-point failure risks and unauthorized access. Each selected cloud provider is assigned a security rating based on factors such as encryption capabilities, incident history, and regional compliance requirements. Providers with diverse ratings are chosen to optimize security distribution. A distribution module then distributes the encrypted data fragments across the selected cloud providers in a randomized order, ensuring each fragment is stored with a unique provider to reduce predictability and the likelihood of targeted attacks by malicious actors. A secure communication module transmits each data fragment to its designated cloud provider over a validated, secure communication channel, protected by protocols such as HTTPS or TLS to ensure data integrity and confidentiality during transmission.

In some arrangements, a data access control module enforces multi-factor authentication (MFA) for accessing each data fragment, requiring users to authenticate using at least two factors such as a password, biometric data, or time-based token, to prevent unauthorized access. A data audit module logs each instance of data fragment access, retrieval, and deletion in an immutable ledger, with each log entry recording the timestamp, user identity, and specific fragment identifiers, providing a detailed audit trail for compliance with data security standards. A data integrity module monitors each data fragment's availability and integrity across cloud providers, performing periodic cryptographic hash checks on each fragment to ensure all fragments remain unaltered and accessible, with an alert initiated if any fragment fails integrity verification. If a retrieval failure occurs, a failover protocol is activated by the data retrieval module, accessing an alternative cloud provider to obtain a redundant copy of the missing fragment, thereby ensuring high data availability.

In some arrangements, the data retrieval module retrieves the required number of data fragments from multiple cloud storage providers upon receiving a data access request, verifying that each fragment meets integrity requirements before reassembly. A reconstruction module then reassembles the original encrypted data object from the retrieved fragments using a reassembly algorithm, such as Shamir's Secret Sharing or Reed-Solomon coding, verifying that a sufficient number of fragments is available for accurate reassembly. The encryption key is then regenerated by the encryption key derivation module on demand using the same KDF and the identical user-specific biometric, TOTP, and environmental inputs used during initial encryption, ensuring secure access to the reconstructed data without retaining or transmitting the encryption key. The reconstructed data object is decrypted by a decryption module using the regenerated encryption key, which is discarded immediately after decryption to prevent retention.

In some arrangements, the KDF module incorporates additional real-time session-specific parameters in the key derivation process, such as device orientation, network type, and device model, further anchoring the encryption key to the specific session and device to prevent unauthorized devices from replicating the key. The KDF module periodically updates the TOTP secret key based on a predefined schedule, ensuring each encryption key generated for new data sessions is unique, thereby preventing key reuse and enhancing temporal security. A data availability module maintains redundant copies of select data fragments across multiple cloud providers to improve data resilience and availability in the event of an outage or service interruption with one provider. A security policy module enforces a timeout mechanism during the decryption process, where the regenerated encryption key is valid only for a limited time, after which it is automatically discarded to prevent reuse or retention beyond the decryption session. Lastly, an event logging module records each data retrieval request, including user identity, timestamp, and fragment identifiers, in a secure event log to facilitate monitoring and enhance accountability in data access events.

In some arrangements, a system for secure data fragmentation, encryption, and distribution across multiple cloud storage providers includes a data ingestion module configured to receive and process a data object containing sensitive information, preparing it for encryption and secure fragmentation prior to multi-cloud storage. The system includes an encryption key derivation module configured to dynamically generate an encryption key using a deterministic key derivation function (KDF), wherein the KDF produces an encryption key based on a combination of user-specific factors, including biometric data, TOTP, and real-time environmental data, ensuring the encryption key is unique to each session and not retained post-encryption. An encryption module encrypts the data object using this KDF-derived encryption key, without storing or retaining the key, enhancing security and reducing risks of unauthorized access. A fragmentation module, connected to the encryption module, splits the encrypted data object into multiple data fragments using a cryptographic fragmentation method, such as Shamir's Secret Sharing or Reed-Solomon coding, ensuring each fragment is only a partial part of the encrypted data and cannot independently reconstruct it.

In some arrangements, a sensitivity assessment module determines the number and size of fragments based on the data object's sensitivity, where more sensitive data is fragmented into more fragments for enhanced security. A cloud provider selection module selects cloud storage providers based on predefined security criteria, including each provider's infrastructure integrity, security protocols, regional compliance certifications, and historical incident rates, thereby reducing single-point failure risks. A multi-cloud distribution module assigns each data fragment to a distinct cloud provider in a randomized order, preventing any single provider from holding all fragments necessary for reconstruction and mitigating unauthorized access by distributing fragments across separate environments. A secure communication module transmits each fragment to its designated cloud provider over a validated communication channel, secured by protocols like TLS or HTTPS for data integrity and confidentiality.

In some arrangements, a data access control module enforces access restrictions for each data fragment, requiring multi-factor authentication (MFA) for any user or system attempting fragment access, preventing unauthorized access to fragmented data. A data integrity module monitors each fragment's availability and integrity across cloud providers, performing periodic checks using cryptographic hashes to ensure each fragment remains unaltered. In the event of a retrieval failure, a failover protocol module within the data integrity module initiates an alternative retrieval process, accessing a redundant fragment copy from another cloud provider to ensure high availability. A data retrieval module retrieves the required data fragments for access requests, verifying integrity before reassembly.

In some arrangements, a reconstruction module reassembles the encrypted data object using the verified fragments and the original cryptographic reassembly algorithm. A key regeneration module, connected to the KDF module, regenerates the encryption key for decryption by reapplying the KDF with the original biometric data, TOTP, and environmental inputs used during encryption, securing data access without storing the key. A decryption module decrypts the reassembled data, discarding the encryption key immediately after use. A logging and audit module records instances of fragment access, retrieval, and encryption key generation in an immutable ledger, ensuring a verifiable audit trail for regulatory compliance. An MFA updating module periodically updates the TOTP secret key to prevent replay attacks, while a security policy module enforces MFA requirements for initial data access and fragment access requests. A redundancy management module replicates select fragments across providers to maintain data availability. A fragment integrity validation module checks each retrieved fragment's integrity before reassembly, while a compliance and monitoring module provides continuous oversight of access patterns, availability, and encryption key usage, generating alerts for unauthorized access attempts.

Regarding a third aspect, in some arrangements, a method for secure inter-cloud authentication with time-sync verification controls access to data stored across multiple cloud providers by initiating an access request from a user device to a primary cloud service, where the access request includes user authentication credentials and specifies data located across at least two cloud providers. The user device transmits these authentication credentials to an identity provider (IdP) responsible for managing inter-cloud authentication across the multiple providers. The credentials include a biometric identifier, a password, and a time-based one-time password (TOTP) dynamically generated for the user. The identity provider (IdP) generates an authentication token that incorporates a timestamp synchronized with a Network Time Protocol (NTP) server, with the timestamp serving as a temporal marker to validate the request's freshness and prevent replay attacks. The IdP verifies the timestamp by comparing the system time with the NTP server time to ensure that the authentication token is generated within a predefined time window aligned with the server time. The IdP embeds the TOTP and timestamp within the authentication token, where the TOTP is generated using a user-specific secret key and is refreshed at predefined intervals to provide a time-sensitive component to the token. The IdP then issues this authentication token to the primary cloud provider, with the token containing the user's credentials, synchronized timestamp, and TOTP, valid only within a specific time window.

In some arrangements, the primary cloud provider forwards the authentication token to a secondary cloud provider specified in the access request. The secondary cloud provider independently validates the authentication token's timestamp and TOTP components. To validate the token, the secondary cloud provider checks the timestamp, confirming it falls within an acceptable range relative to the secondary provider's synchronized system time, as verified by the NTP server. This validation confirms that the request is recent and legitimate. The secondary cloud provider also verifies the TOTP embedded in the token to ensure it matches the expected TOTP based on the user's secret key, confirming the identity of the requesting user and the request's integrity. Access to the requested data is granted upon successful validation of the timestamp and TOTP, with access restricted if the token is expired, tampered with, or otherwise invalid. An inter-cloud communication module implements secure communication channels between the primary cloud provider, secondary cloud provider, and identity provider, where each channel is protected by a protocol such as TLS or HTTPS to ensure data integrity and confidentiality during transmission.

In some arrangements, a monitoring and audit module logs each instance of authentication token generation, validation, and access request in a secure, immutable ledger. Each log entry records the user identity, timestamp, token validity, and outcome of the authentication process for data security compliance. A token expiration module enforces a time-based expiration on each authentication token, ensuring tokens are valid only within a limited time window and discarded after expiration to prevent unauthorized reuse. The identity provider (IdP) reissues an updated authentication token if a time discrepancy or authentication failure occurs due to minor network delays. This reissued token includes an adjusted timestamp and refreshed TOTP, synchronizing with cloud providers' system times to prevent legitimate access denials. The method also requires additional verification factors in the authentication token generation process through a multi-factor authentication (MFA) module, including at least two of the following: biometric data, a user password, and a device-based verification, enhancing identity validation before issuing the token. If suspicious patterns or anomalies in access requests are detected, a threat detection module within the identity provider initiates an automated response, including temporarily locking access to affected cloud providers, notifying administrators, and requiring reauthentication to mitigate potential security threats.

In some arrangements, the identity provider (IdP) further includes a biometric processing module that converts the biometric identifier into a cryptographic hash before embedding it within the authentication token, ensuring that sensitive biometric data is securely processed and protected from direct exposure.

In some arrangements, the timestamp in the authentication token is periodically recalibrated by the IdP based on data from multiple NTP servers, ensuring accurate synchronization and reducing the risk of discrepancies due to network delays.

In some arrangements, the IdP applies a tolerance range to the timestamp comparison with the NTP server, accounting for minor time variations across the primary and secondary cloud providers to prevent legitimate access denial.

In some arrangements, the authentication token is embedded with metadata specifying the expiration time, the identity of the requesting user, and the originating cloud provider, enabling the secondary cloud provider to verify the origin and intended purpose of the access request.

In some arrangements, the method includes a token validation module within the secondary cloud provider, configured to check for token duplication or replay by comparing each received token with a stored list of recently validated tokens and rejecting any token matching a previously accepted one.

In some arrangements, the TOTP included in the authentication token is refreshed at intervals shorter than the typical NTP synchronization period, adding a layer of time-sensitive security to prevent attackers from intercepting and reusing tokens.

In some arrangements, the TOTP generation relies on the user's secret key and real-time environmental data specific to the user's device, such as geographic location, IP address, or device identifier, creating a unique and context-aware authentication factor.

In some arrangements, the multi-factor authentication (MFA) module is configured to prioritize biometric authentication as a primary factor, requiring the user's biometric data before generating the authentication token to enhance security for sensitive data access.

In some arrangements, the inter-cloud communication module encrypts each data transmission between the identity provider, primary cloud provider, and secondary cloud provider using an end-to-end encryption protocol, such as AES-256 or RSA-2048, to ensure the confidentiality of the authentication token.

In some arrangements, the monitoring and audit module records additional data, including the user's device details, IP address, and session duration, creating a comprehensive audit trail for post-event analysis and regulatory compliance.

In some arrangements, the token expiration module adjusts the expiration period based on risk levels associated with the requested data, assigning shorter expiration times to higher-risk access requests to enhance security.

In some arrangements, the reissuing module automatically notifies the user device if an updated token is generated due to detected time discrepancies, prompting the user to reinitiate the authentication process with the reissued token.

In some arrangements, the MFA module incorporates device-based authentication by verifying the device's unique hardware identifier and matching it with previously registered devices to ensure the request is made from an authorized device.

In some arrangements, a behavioral analysis module within the IdP monitors access patterns. If it detects anomalies in access frequency, location, or device usage, it triggers additional authentication steps or alerts to prevent unauthorized access.

In some arrangements, the threat detection module employs machine learning algorithms to detect patterns consistent with security threats, enabling real-time adjustments to authentication protocols based on detected risk factors.

In some arrangements, an emergency response module disables token issuance for affected user accounts and notifies administrators for immediate review and intervention upon detecting a significant security threat.

In some arrangements, the identity provider (IdP) limits the number of authentication token requests per user within a specified time frame, reducing the likelihood of brute-force attacks on the inter-cloud authentication system.

In some arrangements, a method for secure inter-cloud authentication with time-sync verification controls access to data stored across multiple cloud providers by initiating an access request from a user device to a primary cloud service. The access request includes user authentication credentials specifying data located across at least two cloud providers. The user device transmits these credentials to an identity provider (IdP) responsible for managing inter-cloud authentication. The credentials include a biometric identifier, a password, and a time-based one-time password (TOTP) dynamically generated for the user. A biometric processing module within the IdP converts the biometric identifier into a cryptographic hash, which is embedded within the authentication token to enhance biometric data security and prevent direct exposure. The IdP then generates an authentication token that incorporates a synchronized timestamp verified with a Network Time Protocol (NTP) server, serving as a temporal marker to validate the freshness of the request and prevent replay attacks. The IdP verifies the timestamp by comparing it with the NTP server time and applying a predefined tolerance range to accommodate minor discrepancies between the primary and secondary cloud providers' system times.

In some arrangements, the IdP embeds the TOTP and synchronized timestamp within the authentication token. The TOTP is generated using a unique user secret key and is refreshed at predefined intervals, adding a time-sensitive component to the authentication token. The IdP also associates metadata with the token, including an expiration time, user identity, originating cloud provider, and TOTP validity period, ensuring the token is uniquely identifiable and limited in scope. The IdP issues the authentication token to the primary cloud provider, making it valid only within a specific time window and protected by time-based expiration. The primary cloud provider forwards the token to a secondary cloud provider specified in the access request, with the secondary cloud provider configured to validate the token independently.

In some arrangements, a token validation module within the secondary cloud provider validates the authentication token by verifying the timestamp, ensuring it falls within an acceptable range relative to the secondary cloud provider's synchronized system time, thereby confirming the request's recency and legitimacy. The secondary cloud provider compares the TOTP embedded in the token with the expected TOTP generated using the user's unique secret key, ensuring that the token originates from the authenticated user and has not been tampered with. The token validation module also performs a duplication check by cross-referencing the token with recently validated tokens and rejecting any token matching a previously accepted one to prevent replay attacks. Upon successful validation of the timestamp, TOTP, and duplication check, the secondary cloud provider grants access to the requested data, denying access if any component fails verification. An inter-cloud communication module establishes secure communication channels between the primary cloud provider, secondary cloud provider, and IdP, with each channel protected by a protocol such as TLS or HTTPS, ensuring data integrity and confidentiality during inter-cloud transmission.

In some arrangements, a monitoring and audit module records each instance of authentication token generation, validation, and access request in a secure, immutable ledger. Each log entry includes the timestamp, user identity, device details, IP address, token validity, and outcome of the authentication process, providing an audit trail for regulatory compliance. A token expiration module within the IdP enforces a time-based expiration on each authentication token, adjusting the expiration period based on the risk level of the requested data, with shorter expiration times applied to higher-risk data requests. If a time discrepancy or minor network delay is detected, a reissuing module within the IdP generates an updated authentication token with an adjusted timestamp and refreshed TOTP, ensuring that legitimate access requests are not denied due to transient synchronization issues.

In some arrangements, the IdP's multi-factor authentication (MFA) module requires additional verification factors in the authentication process, including at least two of the following: biometric data, password, and device-based verification, ensuring robust user identity verification. A device-based authentication module within the IdP verifies the user's device-specific identifiers, including a unique hardware identifier, matching them against previously registered devices to restrict access to authorized devices. A behavioral analysis module within the IdP monitors access patterns and detects anomalies in user location, frequency, or device usage, where such anomalies trigger additional verification steps or alerts to prevent unauthorized access.

In some arrangements, a threat detection module within the IdP identifies security threat patterns using machine learning algorithms, dynamically adjusting authentication protocols based on detected risks. An emergency response module within the IdP initiates a security lockdown upon detecting a significant threat, temporarily disabling token issuance for affected accounts and notifying system administrators to prevent unauthorized access. A rate-limiting module within the IdP limits the number of authentication token requests per user within a specified time frame, reducing the likelihood of brute-force or token enumeration attacks on the inter-cloud authentication system. The reissuing module also notifies the user device when an updated token is issued, prompting the user to reinitiate the authentication process using the reissued token to ensure seamless access despite transient timing discrepancies.

In some arrangements, a system for secure inter-cloud authentication with time-sync verification controls access to data distributed across multiple cloud storage providers. The system includes a user device configured to initiate an access request for data stored across multiple cloud providers, with the access request containing user authentication credentials, including a biometric identifier, password, and TOTP, to generate a unique, session-specific authentication token. The system also includes an identity provider (IdP) operatively connected to the user device, managing inter-cloud authentication, where the IdP receives the authentication credentials from the user device, processes the biometric identifier into a cryptographic hash to prevent exposure of the user's biometric data, generates the TOTP using a user-specific secret key synchronized with an NTP server, and produces an authentication token that integrates the cryptographic hash, TOTP, and a timestamp verified against the NTP server.

In some arrangements, a timestamp validation module within the IdP compares the timestamp in the authentication token with the synchronized NTP server time, applying a predefined tolerance range to account for minor time discrepancies across cloud providers, ensuring that the token is generated within a valid time window. A token embedding module within the IdP embeds the TOTP, cryptographic hash, and timestamp within the authentication token, making it unique to the session and preventing replay attacks by setting a limited validity period. A primary cloud provider receives the token from the IdP and forwards it to a secondary cloud provider specified in the access request, with the primary provider acting as an intermediary to validate the inter-cloud access attempt.

In some arrangements, a token validation module within the secondary cloud provider validates the authentication token by confirming that the timestamp falls within an acceptable range relative to the NTP server time. The module then verifies the TOTP in the token using the user's secret key to confirm the request's authenticity and cross-checks the token against a list of recently validated tokens to prevent duplication or replay attacks. An access control module within the secondary cloud provider grants or denies access to the requested data based on the successful validation of the timestamp, TOTP, and uniqueness of the token, denying access if any component fails verification. An inter-cloud communication module operatively connects the IdP, primary cloud provider, and secondary cloud provider, establishing secure channels protected by a protocol like TLS or HTTPS, ensuring data integrity and confidentiality during the inter-cloud authentication process.

In some arrangements, a monitoring and audit module within the IdP records each instance of token generation, validation, and access request in a secure, immutable ledger, where each log entry includes the timestamp, user identity, token validity, access outcome, and device details, providing a verifiable audit trail for regulatory compliance. A token expiration module enforces a time-based expiration on each authentication token, setting tokens to expire within a preconfigured window and invalidating them after expiration to prevent unauthorized reuse. If minor synchronization discrepancies are detected, a reissuing module within the IdP generates an updated token with an adjusted timestamp and refreshed TOTP to prevent disruption of legitimate access requests due to network delays.

In some arrangements, an MFA module within the IdP requires multiple verification factors before token generation, including a combination of biometric data, password, and device-specific identifier, enhancing security by ensuring access is restricted to verified users. A device-based authentication module within the MFA module verifies the user device's unique hardware identifier against registered identifiers to confirm that the access request originates from an authorized device. A behavioral analysis module within the IdP monitors access patterns and identifies anomalies, where detected anomalies, such as unusual access frequency, location discrepancies, or device changes, trigger additional authentication steps or alerts to prevent unauthorized access. A threat detection module within the IdP uses machine learning to detect patterns indicating security threats, dynamically adjusting authentication protocols, including modifying token expiration periods and requiring additional security factors in response to detected risks.

In some arrangements, an emergency response module within the IdP disables token issuance and notifies administrators upon detecting significant security threats, such as recurring access anomalies or attempted replay attacks, enabling immediate intervention and review of security settings. A rate-limiting module within the IdP restricts the number of token requests per user within a predefined time frame, reducing the likelihood of brute-force or token enumeration attacks. A token notification module within the reissuing module notifies the user device when an updated authentication token is issued, prompting the user to reinitiate authentication with the refreshed token. Lastly, a compliance and monitoring module within the IdP continuously oversees access patterns, token issuance frequency, and token validation events across cloud providers, generating real-time alerts for administrators when unauthorized access attempts are detected, ensuring ongoing compliance with data security regulations and best practices.

Regarding a fourth aspect, in some arrangements, a method for optimizing encryption key derivation using generative artificial intelligence (GEN-AI) in a secure data storage environment includes monitoring system behavior and user access patterns within the environment through a GEN-AI model. This model continuously evaluates inputs, such as user interactions, environmental data, and access history, to detect potential security risks. The GEN-AI model identifies anomalous or high-risk access attempts based on patterns deviating from normal system behavior, where deviations in user location, access frequency, or data sensitivity trigger enhanced security measures. A key derivation function (KDF) optimization module, controlled by the GEN-AI model, adjusts the KDF parameters based on the detected security risk level, dynamically incorporating additional complexity for high-risk scenarios by increasing iterations, introducing additional cryptographic entropy, or integrating supplementary authentication factors.

In some arrangements, the KDF optimization module generates a session-specific encryption key based on the dynamically adjusted KDF parameters, producing a key unique to the access session and tailored to the risk level detected. An encryption module then encrypts the requested data object using the session-specific encryption key, without storing the key post-use to prevent unauthorized reuse. The secure storage module stores the encrypted data object across a multi-cloud environment, fragmenting and distributing it across multiple cloud providers to enhance security and availability. The GEN-AI model continuously refines the KDF optimization process through a feedback loop, evaluating the effectiveness of each adjustment in preventing unauthorized access or mitigating threats, thus improving key generation accuracy and adapting to emerging risks. The GEN-AI model periodically recalibrates KDF parameters based on evolving threat intelligence, integrating external data sources, such as known attack patterns and cybersecurity research, to proactively adjust key derivation complexity in response to anticipated security challenges. The GEN-AI model also adapts the KDF optimization process to real-time security conditions in the environment, where system-wide security alerts trigger immediate adjustments to KDF parameters, including cryptographic hash algorithm alterations, entropy source modifications, and TOTP interval revisions, based on the threat landscape. A KDF validation module validates each session-specific encryption key generated by the GEN-AI model, ensuring it meets security standards and resists brute-force and dictionary attacks. A key disposal module discards the session-specific encryption key immediately after use without retaining it in memory or storage, preventing unauthorized access in subsequent sessions.

In some arrangements, the GEN-AI model further incorporates user biometric data as an additional parameter in the KDF optimization process, enhancing key specificity by combining biometric factors with environmental and session-specific data.

In some arrangements, the GEN-AI model adjusts the TOTP intervals used in the KDF based on real-time threat detection, applying shorter intervals for high-risk sessions to prevent key reuse and unauthorized access.

In some arrangements, a threat assessment module within the GEN-AI model ranks access requests by risk level, assigning higher complexity levels to the KDF for access attempts classified as high-risk based on factors such as location anomalies and access frequency.

In some arrangements, the KDF optimization module increases the cryptographic hash algorithm's iterations to a predefined threshold in response to high-risk access, thereby enhancing resistance to brute-force attacks for sensitive data objects.

In some arrangements, the GEN-AI model dynamically integrates entropy sources into the KDF based on environmental context, including device type, operating system version, and network attributes, creating a unique encryption key for each session based on these inputs.

In some arrangements, an anomaly detection module within the GEN-AI model learns from previous access patterns, where detected anomalies trigger the addition of new environmental parameters in the KDF to increase key generation specificity.

In some arrangements, the GEN-AI model recognizes behavioral patterns indicating insider threats, where such patterns prompt an increase in KDF complexity and the activation of additional access verification factors.

In some arrangements, a feedback loop module refines the KDF optimization process by analyzing the effectiveness of each adjustment in real time, allowing the GEN-AI model to improve key derivation accuracy based on evolving threats dynamically.

In some arrangements, the GEN-AI model incorporates time-of-day analysis within anomaly detection, identifying unusual access times as a high-risk indicator and adjusting KDF parameters accordingly.

In some arrangements, the GEN-AI model integrates an external cybersecurity threat intelligence feed, periodically updating the KDF settings to reflect emerging global threat patterns and attack techniques.

In some arrangements, the KDF validation module applies a series of cryptographic tests to ensure each generated encryption key meets a preconfigured security threshold, rejecting keys that do not meet these criteria.

In some arrangements, a key usage tracking module records each instance of key generation and use in a secure ledger, allowing auditability and traceability of encryption events for compliance purposes.

In some arrangements, the GEN-AI model dynamically determines the number of required environmental data inputs for the KDF based on the requested data's sensitivity, requiring more inputs for highly sensitive data.

In some arrangements, the KDF is configured to support multiple cryptographic algorithms, allowing the GEN-AI model to select the most robust algorithm based on real-time security assessments.

In some arrangements, a key expiration module automatically invalidates session-specific encryption keys after a predefined time, ensuring keys cannot be reused in unauthorized sessions.

In some arrangements, the GEN-AI model adjusts entropy sources for the KDF based on geographic region, applying stricter KDF parameters for access requests from high-risk regions identified in external threat intelligence feeds.

In some arrangements, the key disposal module records the disposal of each encryption key in an immutable log, confirming key destruction for audit purposes and compliance with data protection standards.

In some arrangements, a method for dynamically optimizing encryption key derivation using generative artificial intelligence (GEN-AI) in a secure multi-cloud data storage environment includes monitoring, in real-time, system behavior, access requests, and environmental context by a GEN-AI model. This model continuously evaluates user interactions, historical access patterns, and environmental conditions to detect potential security risks. The GEN-AI model identifies anomalous or high-risk access attempts based on deviations from established patterns, such as location anomalies, unusual access frequency, and indicators of data sensitivity, which trigger enhanced security protocols in response to detected risks. A key derivation function (KDF) optimization module governed by the GEN-AI model dynamically adjusts KDF parameters based on the assessed risk level of each access attempt, with adjustments that may include increasing KDF iterations, adding cryptographic entropy, modifying hash algorithms, or incorporating additional authentication factors specific to high-risk sessions.

In some arrangements, the KDF optimization module generates a session-specific encryption key using these adjusted KDF parameters, creating a unique key tailored to the real-time security conditions identified by the GEN-AI model. An encryption module applies this session-specific encryption key to encrypt the user-requested data object, discarding the key immediately after encryption to ensure it is not retained. A multi-cloud storage module distributes the encrypted data object across multiple cloud providers in fragmented form, where each fragment is stored independently, rendering the data inaccessible without reconstructing all necessary fragments. The GEN-AI model continuously refines the KDF optimization process through a feedback loop that evaluates the effectiveness of each adjustment, improving threat detection and response capabilities over time.

In some arrangements, the GEN-AI model integrates external cybersecurity threat intelligence data, utilizing known attack patterns, global threat trends, and cybersecurity research to proactively recalibrate KDF parameters. This proactive approach adjusts key complexity and update frequency in response to emerging security challenges. The GEN-AI model incorporates additional entropy sources and environmental factors in the KDF, such as user device type, network attributes, geographic data, and operating system details, ensuring that each encryption key is uniquely derived according to the session's specific conditions. A security alert module within the GEN-AI model triggers immediate adjustments to KDF parameters upon system-wide security alerts, revising entropy inputs, TOTP intervals, and cryptographic hash algorithms in response to the current threat landscape.

In some arrangements, a KDF validation module verifies each session-specific encryption key against predefined security standards, applying cryptographic tests to ensure the key's robustness against brute-force and dictionary attacks. A KDF recalibration module within the GEN-AI model periodically updates the KDF configuration according to evolving threat intelligence, ensuring alignment with best practices in cryptographic resilience and security requirements. A key disposal module discards each session-specific encryption key immediately after use, avoiding retention and preventing unauthorized access to the key in future sessions. A feedback loop module within the GEN-AI model refines the KDF optimization process based on real-time performance evaluations, using feedback from previous access events to improve future key adjustments and enhance security over time.

In some arrangements, a multi-factor authentication (MFA) module requires additional user verification factors when high-risk access attempts are identified, including biometric data, password, and device-specific validation, adding layers of protection against unauthorized access. The KDF optimization module utilizes a dynamic selection of cryptographic algorithms, choosing from SHA-256, HMAC-SHA-512, and PBKDF2, allowing the GEN-AI model to select the most secure algorithm based on real-time assessments. A threat detection module within the GEN-AI model employs machine learning to analyze access patterns, identifying potential insider threats and prompting adjustments to KDF parameters to increase key complexity in response to detected threats. A key usage tracking module records each instance of encryption key generation and use in a secure, immutable ledger, supporting auditability and compliance with data security standards.

In some arrangements, the GEN-AI model adjusts TOTP intervals within the KDF for high-risk sessions, applying shorter intervals to reduce the key's lifespan and limit potential for replay or unauthorized reuse. The GEN-AI model integrates external data sources to identify region-specific threats, applying stricter KDF parameters and entropy sources to requests from high-risk geographic locations flagged in threat intelligence. A key expiration module enforces automatic invalidation of each session-specific encryption key after a predefined period, preventing reuse and enhancing security for time-sensitive data. A key disposal module logs each key disposal in an immutable ledger, confirming key destruction for compliance with data protection regulations and auditing standards. A security alert module notifies administrators upon detecting significant security risks, such as unauthorized access attempts or anomalies, allowing corrective action and security protocol review.

In some arrangements, a system for dynamically optimizing encryption key derivation in a secure data storage environment using GEN-AI includes a GEN-AI model that continuously monitors system behavior, user access patterns, and environmental conditions within the data storage environment. This model evaluates user interactions, session-specific data, and historical access patterns to detect potential security risks. An anomaly detection module within the GEN-AI model identifies unusual or high-risk access attempts based on deviations, such as access location, frequency, or device anomalies, triggering enhanced security protocols. A KDF optimization module controlled by the GEN-AI model dynamically adjusts KDF parameters based on the assessed risk level of each access attempt, with adjustments including increasing KDF iterations, modifying cryptographic algorithms, and adding entropy sources or authentication factors to strengthen the key in high-risk situations. In some arrangements, a session-specific key generation module within the KDF optimization module generates an encryption key based on dynamically adjusted KDF parameters, ensuring that each encryption key is unique to the session. An encryption module applies this session-specific key to a data object, discarding the key immediately post-encryption to prevent unauthorized reuse. A multi-cloud distribution module distributes the encrypted data object across multiple cloud providers, fragmenting it using a cryptographic method, such as Shamir's Secret Sharing or Reed-Solomon coding, and storing each fragment independently to improve security and availability.

In some arrangements, a feedback loop module within the GEN-AI model continuously refines the KDF optimization process by assessing the effectiveness of adjustments, improving key generation accuracy and threat response capabilities over time. A cybersecurity threat intelligence module integrates external threat data, such as attack patterns and global trends, allowing the GEN-AI model to proactively recalibrate KDF parameters in response to emerging threats. An environmental data integration module within the KDF optimization module adds session-specific entropy sources, such as device type, operating system, geographic location, and network attributes, ensuring that each key is uniquely derived for specific access conditions.

In some arrangements, a security alert module within the GEN-AI model triggers immediate KDF adjustments during system-wide security alerts, revising entropy inputs, TOTP intervals, and cryptographic algorithms to adapt to real-time security demands. A KDF validation module validates each session-specific encryption key, applying cryptographic tests to confirm robustness against brute-force and dictionary attacks. A KDF recalibration module within the GEN-AI model periodically updates KDF settings, aligning parameters with evolving cryptographic standards and threat intelligence.

In some arrangements, a key disposal module discards each session-specific encryption key immediately after use, preventing retention and reducing the risk of key compromise in future sessions. An MFA module connected to the GEN-AI model requires additional user verification factors for high-risk access, including biometric data, password, and device validation, enhancing security for sensitive data. A cryptographic algorithm selection module within the KDF optimization module dynamically selects a hashing algorithm, such as SHA-256, HMAC-SHA-512, or PBKDF2, based on session security assessments.

In some arrangements, a behavioral analysis module within the GEN-AI model recognizes patterns of insider threats, where indicators like unusual access times and frequency anomalies trigger increased KDF complexity and additional verification steps. A key usage tracking module logs each key generation and usage in an immutable ledger, providing traceable audit records for compliance. A TOTP adjustment module within the KDF optimization module modifies TOTP intervals for high-risk sessions, applying shorter intervals to mitigate replay attack risks. A region-specific threat response module within the GEN-AI model applies stricter KDF parameters for requests from high-risk locations identified by threat intelligence.

In some arrangements, a key expiration module enforces the automatic invalidation of each session-specific key after a set period, ensuring unusable keys in future sessions. A key disposal logging module records each key disposal in an immutable ledger, supporting compliance with data protection regulations and audit requirements. Lastly, a system administrator alert module within the GEN-AI model notifies administrators of significant security anomalies, including unauthorized access attempts, allowing corrective actions and additional security measures to be implemented.

Overall, in some combined arrangements, a method for secure, adaptive encryption key management, data fragmentation, inter-cloud authentication, and multi-cloud distribution of sensitive data involves receiving a data object for secure storage through a data ingestion module on a user device. The data object contains sensitive information requiring encryption and distribution across multiple cloud providers. A key derivation function (KDF) module, governed by a generative artificial intelligence (GEN-AI) model within a secure processing environment, generates an encryption key based on user-specific credentials, including a biometric identifier, a time-based one-time password (TOTP), and real-time environmental data. The GEN-AI model dynamically adjusts KDF parameters in response to real-time risk assessments by increasing KDF iterations, incorporating additional entropy sources from session-specific data, and modifying cryptographic algorithms as necessary to enhance security for high-risk access attempts.

In some arrangements, the encryption module on the user device encrypts the data object using this dynamically generated encryption key, which is unique to each session and discarded immediately after encryption to prevent retention or unauthorized reuse. A data fragmentation module splits the encrypted data object into multiple data fragments using a cryptographic fragmentation method, such as Shamir's Secret Sharing or Reed-Solomon coding, ensuring each fragment alone is insufficient to reconstruct the original data. A cloud provider selection module selects multiple cloud storage providers based on predefined security and geographic criteria, ensuring that each provider has independent infrastructure and security policies, so no single provider can access all data fragments. The multi-cloud distribution module then distributes these data fragments across the selected cloud providers, transmitting each over a secure channel protected by TLS or HTTPS to maintain data confidentiality and integrity during transfer.

In some arrangements, the user device initiates an access request for a specific data object stored across cloud providers. The request includes user authentication credentials, such as a biometric identifier, a password, and a new TOTP. An identity provider (IdP), connected to the cloud providers, generates an authentication token that integrates the TOTP, a timestamp synchronized with an NTP server, and a cryptographic hash of the biometric identifier, ensuring the token's uniqueness and validity within a predefined time window. A secondary cloud provider validates the authentication token forwarded by a primary cloud provider, verifying that the timestamp aligns with the NTP server, that the TOTP matches the user's secret key, and that the token is unique among recently validated tokens to prevent replay attacks.

In some arrangements, a data retrieval module on the user device retrieves the necessary data fragments from cloud providers upon successful token validation, ensuring each fragment meets integrity requirements before reconstruction. A reconstruction module on the user device reassembles the original encrypted data object from verified fragments using the same cryptographic reassembly method used during fragmentation. The KDF module regenerates the encryption key for decryption by reapplying the KDF with the original biometric identifier, TOTP, and environmental data, allowing secure data access without retaining or transmitting the key. The decryption module on the user device decrypts the reconstructed data object with this regenerated encryption key, discarding the key immediately after use to prevent retention or unauthorized reuse. The GEN-AI model continuously refines KDF parameters based on feedback from previous access events, dynamically improving key derivation accuracy and security over time. Additionally, the GEN-AI model incorporates external cybersecurity threat intelligence, such as attack patterns and regional threat data, proactively recalibrating KDF complexity in response to emerging threats. An audit module records each instance of data access, encryption key generation, and fragment retrieval in a secure, immutable ledger, ensuring a comprehensive audit trail for regulatory compliance and data security verification.

In some arrangements, a system for secure, adaptive encryption key management, data fragmentation, inter-cloud authentication, and multi-cloud data distribution includes a user device configured to initiate encryption and data access requests across a multi-cloud environment. The device collects authentication credentials, such as a biometric identifier, a password, and session-specific environmental data. A generative artificial intelligence (GEN-AI) model continuously monitors system activity, user access patterns, and environmental conditions in the data storage environment, evaluating parameters like user interactions and historical access patterns to detect security threats and dynamically adjust key derivation settings based on assessed risks.

In some arrangements, a key derivation function (KDF) optimization module, controlled by the GEN-AI model, generates a session-specific encryption key using a KDF based on user-specific credentials and environmental data. The GEN-AI model adjusts KDF parameters by increasing iterations for higher security, incorporating session-specific device information, network attributes, and geographic location as entropy sources, and selecting cryptographic algorithms suited to detected security conditions. The encryption module on the user device encrypts data objects using the dynamically generated encryption key, discarding the key immediately after encryption to prevent reuse in future sessions. A data fragmentation module splits the encrypted data object into fragments using cryptographic methods like Shamir's Secret Sharing or Reed-Solomon coding, ensuring that each fragment independently cannot reconstruct the original data.

In some arrangements, a multi-cloud distribution module assigns each data fragment to distinct cloud storage providers based on security criteria, ensuring each provider has infrastructure security, geographic distribution, and compliance standards that prevent any single provider from holding all data fragments required for reconstruction. A secure communication module transmits each fragment to its designated provider over a protected channel using TLS or HTTPS to maintain data integrity and confidentiality. An identity provider (IdP) connected to the user device and cloud providers manages inter-cloud authentication. The IdP generates an authentication token containing the user's TOTP, a hash of the biometric identifier, and a timestamp synchronized with an NTP server. This token is time-sensitive and limited in validity.

In some arrangements, a primary cloud provider forwards the authentication token from the IdP to a secondary provider specified in the access request. The secondary provider validates the token by verifying the timestamp against the NTP server time, matching the TOTP with the user's unique key, and checking for token uniqueness against recently validated tokens to prevent duplicate or replay attacks. The secondary provider's data access control module grants access to requested data fragments upon token validation, denying access if any component fails verification. The data retrieval module on the user device retrieves and verifies necessary fragments from cloud providers, ensuring each meets integrity requirements before reassembly.

In some arrangements, the reconstruction module on the user device reassembles the encrypted data object from verified fragments using the same cryptographic method applied during fragmentation. A key regeneration module within the KDF optimization module regenerates the encryption key for decryption, reapplying the KDF with the same credentials and environmental data used during encryption. The decryption module on the user device decrypts the reassembled data object, discarding the encryption key immediately after use to prevent post-decryption retention. A multi-factor authentication (MFA) module connected to the GEN-AI model requires additional verification factors, including biometric data, password, and device validation for high-risk access attempts, maintaining access control under varying threat conditions.

In some arrangements, a cybersecurity threat intelligence module within the GEN-AI model integrates external threat intelligence, such as attack patterns and regional data, allowing the GEN-AI model to recalibrate KDF complexity in response to threats. A feedback loop module continuously refines KDF optimization based on prior access events, enhancing the security of future key derivations. A monitoring and audit module in the IdP records data access instances, encryption key generation, fragment retrieval, and key disposal in an immutable ledger, ensuring a comprehensive audit trail for compliance and security. A key expiration module automatically invalidates each session-specific encryption key after a predefined period, preventing reuse and securing time-sensitive data. Lastly, a system administrator alert module within the GEN-AI model notifies administrators upon detecting significant security anomalies, allowing for corrective actions and strengthened security.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts the overall system architecture for secure, adaptive encryption key management and multi-cloud data distribution, highlighting core modules and their interactions in managing data encryption and fragmentation. It shows how various components ensure data security, key generation, and access control across cloud providers.

FIG. 2 illustrates the encryption process, showing how a dynamically generated encryption key, based on user authentication factors and environmental data, is used to encrypt data objects before fragmentation and distribution across cloud providers.

FIG. 3 outlines the data fragmentation process, where the encrypted data is split into multiple fragments and assigned to distinct cloud providers, enhancing security by preventing single-provider access to complete data.

FIG. 4 demonstrates the multi-cloud distribution process, depicting the secure transmission of data fragments to various cloud providers using encrypted channels to ensure data integrity and confidentiality during transit.

FIG. 5 describes the inter-cloud authentication process, including the steps of generating and validating an authentication token with timestamp synchronization, ensuring secure access to data distributed across multiple cloud providers.

FIG. 6 presents the timestamp validation and token embedding process, where the identity provider validates timestamp accuracy and embeds it with a TOTP in the authentication token, ensuring tokens are valid only within a specified time window.

FIG. 7 shows the data access control mechanism at the cloud provider level, verifying the authentication token's integrity and granting or denying access based on token validation and multi-factor authentication requirements.

FIG. 8 details the process of data retrieval and reconstruction, in which verified data fragments are combined to reconstruct the original encrypted data object after being retrieved from cloud providers.

FIG. 9 illustrates the key regeneration process, where the key derivation function regenerates the encryption key for decryption using user-specific credentials and environmental data without retaining the key post-access.

FIG. 10 describes the role of the feedback loop in refining the key derivation function parameters, allowing the system to adaptively adjust encryption settings based on detected security threats.

FIG. 11 depicts a sequence diagram for inter-cloud authentication with time-sync verification, outlining the steps from initiating an access request to verifying token integrity and securing data access across cloud providers.

FIG. 12 provides a class diagram for inter-cloud authentication, detailing classes such as IdentityProvider, CloudProvider, and modules for token validation, MFA, and threat detection, illustrating the relationships and functions needed for secure inter-cloud access.

FIG. 13 shows a process for incorporating external threat intelligence, enabling the system to recalibrate key derivation parameters in response to global security trends and detected risks.

FIG. 14 demonstrates the multi-factor authentication (MFA) module's role in enforcing high-security requirements by requiring biometric, password, and device-based verification factors.

FIG. 15 depicts the system administrator alert and monitoring function, highlighting how significant security anomalies are detected and administrators are notified, allowing prompt action for maintaining system security.

DETAILED DESCRIPTION

The inventions collectively present a comprehensive solution for secure, efficient, and adaptive data management across multi-cloud environments. Each invention addresses a specific aspect of data protection, key management, authentication, and artificial intelligence-driven optimization to provide a secure and reliable framework for organizations that store sensitive data in distributed cloud systems. By integrating keyless encryption, data fragmentation, inter-cloud authentication, and AI-driven enhancements, the system provides robust defenses against unauthorized access, data breaches, and evolving cyber threats.

In a first aspect, the Keyless Key Management System using a Deterministic Key Derivation Function (KDF), fundamentally reimagines how encryption keys are managed. Unlike traditional systems that rely on stored encryption keys, this keyless approach generates keys on-the-fly using unique inputs, including biometric data, time-based one-time passwords (TOTPs), and real-time environmental data. This combination of factors ensures that each encryption key is unique to the specific user and session, with no need to store the key itself. The elimination of stored keys enhances security by reducing the risk of key compromise and aligns with a zero-trust approach, ensuring that keys cannot be reused or intercepted.

The keyless nature of this KDF-based system provides a flexible and highly secure framework for data encryption in a multi-cloud environment. Since encryption keys are derived dynamically, the system eliminates traditional risks associated with key storage and transmission. Biometric markers, such as fingerprints or facial recognition, form a secure, user-specific foundation for key generation, ensuring that each key remains unique to the individual accessing the data. By combining biometric markers with a TOTP and real-time environmental data, the KDF guarantees that each encryption key is highly specific to the user's identity, location, and access conditions, making it resistant to unauthorized reproduction.

In another aspect, the Data Fragmentation and Multi-Cloud Distribution System, adds an additional layer of security by fragmenting encrypted data and distributing it across multiple cloud providers. This system splits data into several independent fragments, ensuring that no single fragment contains sufficient information to reconstruct the original data. Cryptographic fragmentation techniques, such as Shamir's Secret Sharing or Reed-Solomon coding, are used to break down the encrypted data into interdependent parts. This method allows data to be securely stored across multiple clouds, with the minimum number of fragments required to reconstruct the data acting as a safeguard against unauthorized access.

The multi-cloud distribution feature of this invention is designed to prevent any single cloud provider from holding all necessary fragments to access the data. Each fragment is stored in a distinct cloud provider, with secure communication protocols protecting data during transit. By decentralizing data storage, the system minimizes the risk of a single point of failure and ensures that a breach at one provider cannot compromise the entire dataset. This approach not only improves data security but also enables redundancy, allowing the system to maintain data availability even if one provider experiences downtime or an outage.

To facilitate secure access across multiple cloud environments, the third invention, Inter-Cloud Authentication with Time-Sync Verification, introduces a synchronized time-based authentication protocol. This system ensures that user authentication requests are securely verified across different cloud providers by incorporating a timestamp synchronized with a Network Time Protocol (NTP) server. Each access request generates an authentication token that includes a TOTP and a timestamp, providing a narrowly defined time window for the token's validity. The time-synchronized nature of this token-based system prevents replay attacks, as expired tokens cannot be reused, and access is granted only when the token aligns with the synchronized timestamps.

The inter-cloud authentication system relies on an identity provider (IdP) that manages authentication requests and token issuance across cloud platforms. By verifying tokens based on precise timestamps and TOTP codes, the IdP ensures that only legitimate, timely requests are processed. When a cloud provider receives an access request, it checks the token's timestamp and verifies the TOTP within a small time tolerance to account for network latency. This synchronization ensures consistent, secure authentication across all cloud providers, allowing for controlled access to distributed data while preventing unauthorized use of expired or intercepted tokens.

In another aspect, GEN-AI Integration for Key Derivation Optimization, leverages artificial intelligence to enhance the security and efficiency of the key derivation process. This system integrates a generative AI model that continuously monitors system behavior, detects security risks, and dynamically adjusts KDF parameters as needed. The GEN-AI system learns from historical data patterns and identifies emerging threats, allowing it to make preemptive adjustments to the KDF based on real-time security assessments. This adaptive approach strengthens the overall security of the encryption process, ensuring that the KDF remains resilient to both known and evolving threats.

Through real-time monitoring, the GEN-AI model identifies suspicious patterns, such as unusual access frequencies or locations, that may indicate potential security breaches. If a potential threat is detected, the AI can increase the complexity of the KDF, adding additional data points or altering cryptographic parameters to reinforce security. This dynamic adjustment capability enables the keyless key management system to adapt to new threats instantly, enhancing resilience and ensuring that encryption keys remain robust under changing conditions. The AI-driven adjustments reduce the system's vulnerability to brute-force and dictionary attacks, as attackers would face a constantly shifting key derivation process.

By integrating these four inventions, the system provides a comprehensive security framework that addresses key challenges in multi-cloud environments. The keyless KDF removes the need for traditional key storage, minimizing exposure to key-related threats, while data fragmentation and multi-cloud distribution protect against breaches by distributing data across independent providers. Inter-cloud authentication with time-sync verification ensures secure, synchronized access across clouds, and GEN-AI integration continuously optimizes the security of the key derivation process, responding proactively to potential threats. Together, these elements create a robust, adaptable solution for securing sensitive data in distributed cloud architectures.

The inventions also align well with regulatory requirements for data security and privacy, particularly those governing sensitive or personally identifiable information (PII). By ensuring that data remains encrypted, fragmented, and accessible only through secure, synchronized authentication, the system provides a compliance-ready framework for organizations that must meet stringent security standards. The combination of biometric-based key generation, dynamic KDF adjustments, and inter-cloud authentication offers a high level of data protection that aligns with data privacy regulations and industry best practices, supporting regulatory compliance without compromising system usability.

Scalability is another core feature of the system, making it suitable for large-scale, enterprise-level applications. Each component is designed to function efficiently across a growing number of users and cloud providers, ensuring that security and performance are maintained as data volumes increase. The GEN-AI model's learning capabilities allow it to adapt to the specific needs of different environments, making the system flexible enough to handle high-frequency access attempts and large data sets without compromising security. This scalability ensures that the system can meet the demands of organizations with extensive, multi-cloud storage requirements.

The inventions together also enhance user experience by allowing seamless, secure access to encrypted data without the typical delays associated with traditional key management and verification processes. The keyless KDF eliminates the need for complex key retrieval procedures, while inter-cloud authentication with time-sync verification simplifies access across cloud platforms. By continuously monitoring and optimizing security in the background, the GEN-AI integration ensures that users benefit from adaptive security without encountering cumbersome authentication steps or processing delays, making the system user-friendly and efficient.

Another significant benefit of the system is its resilience to downtime or disruptions within individual cloud providers. The data fragmentation and multi-cloud distribution system inherently supports redundancy, allowing data to remain accessible even if one cloud provider becomes temporarily unavailable. This built-in failover capability provides consistent data availability and supports disaster recovery by ensuring that data remains secure and accessible under a range of conditions. This redundancy, combined with the adaptive security provided by the GEN-AI, makes the system highly resilient and dependable.

The use of AI to monitor and optimize key derivation provides a cutting-edge approach to security, setting the system apart from traditional encryption frameworks. By proactively identifying vulnerabilities and adjusting KDF parameters, the GEN-AI model offers a level of real-time protection that manual adjustments cannot match. This intelligence-driven approach aligns the system with advanced cybersecurity practices and positions it as a future-proof solution for organizations seeking to protect sensitive information in a rapidly evolving threat landscape.

The system's high degree of customization allows organizations to tailor each component according to their specific security needs. For example, the KDF can incorporate different types of biometric markers or environmental data, while the data fragmentation system can adjust the number and complexity of fragments based on data sensitivity. The inter-cloud authentication system can also be configured with multi-factor authentication (MFA) or other verification measures to meet stringent access control requirements. This flexibility enables organizations to configure the system to address their unique risk profiles and regulatory obligations, making it versatile and widely applicable.

Overall, this multi-faceted invention suite provides an advanced, secure, and scalable solution for organizations managing sensitive data across distributed cloud environments. The integration of keyless encryption, data fragmentation, synchronized authentication, and AI-driven optimization collectively delivers a secure, adaptable framework that mitigates risk at every stage of data storage and access. Each invention complements the others, creating a comprehensive security system that not only protects against current threats but also evolves to meet future challenges, providing a holistic approach to data protection in multi-cloud infrastructures.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 provides an expansive view of a multi-layered, secure encryption and data distribution system across multiple cloud storage environments, focusing on adaptive encryption key management and stringent inter-cloud authentication protocols to protect sensitive data. At the core of this architecture is the user device, which initiates access to the system through a process that combines multi-factor authentication (MFA) and context-specific data to generate encryption keys on demand without retaining them. Layer 1 (102) represents this initial authentication phase, where the system collects authentication credentials from the user, including a biometric identifier, a time-based one-time password (TOTP), and session-specific environmental data such as device orientation, network type, and geographic location. This data is critical in establishing user identity and session context, forming the basis for generating a secure, session-specific encryption key. The MFA module ensures robust authentication by converting the biometric data into a cryptographic hash, which protects the sensitive biometric information from direct exposure while verifying user identity. The TOTP is synchronized with a Network Time Protocol (NTP) server and generated using a user-specific secret key, adding a time-sensitive layer to the authentication process that prevents replay attacks and reinforces security.

Following successful authentication, the system progresses to Layer 2 (104), where the key derivation function (KDF) optimization module, governed by a generative artificial intelligence (GEN-AI) model, dynamically generates an encryption key tailored to the specific session. This KDF module combines the cryptographic hash of the biometric identifier, the TOTP, and session-specific environmental data, generating a unique encryption key for each session. The GEN-AI model continuously monitors risk levels and adjusts KDF parameters in response to detected threats, such as unusual access patterns or heightened security risks. Depending on the situation, the GEN-AI model may increase the KDF iterations, introduce additional entropy sources, or modify cryptographic algorithms to bolster security for high-risk access attempts. Once generated, the encryption key is used to encrypt the data object and then immediately discarded to prevent unauthorized access. This process eliminates the need for persistent key storage, significantly enhancing data security by ensuring that encryption keys are unique to each session and not vulnerable to future compromise.

After the data is encrypted, it moves to Layer 3 (106), where the encrypted data object undergoes fragmentation through the system's data fragmentation module. This module splits the encrypted data into multiple fragments using cryptographic techniques such as Shamir's Secret Sharing or Reed-Solomon coding, methods that allow the data to be divided into portions that individually lack meaningful content. Each data fragment represents only a partial part of the encrypted object, rendering it impossible to reconstruct the original data with access to just one or a few fragments. This approach significantly enhances data security, as unauthorized access to one or more fragments does not compromise the entire dataset. The fragmentation module further assesses the sensitivity of the data to determine the optimal number and size of fragments, increasing the number of fragments for highly sensitive data to ensure maximum security.

In Layer 4 (108), the fragmented data is distributed across multiple cloud storage providers by the multi-cloud distribution module. This module is responsible for selecting cloud providers based on strict security and geographic criteria, ensuring that each provider has distinct infrastructure and security protocols. By distributing fragments across various storage providers, the system ensures no single provider holds all necessary fragments required for data reconstruction, thereby mitigating risks associated with single-point failure and unauthorized access. Each fragment is transmitted over secure communication channels, such as HTTPS or TLS, ensuring data integrity and confidentiality during transfer. The selection process accounts for factors such as compliance standards, geographic distribution, and incident history, strategically diversifying storage locations to enhance data resilience against both cyber threats and regional disruptions.

When a user requests access to the data, the system initiates the retrieval process through Layer 5 (110), which involves inter-cloud authentication managed by an Identity Provider (IdP). The user device sends an access request that includes new authentication credentials—biometric data, a TOTP, and password—which are verified by the IdP. The IdP generates an authentication token containing the cryptographic hash of the biometric identifier, the synchronized TOTP, and a timestamp validated against an NTP server. This token is then transmitted to the primary cloud provider and subsequently forwarded to the secondary provider, where it undergoes independent validation. The timestamp and TOTP within the token are checked for accuracy, and the token is compared against a list of recently validated tokens to prevent replay attacks. The secure authentication process ensures only authorized users gain access, with the data retrieval module retrieving the necessary fragments from multiple providers upon successful token validation.

The reconstruction phase follows, where the data retrieval module collects the necessary data fragments and validates their integrity before reassembly. The reconstruction module on the user device then uses the cryptographic reassembly algorithm, matching the initial fragmentation method, to combine the fragments and restore the encrypted data object. To decrypt the reconstructed data, the system triggers the key regeneration process, in which the KDF is reapplied with the original authentication credentials and environmental data. This ensures that the regenerated encryption key matches the one used initially for encryption, providing secure, session-specific access without retaining or transmitting the key.

The final phase in FIG. 1, represented by Layer 6 (112), enforces strict access controls, secure communication protocols, and logging mechanisms to manage data access and security throughout the session. Each access instance, including encryption key generation, fragment retrieval, and key disposal, is recorded in an immutable ledger maintained by the monitoring and audit module, enabling a traceable audit trail for compliance with regulatory standards. The system's GEN-AI model continuously refines KDF parameters in real-time, integrating threat intelligence data and analyzing prior access events to proactively recalibrate key derivation complexity in response to emerging risks. The multi-factor authentication requirements enforced by the MFA module ensure only verified users can initiate the KDF, while the security policy module dynamically adjusts security measures, enhancing the system's resilience to internal and external threats. FIG. 1 illustrates an advanced, multi-layered approach to secure data management within a multi-cloud environment, utilizing dynamic encryption key derivation, data fragmentation, and inter-cloud authentication to protect sensitive data comprehensively from end to end.

FIG. 2 illustrates a comprehensive and secure method for inter-cloud authentication through time-sync verification across two distinct cloud entities, labeled Cloud A (200) and Cloud B (201). This process begins when a user initiates a login session on a designated cloud storage service, identified here as Cloud Storage Service X (202), to access sensitive data. Upon receiving this login attempt, Cloud Storage Service X immediately triggers an authentication request (204) to its associated Identity Provider (IdP), which serves as the centralized authority for managing user identity and access credentials in this multi-cloud environment. In response, the IdP performs a meticulous sequence of actions to ensure the integrity, accuracy, and security of the authentication process. One of the first steps taken by the IdP involves the generation of a highly precise timestamp, labeled here as "2024-11-06T12:00:00Z" (206). This timestamp not only marks the exact moment the authentication request is processed but also serves as a temporal reference that will be used to validate the request's freshness and legitimacy throughout the entire authentication chain.

The IdP then synchronizes this timestamp with an external Network Time Protocol (NTP) server, adding an additional layer of reliability by confirming that the recorded time aligns accurately with a universally recognized standard (208). This NTP synchronization is crucial in scenarios involving multiple cloud environments, as it ensures that all entities involved operate on a consistent time reference, thereby eliminating discrepancies that could otherwise be targeted for unauthorized access. Once the timestamp is verified and deemed accurate, the IdP proceeds to create a session-specific authentication token (210). This token is a composite security credential that includes not only the user's unique login details but also the verified timestamp, ensuring that the token is inherently tied to this specific session and cannot be easily reused or duplicated in subsequent access attempts. The token's inclusion of the precise timestamp, synchronized with the NTP server, provides a safeguard against potential replay attacks by ensuring that only recent, valid requests are authenticated.

Following the creation of the token, it is transmitted to the second cloud entity, identified here as Cloud Database Service Y (212), which represents the secondary cloud service where the requested data may reside. Cloud Database Service Y, upon receiving the token, conducts its own verification process by comparing the timestamp embedded within the token to its internal system time, labeled here as "2024-11-06T12:00:02Z" (214). This close match in timestamps, differing only by two seconds, demonstrates the high precision maintained within the system, which is typically configured to allow a tolerance window of 1-5 seconds (216). The purpose of this time verification is to ascertain that the authentication token has not been tampered with or delayed beyond a reasonable period, thereby ensuring that the access request is both legitimate and immediate. If the timestamps align within this tolerance, Cloud Database Service Y successfully validates the token, completing the authentication process and granting the user access to the intended resources stored within Cloud Database Service Y.

The secure, time-synchronized flow shown in FIG. 2 exemplifies a robust system designed to address the challenges of multi-cloud authentication by leveraging NTP synchronization to validate the freshness of each request. By embedding synchronized timestamps within the authentication tokens and requiring both primary and secondary cloud services to cross-check these timestamps, the system minimizes the risk of unauthorized access. This framework illustrates a sophisticated balance between security and accessibility, as it allows for seamless user access while maintaining strict safeguards against unauthorized actions. Furthermore, this system highlights the critical role of the Identity Provider as an anchor in the multi-cloud authentication chain, where it not only generates precise, time-bound tokens but also synchronizes them across the interconnected cloud environments, ensuring that each access attempt is authenticated in real-time. This detailed approach ensures that only verified, current, and legitimate requests are granted access, showcasing a highly secure and adaptive mechanism for managing user identities and access rights across multiple cloud platforms.

FIG. 3 illustrates an advanced, secure keyless storage solution for multi-cloud environments, showcasing a detailed multi-layer process that integrates user authentication, adaptive encryption, secure data fragmentation, and distributed storage across multiple cloud providers. Beginning with Layer 1, designated as 302, the process initiates with user authentication at step 304, where the user begins an access request by providing authentication credentials that are meticulously processed to ensure the user's identity. This layer includes data processing activities specifically designed to validate identity, as indicated in 306. Authentication involves a complex process of transforming a biometric identifier, such as a fingerprint, into a cryptographic hash, as illustrated by 311, effectively securing the biometric data by converting it into an unreadable format that protects it from unauthorized exposure or misuse. Additionally, the system generates a time-based one-time password, labeled as 312, which is uniquely bound to the session and synchronizes with external network time sources to create a highly secure, time-sensitive component. These authentication elements, including the biometric hash and the TOTP, are combined to produce a session-specific encryption key, labeled as 314, which is enhanced further by incorporating real-time environmental data such as geographic location, device identifier, IP address, device orientation, and ambient noise level, adding layers of security based on contextual data captured at step 316. The resulting secure identifier at 318 uniquely defines the user session and integrates multi-factor authentication elements, thereby providing robust protection against impersonation and ensuring a secure basis for encryption key generation.

Progressing to Layer 2, labeled as 308, data encryption is performed. Here, the encryption key derived in the previous layer, shown at 310, is dynamically generated for this specific session using a deterministic key derivation function (KDF) based on the authenticated user credentials and real-time factors. This encryption key is unique and strictly session-bound, meaning that it is used exclusively for the current encryption task and is not stored or retained after encryption, ensuring no residual data that could expose vulnerabilities. Following encryption, the system moves to Layer 3, referenced as 320, where the encrypted data undergoes a fragmentation process, designed to split the data into multiple fragments as seen in 322. This fragmentation is achieved through asynchronous processes, labeled as 324, employing cryptographic methods such as Shamir's Secret Sharing or Reed-Solomon coding, which guarantee that each fragment independently contains only part of the encrypted data and lacks the information necessary to reconstruct the original file alone. The fragmentation step, represented by 326, reinforces security by making individual data fragments meaningless without access to other fragments. A specific number of fragments, as determined by a threshold shown at 328, is required for successful data reconstruction, ensuring data redundancy while preventing unauthorized access to complete information.

Layer 4, marked as 330, addresses multi-cloud storage, where the encrypted and fragmented data is distributed across a selection of cloud providers. Each fragment is assigned a unique cloud provider, as depicted by step 334, which ensures that no single provider possesses all fragments necessary for data reconstruction, as further illustrated in 336. This step mitigates risk by spreading the storage load across providers with varying infrastructure, geographic locations, and security policies. To further protect the data in transit, secure communication protocols such as HTTPS or TLS, indicated by 338, are employed to maintain data confidentiality and integrity throughout the distribution phase, preventing interception or tampering during transmission to each provider.

Layer 5, labeled as 342, manages data retrieval and reassembly upon a valid access request. Here, fragments are retrieved from each cloud provider as needed, shown at 344, and reassembled using the same cryptographic reassembly algorithm initially used for fragmentation, represented by step 346. This reassembly process confirms the integrity of each fragment before reconstructing the original encrypted data object. The original encryption key is then regenerated on demand by reapplying the deterministic key derivation function, as shown at 348, using the same user credentials and real-time environmental data initially used during encryption. This regenerated key allows for the decryption of the reconstructed data object, enabling access to the original sensitive information, as completed in 360. Importantly, the encryption key is discarded immediately after decryption, ensuring no retention that could risk unauthorized access.

The final layer, Layer 6, depicted as 354, reinforces secure access control and inter-cloud authentication. This layer is responsible for ensuring that only authorized users can access the data, enforcing strict access controls by verifying the authentication token's timestamp against a synchronized Network Time Protocol (NTP) server to validate its recency. This synchronization process, shown in 352, ensures the token's validity within a predetermined time window, protecting against replay attacks. Multifactor authentication (MFA) requirements, represented by 360, are enforced within this layer, with additional factors such as the TOTP, biometric identifier, and password required to gain access. To secure communication further, each communication channel is encrypted with a protocol selected from HTTPS or TLS, as shown in 362, securing all transmissions across the cloud providers and identity provider. Additionally, this layer includes a robust logging and audit process to record each instance of access, token validation, and data retrieval, creating an immutable audit trail to ensure regulatory compliance and data security verification.

FIG. 4 illustrates a comprehensive system and method for performing secure inter-cloud authentication using a synchronized time-verification process to control access to sensitive data across multiple cloud providers. The depicted system involves several critical steps that prevent unauthorized access and enhance security across a distributed cloud architecture. The process begins when a user initiates an access request from their user device, marked by component 400, to a service hosted on Cloud A, as indicated by the designation 402. This access request is forwarded as an authentication request (404) to a central identity provider (IdP) responsible for managing and verifying authentication across both Cloud A and Cloud B, ensuring cohesive security management across cloud environments. The IdP functions as a central authority for validating user identity and session details by cross-referencing with trusted security parameters.

Upon receiving the authentication request, the IdP initiates the process of generating a timestamp, as shown by element 406, which serves as a precise temporal marker of the exact moment the request was submitted. This timestamp plays a crucial role in time-sensitive validation, as it becomes the basis for ensuring that access requests are recent and have not been intercepted or replayed by malicious actors. To achieve this, the timestamp generated by the IdP is immediately subjected to a time synchronization check, represented by element 408, which verifies the IdP's system time against a reliable external source, such as a Network Time Protocol (NTP) server. This synchronization process is essential for mitigating any time discrepancies that could arise due to variations in system clocks across different providers or potential delays in request transmission. Through this check, the IdP aligns its timestamp with global time standards, thereby adding a robust layer of security that mitigates potential timing-based security risks and ensures that access requests adhere to strict time constraints.

Once the timestamp is successfully verified and synchronized, the IdP proceeds to generate an authentication token, represented by element 410, embedding the verified timestamp within the token to maintain its integrity and time-sensitive nature throughout the authentication process. This authentication token is designed to encapsulate the timestamp alongside additional security data, including a time-based one-time password (TOTP) and cryptographic hash of the user's biometric identifier, to ensure a multifactor security mechanism. The TOTP, generated using a user-specific secret key, provides a dynamically refreshed component to the authentication token, thus strengthening the resistance of the system against replay attacks or attempts at unauthorized reuse of session credentials. The IdP then issues this authentication token to Cloud A, where further validation takes place in step 412. Cloud A performs a validation of the timestamp within the token by comparing it with its own synchronized system clock, ensuring that the request timestamp falls within an acceptable predefined time range, such as within five minutes. This buffer allows for minor tolerances due to network transmission time and processing latency but ensures that access requests remain strictly bound to real-time conditions, confirming that they are legitimate and recent.

Following the validation of the timestamp, Cloud A additionally verifies other components within the authentication token, including the TOTP and the cryptographic hash, as part of a layered security strategy. This token validation process is critical for ensuring that each request has been authenticated under secure and current conditions, thereby safeguarding the access protocol against timing attacks, delayed replays, or unauthorized duplication of tokens. Only upon passing these validation checks does Cloud A proceed to grant or deny access to the requested resources, as shown in step 414. If all token parameters are authenticated successfully, the system permits access to the data on Cloud A or forwards the authentication token to Cloud B for further inter-cloud access, as directed by the request. Should any of these parameters fail to meet validation criteria, access is immediately restricted, maintaining the security integrity of the distributed cloud system and mitigating risks of unauthorized data access.

Through this series of intricate verification and validation steps, FIG. 4 demonstrates a robust system for secure inter-cloud authentication that leverages time-sync verification and multi-factor authentication to safeguard data access across a multi-cloud environment. The depicted methodology incorporates critical security elements, including timestamp synchronization, tokenized access with embedded TOTP and biometric hashes, and a validation mechanism that cross-references token components across cloud providers. This multi-layered approach fortifies the system against timing discrepancies, replay attempts, and unauthorized reuse of tokens, ultimately enhancing data security and resilience in distributed cloud architectures.

FIG. 5 illustrates a comprehensive and secure framework for keyless encryption, data fragmentation, multi-cloud distribution, and key reconstruction. At the outset, step 500 shows the client-side initiation of the encryption process, where a sensitive data object destined for cloud storage is encrypted using a robust encryption algorithm such as AES-256. This encryption step is driven by a uniquely generated encryption key that is created specifically for each individual data object, ensuring maximum security and minimizing any possibility of data leakage. This unique encryption key is generated through a deterministic key derivation function (KDF) such as HMAC-based Extract-and-Expand Key Derivation Function (HKDF) or Password-Based Key Derivation Function 2 (PBKDF2). These KDF methods leverage user-specific information (for instance, a user's ID and password) combined with object-specific identifiers like an object ID or a timestamp, making the key generation process both distinct and unreplicable without the exact parameters. This method also guarantees that the encryption remains specific to each session and object, adding multiple layers of security without retaining the encryption key post-encryption.

Step 502 emphasizes the essence of a keyless key management system by eliminating the need for storing the encryption key, significantly reducing risks associated with potential key theft or mismanagement. In the system, key regeneration relies on reapplying the deterministic KDF process, meaning that each time the key is required for decryption, the exact parameters must be matched to regenerate the original key on demand. This method of keyless encryption is designed to ensure that even if external security parameters are compromised, no stored encryption key can be accessed or misused, enhancing data security across multiple layers.

Following the encryption, step 504 introduces data fragmentation as an essential component of this security framework. Here, the encrypted data object is broken down into distinct fragments using advanced cryptographic methods such as Shamir's Secret Sharing or Reed-Solomon coding. These techniques ensure that each fragment, by itself, holds only a portion of the encrypted data and is insufficient to reconstruct the original data on its own. This fragmentation method transforms the data into independent pieces that are not only securely isolated but also depend on each other for reassembly, thus safeguarding the data against unauthorized access or compromise through isolated fragments. Each fragment contains only partial information, and the system requires the collection of a specific threshold number of fragments to reconstruct the original encrypted data.

In step 506, the fragmented data is then systematically distributed across a series of cloud storage providers through a multi-cloud distribution system. This distribution strategy ensures that no single cloud provider possesses all the fragments needed to reassemble the original encrypted data, thus creating a dispersed data architecture. The selection of cloud providers for each fragment relies on a predefined set of security criteria, and the distribution process transmits each fragment via a secure communication channel protected by protocols like Transport Layer Security (TLS) or HTTPS, ensuring data integrity and confidentiality during transmission. This secure, distributed model mitigates the risk of single-point failure or unauthorized access by distributing responsibility and storing each fragment with a unique cloud provider, which significantly reduces vulnerabilities.

In step 508, the data retrieval process for a requested data object is initiated, requiring the collection of the fragmented pieces from their respective cloud storage providers. The system's data retrieval module verifies the integrity of each fragment as it is received, employing cryptographic hash comparisons to ensure that none of the fragments have been tampered with or corrupted in storage. Once the required fragments have been successfully gathered, the reconstruction module (shown in step 510) uses the original cryptographic reassembly method, such as Shamir's Secret Sharing or Reed-Solomon coding, to accurately reconstruct the original encrypted data object, ensuring that only authentic and authorized fragments are used in the reassembly process.

Following reconstruction, the system must access the encryption key to decrypt the data. However, instead of accessing a stored key, the system employs a secure key regeneration protocol where the encryption key is dynamically regenerated on demand, as seen in step 512. This regeneration process reuses the same deterministic KDF used initially, applying identical user-specific and session-based environmental data inputs such as the user's biometric information, password, and environmental context (like timestamp and device details), which guarantees that only an authenticated user can successfully regenerate the original key. This dynamic, session-specific encryption key is valid only within the current context and is discarded immediately following its use, ensuring the encryption key is never retained post-access and minimizing any risk of unauthorized key access.

To reinforce the security measures further, step 514 integrates multi-factor authentication (MFA) and secure access protocols to authenticate users and validate credentials, leveraging biometric data, secure passwords, and TOTP (time-based one-time password) as part of a multi-factor security layer. Each access attempt is authenticated through secure channels protected by TLS or SSL, thereby protecting the transmission of sensitive information and user credentials. Additionally, key management protocols are implemented to handle user-specific information securely. These protocols apply cryptographic hashing and salting to passwords, secure storage mechanisms for hashed credentials, and allow for robust password reset and recovery procedures without compromising data security. These combined methods ensure data integrity, confidentiality, and protection at every stage, from initial encryption and fragmentation through secure distribution and on-demand key regeneration, delivering a comprehensive and adaptive data security framework across cloud environments.

FIG. 6 illustrates a highly detailed process for secure access that utilizes a multi-layered authentication method involving Time-Based One-Time Password (TOTP), biometric markers, and additional identifiers such as UserID, password, ObjectID, and last saved timestamp, thereby constructing an intricate authentication and encryption framework that prioritizes security. The process begins at step 600, initiating user registration, whereby the system requires users to provide specific biometric data, which could include fingerprints, facial features, or voice patterns-uniquely identifiable characteristics that are highly resistant to replication. This biometric data undergoes a detailed processing phase at 602, where distinct features are extracted and converted into a biometric template or hash value. This template serves as a secured, representative value of the original biometric data, and it is stored alongside the user's account data.

In the following step, labeled 604, the system generates a TOTP secret key, which is not merely a random alphanumeric sequence but is enhanced by combining it with the pre-stored biometric template or hash. A secure cryptographic hash function, such as SHA-256, is applied to this combination, creating a new and enhanced TOTP secret key that strengthens the overall encryption process by adding an additional layer of biometric-specific security. This enhanced key becomes a core component in both the encryption and decryption stages, ensuring that each access attempt is closely tied to the user's unique biological markers.

In the encryption phase, indicated by step 606, the system first retrieves the user's enhanced TOTP secret key, which is tightly bound to their biometrics. Concurrently, it generates a fixed timestamp, which could either derive from the object's metadata or another predetermined source, adding a time-sensitive layer to the encryption scheme. The system then concatenates this timestamp with the enhanced TOTP secret key, resulting in a composite value that serves as the primary input for the key derivation function. This function is designed to incorporate multiple factors for enhanced security, which may include the user's password, ObjectID, and other attributes tied to the specific data object. The derived encryption key from this process is used to secure the data object, effectively binding the encryption to the unique conditions and credentials of the user's session. By incorporating the timestamp, this method inherently limits the validity of the encryption key, aligning access control with temporal constraints that further mitigate unauthorized access.

The decryption phase, as shown in step 608, mirrors the stringent processes established in encryption but adds layers of validation to ensure that only the authenticated user can access the data. To initiate decryption, the system retrieves the stored biometric template or hash value associated with the user's account and prompts the user to present their biometric data again. The newly provided biometric data undergoes processing to extract current feature values, which the system compares against the stored template to verify identity with high precision. Once verified, the system retrieves the enhanced TOTP secret key generated in previous steps. Using the identical cryptographic hash function as during encryption, the system combines the current biometric template or hash with the TOTP, producing the same enhanced key essential for decryption.

As the decryption progresses, the system generates the same fixed timestamp used during encryption, ensuring temporal consistency in the decryption request. This timestamp is then concatenated with the enhanced TOTP secret key, recreating the input parameters needed for the key derivation function. This concatenated value, alongside the user's password, ObjectID, and other factors, undergoes processing within the key derivation function to regenerate the decryption key. This meticulously derived key grants access to the encrypted data object, but only if all conditions match the parameters established during encryption, including the biometric verification, TOTP synchronization, and timestamp validation. Immediately after decryption, the system discards the decryption key without retaining it in memory or storage, thereby preventing any possibility of reuse or unauthorized retrieval of sensitive information. Overall, FIG. 6 meticulously illustrates a robust security protocol that relies on biometric-based TOTP enhancements, secure key derivation processes, and time-constrained encryption to ensure a highly personalized and secure access framework. This design inherently adapts to the specific credentials of the access session, leveraging multiple security measures at each stage to prevent unauthorized access and enforce stringent identity verification. The integration of the enhanced TOTP, timestamp, and user-specific credentials in both encryption and decryption illustrates a complex yet effective approach to safeguarding sensitive data, presenting a layered, adaptive model for secure inter-cloud authentication and data management.

FIG. 7 meticulously illustrates the secure, keyless encryption key management system, detailing each interaction between system components during the encryption, storage, and retrieval processes. This sequence initiates with the user device at step 700, where an access request for encryption is initiated. This request includes authentication credentials such as a biometric marker, a time-based one-time password (TOTP), and session-specific environmental data. Upon receiving these credentials, the request is forwarded to the multi-factor authentication (MFA) module in step 702. The MFA module, central to ensuring secure user verification, processes the biometric marker by converting it into a cryptographic hash. This step secures the sensitive biometric data from exposure, allowing it to be incorporated as a secure component of the overall authentication profile. Alongside, the TOTP is generated using a unique user-specific secret key synchronized with a Network Time Protocol (NTP) server to provide a time-sensitive validation layer that reduces the risk of replay attacks.

Following the authentication process, the system proceeds to validate the environmental data collected from the session in step 704, which ensures that only authorized devices meeting predefined security requirements can continue with encryption key generation. Once validated, the request advances to the Key Derivation Function (KDF) module at step 706. Here, the KDF module combines the cryptographic hash of the biometric identifier, the TOTP, and the environmental data, creating a unique compound hash that becomes the foundation for generating a highly secure, session-specific encryption key. The KDF module then dynamically adjusts its parameters based on risk levels by increasing the number of KDF iterations or incorporating additional entropy sources if the access is classified as high-risk, which provides an additional layer of security.

The KDF-generated encryption key is immediately relayed to the encryption module at step 710, where the data object is encrypted with this key. Notably, once the encryption operation is completed, the key is discarded, ensuring no retention in memory, thereby preventing any future unauthorized access or key reuse. At step 712, the encrypted data is sent to the data fragmentation module, which employs a cryptographic fragmentation method such as Shamir's Secret Sharing or Reed-Solomon coding to divide the data into multiple distinct fragments. This fragmentation process ensures that each data fragment alone is insufficient to reconstruct the original encrypted data, effectively safeguarding against partial data breaches.

The process continues at step 714 with the secure communication module transmitting each encrypted fragment to the multi-cloud distribution module. The secure communication module uses protocols such as TLS or HTTPS to protect each fragment during transit, ensuring data integrity and confidentiality. Once the fragments reach the multi-cloud distribution module, each fragment is assigned to a different cloud provider, as represented in step 716. This strategy of distributing data across separate cloud providers ensures that no single provider holds all the fragments necessary for reconstruction, further enhancing data security by reducing the risk of unauthorized access.

Upon successful storage of the fragments, a confirmation is sent to the user device at step 718, indicating that the encryption and storage phase has been completed. When data retrieval is required, the user device initiates a retrieval request in step 720, prompting the data retrieval module to collect the necessary fragments from the multiple cloud providers at step 722. Before reassembling the data, the retrieved fragments undergo integrity checks to ensure that they remain unaltered and complete. At step 724, these fragments are sent to the reconstruction module, where they are reassembled into the original encrypted data object using the same cryptographic reassembly algorithm used in the fragmentation process.

In step 728, the KDF module regenerates the encryption key on demand by reapplying the original inputs—biometric identifier, TOTP, and environmental data—thus securely recreating the session-specific encryption key without the need for storage or transmission. This regenerated key is provided to the decryption module at step 730, which decrypts the reassembled encrypted data object at step 732. The encryption key is again discarded immediately after use, ensuring it is never retained in memory, thus maintaining a high level of security and preventing unauthorized access.

Throughout this sequence, the automated audit module actively logs each data access, encryption key generation, fragment retrieval, and key disposal event at step 734, creating an immutable audit trail that provides a comprehensive record for regulatory compliance and security verification. Additional components, such as the security policy module, perform routine checks to verify that each data access aligns with the system's strict security policies, which further safeguard data integrity and access control. The data integrity module also runs continuous cryptographic hash checks to validate that each data fragment remains intact and tamper-free. Any anomalies or retrieval failures are flagged, activating the failover protocol to access redundant copies of fragments if necessary, thereby ensuring both availability and security of the data. This comprehensive, highly structured process forms a resilient and adaptive system for managing encryption and access to sensitive data in a multi-cloud environment without storing encryption keys, significantly mitigating risks associated with unauthorized access and enhancing data security at every stage.

FIG. 8 illustrates a highly detailed and intricate class diagram for a secure keyless encryption key management system designed to operate within a multi-cloud storage environment. UserDevice_800 serves as the starting point for the encryption and data access processes. The user device is equipped to initiate secure requests for encryption and access by first gathering essential authentication credentials, which include a biometric identifier unique to the user, a password, and a time-based one-time password (TOTP). Additionally, the device collects real-time environmental data, such as device orientation, network type, and geographic location, to provide an additional security layer, ensuring that only authorized sessions can generate encryption keys. The user device encompasses functions that initiate encryption with initiateEncryption and initiateAccessRequest, establishing secure foundations for subsequent data management activities.

The multi-factor authentication, or MFA module, labeled as MFAModule_802, is directly connected to the user device to enforce multiple layers of user identity verification. This module processes the biometric identifier by converting it into a cryptographic hash, thereby securing the user's sensitive data and preventing direct exposure of the raw biometric information. The MFA module is also responsible for generating the TOTP, which is derived from a unique secret key associated with the user and synchronized with a Network Time Protocol (NTP) server to ensure accuracy and freshness. This TOTP, generated using the generateTOTP method, provides a time-sensitive authentication factor, reinforcing the authentication process. To fully validate user identity, the module cross-verifies environmental data against predefined security criteria, adding an additional safeguard that restricts access to authorized users.

Central to encryption key management within this system is the Key Derivation Function module, or KDFModule_804, which operates in a secure processing environment on the user device. This module dynamically generates an encryption key by combining the cryptographic hash derived from the user's biometric identifier, the TOTP, and environmental data. The KDF module applies methods such as generateEncryptionKey to produce a unique encryption key for each session. The module is capable of adjusting parameters in response to real-time risk levels by increasing iterations or integrating additional entropy sources, ensuring that the key derivation process is tailored to the security demands of each session. Importantly, this module also discards the encryption key immediately after use, meaning the key is neither stored in memory nor retained, eliminating the risk of unauthorized reuse. Once the encryption key is generated, the EncryptionModule_806 uses this key to secure the data object intended for storage. This module ensures that the encryption key is not retained post-encryption by discarding it immediately after the encryption process, enhancing data security by preventing key retention. Following encryption, the system initiates data fragmentation through the DataFragmentationModule_808, which divides the encrypted data object into multiple fragments using a cryptographic fragmentation method, either Shamir's Secret Sharing or Reed-Solomon coding. Each fragment contains only a segment of the encrypted data, rendering each piece insufficient on its own to reconstruct the original data object. This fragmentation process ensures that sensitive information is protected even if one fragment is compromised.

To manage the distribution of these fragmented data objects, the MultiCloudDistributionModule_810 assigns each data fragment to a distinct cloud storage provider, ensuring that no single provider holds all fragments required for reassembly. The selection of cloud providers is based on security criteria, infrastructure stability, and geographic distribution, further safeguarding data integrity. For transmission, the SecureCommunicationModule_812 validates communication channels, securing data fragments during transfer using protocols like TLS or HTTPS, thus maintaining confidentiality and integrity across all inter-cloud communications.

Upon a user's request for data access, the DataRetrievalModule_814 is activated to retrieve the required data fragments from their respective cloud storage providers. The module verifies the integrity of each fragment before proceeding with reassembly to ensure that all fragments remain complete and unaltered. Once the fragments are collected, the ReconstructionModule_816 reassembles the original encrypted data object using the same cryptographic method used during fragmentation, such as Shamir's Secret Sharing or Reed-Solomon coding. The reconstructed data object is then decrypted by the DecryptionModule_818, which utilizes a regenerated encryption key from the KDFModule. As with the encryption process, this regenerated encryption key is discarded immediately after decryption to prevent unauthorized access in future sessions.

System tracking and compliance are handled by the AuditModule_820, which records every instance of data access, encryption key generation, fragment retrieval, and encryption key disposal in a secure and immutable ledger. This audit trail ensures regulatory compliance and provides verifiable records for data security verification. The MFAUpdatingModule_822 is integrated to periodically update the TOTP secret key based on a preconfigured schedule, reinforcing security by ensuring each new encryption key generated remains unique and is protected against replay attacks.

The SecurityPolicyModule_824 enforces multi-factor authentication requirements, validating each access request and ensuring that it includes a compound hash composed of the biometric identifier, TOTP, and password. This module acts as a gatekeeper, requiring complete and successful authentication before the KDF process can generate an encryption key. To ensure data integrity across storage locations, the DataIntegrityModule_826 continuously monitors the availability and condition of each data fragment. This module conducts regular cryptographic integrity checks and, if necessary, initiates a failover protocol to access alternate copies of fragments, thereby maintaining high data availability and security within the multi-cloud environment.

This system is meticulously designed to safeguard sensitive data through adaptive encryption key management, data fragmentation, secure inter-cloud authentication, and compliance-driven multi-cloud distribution, with each module performing critical functions that collectively ensure security, resilience, and regulatory adherence across the storage environment.

FIG. 9 presents an in-depth sequence diagram that showcases the intricate process of secure data fragmentation, encryption, and distribution across multiple cloud storage providers, highlighting the interaction between various modules and the user device to ensure the highest level of data security and controlled access. The sequence initiates with the user device sending a sensitive data object, intended for secure storage, to the Data Ingestion Module, where the object undergoes initial processing. This module is designed to handle sensitive information by assessing the data for encryption requirements and initiating a coordinated process to securely prepare it for storage across multiple cloud providers. Upon receiving the data object, the Data Ingestion Module collaborates with the Key Derivation Function (KDF) Module to generate a unique encryption key specific to this session. This encryption key is dynamically created on demand, derived from user-specific authentication credentials such as a biometric identifier, a time-based one-time password (TOTP), and real-time environmental data, including device or network parameters. These specific parameters are evaluated and combined by the deterministic KDF, which ensures the generated encryption key is unique to the session and highly resistant to unauthorized generation or duplication. Once the key is generated, the Data Ingestion Module communicates this key to the Encryption Module to initiate the encryption of the data object.

The Encryption Module uses this session-specific encryption key to encrypt the data object, which transforms it into a secure, encoded form, ensuring the data cannot be accessed or interpreted without the specific key. To prevent unauthorized key reuse or storage vulnerabilities, the encryption key is immediately discarded after the encryption process is complete, ensuring that no persistent copy of the key exists within memory or storage that could be accessed later. The encrypted data object, now fully secure, is then passed to the Fragmentation Module. This module is responsible for splitting the encrypted object into multiple, smaller fragments based on a cryptographic fragmentation method, such as Shamir's Secret Sharing or Reed-Solomon coding. Each resulting fragment contains only a portion of the original encrypted data, rendering any single fragment insufficient for reconstructing the complete data object, thus adding a strong layer of security by ensuring that data cannot be compromised unless a sufficient number of fragments is obtained.

After the encrypted data has been fragmented, the Cloud Provider Selection Module is engaged to identify and select appropriate cloud storage providers for distributing these fragments. The selection process is guided by predetermined security and compliance criteria, which evaluate factors such as the provider's infrastructure integrity, security certifications, and compliance with data protection regulations. The goal is to ensure that each selected cloud provider meets high-security standards, reducing the risk of a single point of failure or unauthorized access. Once the cloud providers are chosen, each fragment is assigned to a unique provider to further mitigate risks, ensuring that no single provider holds enough fragments to independently reconstruct the encrypted data. The Multi-Cloud Distribution Module is then activated to handle the task of securely distributing each fragment to the designated cloud providers. During this distribution phase, the Secure Communication Module establishes and verifies communication channels between the system and each cloud provider, ensuring that every transmission adheres to stringent data integrity and confidentiality standards through protocols such as TLS or HTTPS. This step is crucial, as it safeguards the data fragments during their transfer to prevent interception or tampering.

Following the successful distribution of the fragments, each cloud storage provider enforces access restrictions on the stored data fragments through the Data Access Control Module. This module requires multi-factor authentication (MFA) for any access attempts, ensuring that only authorized users or systems with valid credentials can request data fragments. With the data securely stored across cloud providers, the Data Integrity Module continuously monitors the availability and condition of each fragment. Periodic cryptographic hash comparisons are performed on each fragment, verifying that none have been altered or compromised, thereby maintaining the integrity of the stored data. If the user device initiates a request for data access, the system engages the Data Retrieval Module to begin the secure retrieval process. The module retrieves the required number of fragments from the multiple cloud providers, verifying the integrity of each fragment to confirm that it remains unchanged and secure.

Once the fragments are collected and verified, the system initiates the reassembly of the original encrypted data object through the Reconstruction Module. This module uses the same cryptographic reassembly algorithm—whether Shamir's Secret Sharing, Reed-Solomon coding, or another advanced method—that was initially applied during fragmentation, ensuring the data is accurately and securely reconstructed. To decrypt the reassembled data object, the system requires the original encryption key. At this point, the KDF Module regenerates the encryption key by reapplying the same deterministic KDF used during initial encryption, with the identical user-specific credentials and environmental data inputs. This key regeneration process is performed on-demand, ensuring the key is only available during the decryption process without the need for persistent storage or transmission.

Finally, the reconstructed encrypted data object is sent to the Decryption Module, where it is decrypted using the regenerated encryption key, allowing the user to access the original data in its readable form. Following decryption, the encryption key is immediately discarded, ensuring that it cannot be retained or accessed in subsequent sessions, thus maintaining an additional layer of security. This complex, multi-step process exemplifies a robust and adaptable approach to data storage, encryption, and access management, providing secure, controlled, and resilient storage across multiple cloud providers through data fragmentation, inter-cloud distribution, strict access protocols, and continuous monitoring of data integrity and availability.

FIG. 10 provides a highly detailed class diagram illustrating a sophisticated system designed to manage secure data fragmentation, encryption, distribution, and retrieval across multiple cloud storage providers in a highly secure and adaptive manner. At the forefront, the DataIngestionModule_1000 is configured to receive and prepare sensitive data objects, processing each item to ensure it is correctly formatted and ready for encryption and secure storage. This module functions as the initial gateway to the system, capturing data and channeling it to other interconnected modules for subsequent processing. Following ingestion, the data object is directed to the KeyDerivationModule_1002, a specialized component tasked with dynamically generating an encryption key. This key generation process is secured by a deterministic key derivation function (KDF), which uniquely combines several user-specific authentication elements including biometric data, a time-based one-time password (TOTP), and environmental data specific to the session in question. The GEN-AI model behind the KeyDerivationModule_1002 continuously evaluates potential risks, dynamically adjusting KDF parameters, such as increasing iterations or introducing additional cryptographic complexity in response to real-time security assessments, ensuring that each encryption key is distinct, tailored to the session, and discarded immediately following use. This keyless approach mitigates risks associated with key retention, reducing the potential for unauthorized access through residual key storage.

The encrypted data then transitions to the EncryptionModule_1004, which secures the data object using the derived encryption key, encrypting it fully while maintaining the principle of transient key usage by disposing of the key immediately post-encryption. This approach ensures that even if the data is intercepted at any point, the encryption key remains unrecoverable. Subsequently, the system transfers the encrypted data object to the FragmentationModule_1006, where it undergoes a cryptographic fragmentation process. This module uses advanced methods like Shamir's Secret Sharing or Reed-Solomon coding to split the encrypted data into multiple, unique fragments, each representing an incomplete part of the whole. Each data fragment lacks sufficient information to independently reconstruct the original data object, enhancing security by making data reconstruction impossible from a single fragment. These data fragments are then evaluated by the SensitivityAssessmentModule_1008, which carefully determines the fragmentation level, adjusting the number and size of the fragments based on the sensitivity of the data. For highly sensitive data, the system generates a larger number of fragments to distribute risk further, ensuring a high-security standard by preventing any single cloud storage provider from obtaining a majority of the fragments required for data reassembly.

The fragmented data is subsequently processed by the CloudProviderSelectionModule_1010, which strategically selects appropriate cloud storage providers from a pool based on pre-configured security criteria. These criteria include each provider's infrastructure integrity, compliance certifications, and historical security record, ensuring that only providers with strong, independent systems are chosen to store the data fragments. Each fragment is distributed by the MultiCloudDistributionModule_1012, which assigns fragments to distinct providers in a randomized sequence, further dispersing risk by ensuring that no single provider holds enough information to reconstruct the data on its own. As these fragments are transmitted, the SecureCommunicationModule_1014 establishes secure, validated communication channels using protocols like TLS or HTTPS, maintaining confidentiality and preventing data interception during the inter-cloud transmission process.

Once stored, the DataAccessControlModule_1016 governs access to the data fragments, implementing multi-factor authentication (MFA) for any system or user attempting to access a fragment, thus preventing unauthorized access to fragmented data components. In parallel, the DataIntegrityModule_1018 continually monitors the status of each stored fragment, conducting periodic integrity checks using cryptographic hashes to verify that no unauthorized modifications have occurred and that all fragments remain accessible. Should any fragment encounter a retrieval issue or become compromised, the FailoverProtocolModule_1020 activates a failover mechanism, retrieving redundant copies of the affected fragment from an alternate cloud provider to maintain data availability and continuity within the system.

When an authorized access request is received, the DataRetrievalModule_1022 retrieves the necessary data fragments from each respective cloud provider, ensuring each fragment meets integrity standards before progressing. These fragments are then processed by the ReconstructionModule_1024, which reassembles the original encrypted data object through the same cryptographic reassembly algorithm used in fragmentation. Only fragments that meet the integrity and verification requirements are included in the reconstruction, ensuring a complete and accurate reassembly of the encrypted data. The reconstructed encrypted data object then moves to the KeyRegenerationModule_1026, which regenerates the session-specific encryption key by reapplying the KDF with the original user-specific inputs, such as biometric data, TOTP, and environmental information. This regenerated key allows secure data decryption without the need for key storage, aligning with the system's core philosophy of keyless encryption management.

The DecryptionModule_1028 uses this regenerated encryption key to decrypt the reassembled data object, and as with previous processes, the key is discarded immediately post-decryption to ensure it is not retained, further reducing the risk of unauthorized access. The LoggingAndAuditModule_1030 serves as the system's compliance and tracking component, documenting each instance of data access, key generation, fragment retrieval, and key disposal in a secure, immutable ledger. This module provides a traceable audit trail for compliance verification, ensuring that the system adheres to regulatory standards and enabling forensic analysis if necessary. The MFAUpdatingModule_1032 supports secure, adaptive access control by periodically updating the TOTP secret key according to a preset schedule, ensuring each session's encryption key remains unique and resistant to replay attacks.

Further security is supported by the SecurityPolicyModule_1034, which enforces MFA requirements for each access attempt, maintaining a high security threshold for user authentication. Meanwhile, the RedundancyManagementModule_1036 creates backup copies of selected data fragments across multiple cloud providers, enhancing data resilience and ensuring fragment availability despite potential disruptions or outages at any single provider. Before the fragments are used in reassembly, the FragmentIntegrityValidationModule_1038 conducts rigorous cryptographic integrity checks on each retrieved fragment, verifying that they meet the predefined standards for integrity and consistency, safeguarding against any data tampering.

The ComplianceAndMonitoringModule_1040 operates as a continuous security and regulatory oversight mechanism, actively monitoring access patterns, data fragment status, and encryption key activity across cloud providers. This module is also configured to alert system administrators to potential security breaches or unauthorized access attempts, ensuring ongoing compliance with data protection regulations and providing proactive alerts for potential security risks. The interconnected modules within FIG. 10 depict a deeply integrated system architecture that leverages adaptive AI-driven optimization, multi-layered security protocols, and real-time monitoring to manage data security across a multi-cloud environment, creating a robust infrastructure capable of responding to emerging threats and preserving the integrity, availability, and confidentiality of sensitive data.

FIG. 11 provides a comprehensive depiction of the secure inter-cloud authentication process with time-synchronized verification designed to facilitate controlled access to data distributed across multiple cloud storage providers. The sequence initiates with the user device generating an access request to retrieve data housed across various cloud environments, specifically targeting data stored in both primary and secondary cloud providers. In response, the user device transmits authentication credentials to the identity provider (IdP). These credentials are composed of three core elements: a biometric identifier, a password, and a time-based one-time password (TOTP) uniquely generated for the user. The TOTP itself is dynamic, recalculated at each session to ensure that only the correct user with the specific session credentials can gain access, thereby heightening security at the initiation point of the request.

Upon receiving these credentials, the IdP undertakes a multi-layered authentication process. The IdP's first task is to generate an authentication token, embedding within it a timestamp that has been synchronized with a Network Time Protocol (NTP) server. This timestamp operates as a critical temporal marker, validating the freshness of the authentication request and safeguarding the process against replay attacks, which are mitigated by ensuring that requests must occur within a specific time window. To strengthen this validation, the IdP verifies the accuracy of the timestamp by comparing the system time against the NTP server time, thus aligning all servers involved with a consistent time reference to avoid discrepancies that might otherwise enable unauthorized access.

Following successful timestamp validation, the IdP incorporates both the TOTP and timestamp into the authentication token. The TOTP is generated using a unique, user-specific secret key, which is regularly refreshed at predetermined intervals to maintain a time-sensitive security layer for the token. The token is then issued to the primary cloud provider, with its content encompassing the user's authentication credentials, the synchronized timestamp, and the TOTP. This token is designed to remain valid only within a defined timeframe, reducing the likelihood of unauthorized reuse. The primary cloud provider subsequently forwards the token to a secondary cloud provider specified in the access request, serving as an intermediary and confirming the user's attempt to access inter-cloud data.

The secondary cloud provider independently verifies the authentication token through several critical steps. First, it checks the timestamp against its own synchronized system time to confirm that the request is both recent and legitimate, aligning this check with the NTP server for uniform time validation. Next, the secondary provider verifies the TOTP embedded within the token, matching it against the expected TOTP calculated using the user's secret key to confirm the authenticity of the request. This dual-verification mechanism, involving both the timestamp and TOTP, adds robustness to the system by confirming the identity of the user through both time-sensitive and user-specific authentication factors.

Once these steps are successfully completed, the secondary cloud provider grants access to the requested data, conditioned upon the validation of the token's components. However, if the token shows any signs of expiration, tampering, or other indications of invalidity, access is promptly restricted. To maintain secure communication, the system implements secure channels facilitated by an inter-cloud communication module. This module links the primary cloud provider, secondary cloud provider, IdP, and user device, ensuring that all data transmitted among these entities is protected by advanced security protocols such as TLS and HTTPS. These secure channels are critical for maintaining data integrity and confidentiality, safeguarding sensitive information as it moves across the cloud providers involved in this authentication workflow.

To support traceability and accountability, a monitoring and audit module records each instance of authentication token generation, validation, and access requests within an immutable ledger. This ledger captures vital details such as the user identity, timestamp, token validity, and access outcome, establishing a thorough audit trail to support regulatory compliance and data security standards. Additionally, the IdP enforces token expiration by setting each token to expire within a predetermined timeframe. Once expired, tokens are rendered invalid, preventing any unauthorized attempts to reuse them and further securing the access process. In cases where minor synchronization discrepancies or network delays result in authentication failure, the IdP automatically generates an updated authentication token with an adjusted timestamp and refreshed TOTP, allowing the user to regain access without compromising security.

The multi-factor authentication (MFA) module within the IdP enhances identity verification by requiring additional authentication factors, including a combination of biometric data, passwords, and device-specific identifiers. This multifaceted approach bolsters security, particularly for high-risk access requests, by ensuring that access is restricted to verified users with authorized devices. The IdP further includes a threat detection module equipped with machine learning algorithms to identify and analyze suspicious patterns or anomalies in access requests. Upon detecting potential security risks, this module triggers automated responses, such as temporarily locking access to affected cloud providers, notifying administrators, and requiring reauthentication to mitigate any possible security threats. This system establishes a robust, adaptive authentication process for secure access across multiple cloud providers, leveraging advanced synchronization, multi-factor authentication, and threat detection to ensure that sensitive data is protected from unauthorized access and potential security vulnerabilities.

FIG. 12 presents a highly detailed class diagram that illustrates the complex and secure inter-cloud authentication system designed to control access to distributed data across multiple cloud storage providers. At the center of this system is the "UserDevice_1200" class, responsible for initiating access requests to various cloud storage providers by gathering and transmitting user authentication credentials. These credentials include essential security components such as a biometric identifier, which is hashed to ensure privacy, a password, and a dynamically generated time-based one-time password (TOTP), each of which plays a critical role in maintaining the integrity and security of the authentication process. Once these credentials are assembled, the UserDevice transmits them securely to the IdentityProvider class (IdP) designated as "IdentityProvider_1202," which is responsible for managing inter-cloud authentication across the different storage providers involved.

The IdentityProvider is a central component that undertakes multiple critical operations, such as receiving the credentials from the user device and processing the biometric identifier by converting it into a cryptographic hash. This hash protects the biometric data from unauthorized exposure, ensuring that even within the system, the raw biometric information remains inaccessible. In addition, the IdentityProvider generates a TOTP using a user-specific secret key that is synchronized with a Network Time Protocol (NTP) server, establishing a reliable time-sensitive component that further validates the freshness and legitimacy of the authentication request. After these processes, the IdentityProvider produces an authentication token that seamlessly integrates the cryptographic hash of the biometric identifier, the TOTP, and a timestamp synchronized with the NTP server to mitigate any potential risks of replay attacks.

Within the IdentityProvider, the "TimestampValidationModule_1204" plays a crucial role in ensuring that the generated timestamp aligns with the time recorded by the NTP server. This validation is done by comparing the token's timestamp against the server time, with a predefined tolerance range to account for minor discrepancies that might arise due to slight network delays or differences between cloud providers. This timestamp validation guarantees that the token is generated within an acceptable time frame, reinforcing the security of each authentication session. Following this, the "TokenEmbeddingModule_1206" securely embeds the TOTP, cryptographic hash, and timestamp within the authentication token, which is uniquely assigned to each session and designed to prevent replay attacks by enforcing a limited validity period. This embedded token structure guarantees that each session remains isolated in terms of its security credentials, reducing the risk of unauthorized access.

The authentication token generated by the IdentityProvider is then directed to the "PrimaryCloudProvider_1208," which acts as an intermediary in validating inter-cloud access requests. The PrimaryCloudProvider forwards the token to the specified secondary cloud provider as requested by the user, enabling cross-cloud verification. In the secondary cloud provider, the "TokenValidationModule_1210" verifies critical elements of the authentication token. This module validates the token's timestamp by ensuring it falls within a predetermined range when compared with the secondary provider's synchronized NTP server time, which confirms that the request is both recent and legitimate. Additionally, the module verifies the TOTP embedded in the token by comparing it with the expected TOTP generated using the user's secret key. The TokenValidationModule also performs a duplication check by cross-referencing the token against a list of recently validated tokens, effectively preventing any replay attempts and ensuring that no token is reused or duplicated inappropriately.

Upon successful validation, the "AccessControlModule_1212" within the secondary cloud provider grants or denies access to the requested data fragments based on the security assessment of the token. This module enforces access restrictions and verifies that all components of the token meet predefined security standards; if any element of the token fails to pass verification, access to the data fragments is denied, preventing unauthorized access to sensitive data. Secure data transmission between the IdentityProvider, PrimaryCloudProvider, and SecondaryCloudProvider is managed by the "InterCloudCommunicationModule_1214," which establishes communication channels protected by industry-standard protocols, such as TLS and HTTPS. This module ensures that all interactions across cloud providers maintain data integrity and confidentiality, adding an additional layer of security to the inter-cloud authentication process.

The "MonitoringAndAuditModule_1216" embedded within the IdentityProvider continuously records each instance of authentication token generation, validation, and access requests in an immutable ledger, ensuring a verifiable audit trail that includes details such as user identity, timestamp, token validity, access outcome, and device details. This meticulous record-keeping aligns the system with regulatory compliance standards and provides an audit trail for post-event analysis. The "TokenExpirationModule_1218" further enhances security by enforcing a strict time-based expiration on each token, ensuring that tokens remain valid only within a limited time frame relative to the session start time and automatically invalidating expired tokens to prevent unauthorized reuse in future sessions.

To handle minor synchronization issues, the "ReissuingModule_1220" within the IdentityProvider can generate an updated token with a refreshed timestamp and TOTP, ensuring that transient network delays do not inadvertently deny legitimate security in access requests. For increased high-risk scenarios, the "MultiFactorAuthenticationModule_1222" enforces additional user verification factors, such as a combination of biometric data, password, and device-based verification. The "DeviceBasedAuthenticationModule_1224," an integral part of this MFA, verifies the unique hardware identifier of the user's device, ensuring that the access request originates from an authorized device registered within the system.

In addition, the "BehavioralAnalysisModule_1226" monitors patterns of user behavior, identifying anomalies such as unusual access frequency or location inconsistencies, which trigger further security protocols to prevent unauthorized access. The system's "ThreatDetectionModule_1228" leverages machine learning to analyze access patterns, dynamically adjusting authentication protocols, modifying token expiration periods, and requiring additional security factors in response to detected risk factors. In case of significant security threats, the "EmergencyResponseModule_1230" disables token issuance for the affected accounts and alerts administrators, enabling immediate intervention.

To mitigate the risks associated with brute-force and token enumeration attacks, the "RateLimitingModule_1232" restricts the number of authentication token requests per user within a set timeframe, ensuring that token requests remain within safe limits. The "TokenNotificationModule_1234" notifies the user device if a new token is issued following synchronization adjustments, prompting the user to reinitiate the authentication process to avoid disruption in access. Lastly, the "ComplianceAndMonitoringModule_1236" provides continuous oversight, evaluating access patterns, token validation events, and generating real-time alerts for administrators in cases of unauthorized access attempts or deviation from expected protocols, ensuring ongoing compliance with data security regulations.

FIG. 13 illustrates a comprehensive sequence for dynamically optimizing encryption key derivation using a Generative Artificial Intelligence (GEN-AI) model in a secure data storage environment. This figure begins with Step 1300, where the process initiates as the user submits an access request to retrieve data stored in a multi-cloud environment. This action prompts the GEN-AI model to begin real-time monitoring at Step 1302, assessing various aspects of system behavior, including user interactions, historical access patterns, and environmental data specific to the session. The GEN-AI model utilizes this information to detect any anomalies or high-risk indicators at Step 1304, comparing current access behavior with established patterns to flag potential security threats. These risks might include unusual access locations, sudden increases in access frequency, or the sensitivity level of the requested data, all of which could signal unauthorized or malicious attempts to access the data.

In response to identified threats, the GEN-AI model triggers the Key Derivation Function (KDF) Optimization Module at Step 1306, directing it to adjust the KDF parameters dynamically based on the assessed risk level. This adjustment may involve increasing the number of KDF iterations to add computational complexity, modifying cryptographic algorithms to use more robust hash functions, or integrating additional entropy sources that reflect unique session attributes, such as device-specific details or network characteristics. These adjustments collectively produce a session-specific encryption key in Step 1308, tailored precisely to the risk profile of the access attempt, ensuring that the key is highly secure and unique to that particular session.

Once generated, the session-specific encryption key is then utilized by the Encryption Module at Step 1310 to encrypt the requested data object securely. The encryption process ensures that the data is protected and inaccessible to unauthorized users. Following encryption, the Secure Storage Module at Step 1312 fragments and distributes the encrypted data object across multiple cloud providers in a multi-cloud storage environment, applying methods such as Shamir's Secret Sharing or Reed-Solomon coding to split the data into secure fragments. Each fragment is then stored with a different cloud provider, enhancing data security by preventing any single provider from holding enough information to reconstruct the original data object independently. This distributed storage approach significantly mitigates the risk of unauthorized access or single-point failures.

Step 1314 illustrates how the GEN-AI model employs a continuous feedback loop to refine the KDF optimization process further. This feedback loop evaluates the efficacy of the applied security adjustments by analyzing their success in preventing unauthorized access or deterring potential security threats. Through ongoing analysis, the GEN-AI model is able to enhance future encryption key derivation by adjusting KDF parameters in real-time, creating a dynamic, adaptive security model that evolves with emerging risks. In Step 1316, the GEN-AI model integrates external cybersecurity threat intelligence, assimilating known attack patterns, global security trends, and recent cybersecurity research. This intelligence enables the model to recalibrate KDF settings proactively in response to changes in the threat landscape, allowing the model to adapt to new forms of attack and to anticipate security challenges before they manifest.

In Step 1318, the KDF parameters are further adapted in response to system-wide security alerts. When such alerts are triggered, the GEN-AI model immediately revises critical aspects of the KDF, including entropy sources, cryptographic hash algorithms, and Time-based One-Time Password (TOTP) intervals, thereby reinforcing the security of the key derivation process in light of current threats. Step 1320 shows the KDF Validation Module rigorously testing each generated session-specific encryption key, conducting cryptographic assessments to ensure that the key meets predefined security standards. These tests confirm the key's resilience against common threats like brute-force and dictionary attacks, guaranteeing that the encryption is sufficiently robust for high-risk environments. Finally, at Step 1322, the key disposal process is completed by the Key Disposal Module, which discards the session-specific encryption key immediately after it has served its purpose. This step ensures that no key is retained in memory or storage, effectively preventing the possibility of key reuse or unauthorized access in future sessions, which further strengthens the system's security framework.

Through this sequence, FIG. 13 comprehensively depicts a dynamically adaptive approach to encryption key derivation, in which the GEN-AI model continuously monitors, evaluates, and adjusts key generation processes in response to evolving security risks. By leveraging both real-time internal monitoring and external threat intelligence, this model provides a highly secure, responsive, and efficient method for protecting sensitive data in a distributed, multi-cloud storage environment. The collaborative operation of each module—from the KDF Optimization and Validation Modules to the Multi-Cloud Distribution and Key Disposal Modules—ensures that each access request is handled with a robust and tailored security approach, offering unparalleled protection against unauthorized access.

FIG. 14 provides an extensive class diagram representation of a system focused on adaptive, secure encryption key derivation managed dynamically through generative artificial intelligence (GEN-AI). At the center of this system is Class 1400, labeled the GEN-AI Model, which operates continuously to monitor system behavior, user access patterns, and environmental conditions. This model utilizes methods such as 'detect_security_risks' to assess threats based on fluctuating parameters, including real-time user interactions, historical access patterns, and variations in environmental data. Through these assessments, the model can identify anomalies, marked by abnormal behaviors in user access, unexpected changes in device type or network origin, and deviations in location. These detected risks trigger automatic adjustments in key derivation complexity to heighten encryption defenses in response to evolving threats.

The KDF Optimization Module, represented as Class 1404, is directly managed by the GEN-AI Model and is central to generating encryption keys that are session-specific and tailored to each access scenario's security requirements. Within this module, methods for adjusting KDF parameters such as increasing cryptographic iterations, incorporating additional entropy sources, and integrating supplementary authentication factors are employed. These adaptations ensure that keys are sufficiently complex for higher-risk sessions, reducing susceptibility to brute-force and replay attacks. Class 1406, the Session-Specific Key Generation Module, works in conjunction with the optimization process, generating encryption keys that are unique to each session. This session-specificity aligns closely with the GEN-AI's adaptive capabilities, as each key reflects the unique security conditions of the access attempt.

Class 1408, the Encryption Module, is tasked with applying the session-specific encryption key to protect data objects. This module implements a strict policy of key non-retention, discarding the encryption key immediately after the encryption process to prevent future unauthorized access. Class 1410, known as the Multi-Cloud Distribution Module, subsequently takes over to divide the encrypted data into fragments and distribute them across multiple cloud storage providers. Each fragment is independently stored, utilizing cryptographic fragmentation algorithms such as Shamir's Secret Sharing and Reed-Solomon coding to ensure that each fragment alone is insufficient for data reconstruction. This distribution strategy minimizes the risk of unauthorized access by preventing any single provider from holding enough fragments to decrypt the data.

To further bolster the system's security, Class 1414, the Cybersecurity Threat Intelligence Module, integrates data from external threat intelligence sources, including emerging attack patterns, global security trends, and newly identified vulnerabilities. This intelligence allows the GEN-AI Model to adjust KDF parameters in advance of potential threats, proactively adapting to safeguard the system. The Environmental Data Integration Module, represented by Class 1416, provides additional session-specific entropy sources within the KDF process, taking into account parameters such as device type, operating system version, geographic location, and network characteristics. These sources ensure that each encryption key is finely tuned to the precise conditions of each access session, thus enhancing security by making it nearly impossible for unauthorized devices to replicate a valid encryption key.

Class 1418, the Security Alert Module, functions within the GEN-AI framework to respond immediately to any system-wide alerts that indicate an ongoing or potential security breach. This module triggers rapid adjustments in KDF settings, such as altering cryptographic hash algorithms, modifying entropy sources, and revising time-based one-time password (TOTP) intervals to fortify the encryption process against imminent threats. The KDF Validation Module, depicted as Class 1420, applies rigorous cryptographic tests to ensure each encryption key meets predefined security standards, particularly assessing resistance to brute-force and dictionary attacks, providing robust protection against unauthorized access attempts.

To maintain updated configurations, the KDF Recalibration Module, identified as Class 1422, periodically updates the KDF settings based on the latest intelligence gathered by the threat intelligence module. These recalibrations are essential to keeping the encryption framework aligned with the latest best practices and regulatory security standards. Class 1424, the Key Disposal Module, is responsible for securely discarding each encryption key after use, following a strict no-retention policy to avoid potential compromises in subsequent sessions. Additionally, the MFA Module, represented as Class 1426, introduces enhanced access control by requiring multiple verification factors, particularly for high-risk access requests, adding layers of authentication through biometric data, passwords, and device-based validation.

The Cryptographic Algorithm Selection Module, Class 1428, dynamically selects appropriate hashing algorithms such as SHA-256, HMAC-SHA-512, or PBKDF2, tailoring each selection to the security needs of the session. This selection process ensures that only the most secure and appropriate algorithm is used under the given security conditions. The Behavioral Analysis Module, Class 1430, specifically identifies potential insider threats by analyzing behavioral patterns such as unusual access times, frequency anomalies, and location discrepancies. Upon detecting these anomalies, the system elevates the KDF complexity and introduces additional verification steps, reinforcing protections against internal vulnerabilities.

Class 1432, the Key Usage Tracking Module, logs every instance of encryption key generation and application, storing these logs in an immutable ledger to meet compliance and auditing requirements. The TOTP Adjustment Module, represented by Class 1434, dynamically shortens TOTP intervals for high-risk sessions, thus minimizing the potential for replay or reuse of encryption keys within short timeframes. Additionally, the Region-Specific Threat Response Module, Class 1436, applies heightened KDF parameters and entropy requirements for access attempts originating from high-risk geographic areas, as identified by threat intelligence data, offering tailored security measures based on location-specific risks.

Class 1438, the Key Expiration Module, ensures the timely invalidation of each encryption key, setting predefined periods after which keys become unusable, thus enhancing protection for time-sensitive data. The Key Disposal Logging Module, depicted as Class 1440, records each instance of key disposal in an immutable ledger, confirming key destruction for audit and regulatory purposes. Finally, Class 1442, the System Administrator Alert Module, proactively alerts administrators in the event of significant security anomalies, such as recurring unauthorized access attempts or abnormal patterns in user activity. This alert system allows administrators to quickly address potential threats, implement corrective actions, and reinforce security protocols as needed. Together, these classes illustrate a comprehensive system designed to adaptively manage encryption key security, fragment and distribute data, and respond dynamically to evolving security threats.

In FIG. 15, the entity relationship diagram illustrates a comprehensive, secure, and adaptive system for managing encryption keys, fragmenting data, authenticating across multiple clouds, and distributing sensitive data in a multi-cloud environment. At the core of this system is the User Device, labeled 1500, which initiates requests for encryption processes and access to distributed data across multiple cloud providers. This device collects critical authentication credentials from the user, including a unique biometric identifier, a password, and real-time environmental data specific to each session. These credentials play an essential role in dynamically generating session-specific encryption keys and managing secure data access across cloud environments. The User Device connects with several other entities, including the Identity Provider, Encryption Module, Data Fragmentation Module, Data Retrieval Module, Reconstruction Module, and Decryption Module, forming an integrated chain for secure data management.

Central to this system's intelligence and adaptive capabilities is the GEN-AI Model, designated as 1502, which continuously monitors and analyzes user access patterns, system activity, and environmental conditions within the data storage environment. The GEN-AI Model evaluates real-time parameters, such as user interactions and historical access patterns, to detect potential security threats and dynamically adjust the key derivation function settings based on assessed risk levels. Connected directly to entities like the KDF Optimization Module, MFA Module, Cybersecurity Threat Intelligence Module, Feedback Loop Module, and System Administrator Alert Module, the GEN-AI Model ensures that all aspects of the system are responsive to varying security needs and threats. Through these connections, the GEN-AI Model enables a real-time, adaptive approach to key management, allowing the system to modify encryption key derivation parameters in response to detected anomalies, security trends, and specific user behaviors.

The KDF Optimization Module, labeled 1504, functions as a critical component in dynamically generating encryption keys. Using a key derivation function based on the collected user credentials and environmental data, this module produces a session-specific encryption key tailored to the security needs of each access session. The GEN-AI Model can dynamically adjust the KDF parameters by increasing iterations for greater security, incorporating additional entropy from session-specific device data, and selecting the most appropriate cryptographic algorithm. This module directly interfaces with the Encryption Module, ensuring that each session generates a unique encryption key, which is then discarded immediately after use, preventing retention and potential misuse in future sessions.

The Encryption Module, identified as 1506, employs the session-specific encryption key generated by the KDF Optimization Module to encrypt the data object requested by the user. Following encryption, the key is immediately discarded to prevent any risk of key reuse or unauthorized access. The encrypted data is subsequently processed by the Data Fragmentation Module, labeled 1508, which divides the encrypted data object into multiple fragments. Using cryptographic fragmentation methods such as Shamir's Secret Sharing or Reed-Solomon coding, each data fragment only contains a portion of the encrypted data, ensuring that no single fragment is sufficient to reconstruct the original data object. This approach enhances data security by distributing these fragments across multiple cloud providers, managed by the Multi-Cloud Distribution Module, labeled 1510, which assigns and transmits fragments to various cloud storage providers based on predefined security criteria. The multi-cloud distribution approach minimizes the risk of unauthorized access, as no single provider holds all fragments required for data reconstruction.

The Secure Communication Module, marked as 1512, facilitates the transmission of these data fragments over protected communication channels to designated cloud providers, ensuring data integrity and confidentiality through protocols like TLS and HTTPS. This module interacts with both the Multi-Cloud Distribution Module and individual cloud providers, ensuring that each fragment reaches its intended location securely. The Identity Provider, identified as 1514, plays a vital role in managing inter-cloud authentication by generating an authentication token based on user credentials. This token includes the TOTP, a cryptographic hash of the biometric identifier, and a timestamp synchronized with an NTP server. The timestamp validation process prevents replay attacks and restricts token validity within a predefined window. Additionally, the Token Embedding Module, labeled 1518, incorporates TOTP, cryptographic hash, and timestamp into the token, ensuring each session's uniqueness and safeguarding against replay attacks. This token is initially received by the Primary Cloud Provider, labeled 1520, which acts as an intermediary, forwarding the token to the designated Secondary Cloud Provider, labeled 1522, specified in the access request.

Within the Secondary Cloud Provider, the Token Validation Module, marked 1526, performs verification by cross-referencing the token with recently validated tokens, preventing replay attacks and duplication. This module ensures that the timestamp falls within the acceptable time window, the TOTP is validated against the user's secret key, and the token is unique to the session. The Data Access Control Module, identified as 1524, grants or denies access to the requested data fragments based on the successful validation of the authentication token, thus preventing unauthorized access. Once validated, the Data Retrieval Module, labeled 1528, retrieves the necessary data fragments from the cloud providers, performing integrity checks to verify that each fragment remains unaltered before reassembly. The Reconstruction Module, identified as 1530, reassembles the original encrypted data object from the verified fragments using the same cryptographic reassembly method that was applied during fragmentation.

The Key Regeneration Module, labeled 1532, regenerates the encryption key required for decryption by reapplying the KDF with the same biometric identifier, TOTP, and environmental data used during encryption, ensuring secure data access without retaining or transmitting the encryption key. The Decryption Module, marked as 1534, decrypts the reassembled data object using the regenerated encryption key, which is discarded immediately after decryption to eliminate retention risks. For high-risk access attempts, the Multi-Factor Authentication Module, identified as 1536, requires additional verification factors, such as biometric data, a user password, and device-based validation, to maintain access control under varying threat conditions. To strengthen the system's adaptability, the Cybersecurity Threat Intelligence Module, labeled 1538, supplies real-time threat intelligence to the GEN-AI Model, allowing it to adjust KDF complexity and security settings in response to emerging threats.

The Feedback Loop Module, marked 1540, supports continuous refinement of the KDF optimization process by analyzing data from past access events, thereby improving the accuracy and security of future key derivations. The Monitoring and Audit Module, labeled 1542, maintains an immutable ledger that records each instance of data access, key generation, fragment retrieval, and key disposal, providing a comprehensive audit trail for regulatory compliance and data security verification. The Key Expiration Module, identified as 1544, automatically invalidates each encryption key after a specified time period, preventing reuse and enhancing time-sensitive data protection. Finally, the System Administrator Alert Module, marked 1546, notifies administrators of significant security anomalies, such as repeated unauthorized access attempts or unusual patterns, enabling immediate corrective actions and enhanced security measures to safeguard sensitive data across the system. This interconnected framework ensures that the system provides a highly secure, adaptive environment for managing encryption keys, fragmenting data, performing inter-cloud authentication, and distributing data across a multi-cloud infrastructure.

Pseudocode exemplars for implementing various aspects of this disclosure are set forth below with explanations for high-level reference.

Keyless Key Management System Using Deterministic Key Derivation Function (KDF): The pseudocode for the keyless key management system begins by gathering three critical types of input data necessary for generating a unique encryption key. These inputs include biometric data (e.g., fingerprint or facial recognition), a time-based one-time password (TOTP), and real-time environmental data (e.g., device location, IP address). The key generation function 'Generate_Encryption_Key' takes these inputs and, using a deterministic key derivation function (KDF), creates a unique encryption key each time it is called. The KDF combines these inputs to produce a key specific to the user, session, and environment, ensuring high security without needing to store the key persistently.

```
FUNCTION Generate_Encryption_Key(user_id, biometric_data, TOTP, env_data)
  biometric_hash=Secure_Hash(biometric_data)
  TOTP_code=Generate_TOTP(user_id)
  env_hash=Secure_Hash(env_data)
  encryption_key=KDF(biometric_hash, TOTP_code, env_hash)
  RETURN encryption_key
END FUNCTION
FUNCTION Generate_TOTP(user_id)
  time=Get_Current_Time( )
  TOTP=Hash(user_id+time)
  RETURN TOTP
END FUNCTION
FUNCTION Secure_Hash(input)
  RETURN SHA256(input)
END FUNCTION
```

In this pseudocode, 'Generate_Encryption_Key' is the main function that performs the key generation. First, it securely hashes the biometric data to produce 'biometric_hash', a unique identifier based on the user's physical traits. Next, 'Generate_TOTP' produces a TOTP based on the user's ID and current time, ensuring that the TOTP is unique and regularly updated. The TOTP provides an added temporal component, meaning the encryption key changes each time it's requested. The environmental data is also hashed, producing 'env_hash', which captures the device's contextual factors and further personalizes the key to the user's access environment.

The function 'Secure_Hash' applies SHA-256 hashing to each input, ensuring data privacy and making it computationally difficult to reverse-engineer the inputs. These hashed values are then input into the KDF, which deterministically combines them into a session-specific encryption key. This approach ensures the encryption key exists only in memory during the access session and is discarded immediately after, offering a high-security alternative to traditional key storage methods. By using a keyless design, this system prevents key exposure risks associated with permanent storage or transmission.

Data Fragmentation and Multi-Cloud Distribution System: The pseudocode for the data fragmentation and multi-cloud distribution system starts by encrypting the data before fragmenting it into multiple, independently stored parts. This fragmentation process is performed through a function like 'Fragment_Data' which employs cryptographic techniques such as Shamir's Secret Sharing or Reed-Solomon coding to ensure that each fragment is distinct and meaningless without other fragments. Only a minimum threshold of fragments is needed to reassemble the original encrypted data, providing redundancy while enhancing security.

```
FUNCTION Secure_Store(data, encryption_key, cloud_providers)
  encrypted_data=Encrypt(data, encryption_key)
  fragments=Fragment_Data(encrypted_data)
  FOR EACH fragment IN fragments
    cloud_provider=Select_Cloud_Provider(cloud_providers)
    Transmit_HTTPS(cloud_provider, fragment)
  END FOR
END FUNCTION
FUNCTION Fragment_Data(encrypted_data)
  RETURN Shamir_Secret_Sharing(encrypted_data, num_fragments, threshold)
END FUNCTION
FUNCTION Select_Cloud_Provider(cloud_providers)
  RETURN Random_Select(cloud_providers)
END FUNCTION
FUNCTION Encrypt(data, encryption_key)
  RETURN AES256_Encrypt(data, encryption_key)
END FUNCTION
```

The 'Secure_Store' function starts by encrypting the data with an AES-256 algorithm to ensure high-level encryption before fragmentation. After encryption, the function calls 'Fragment_Data', which applies the Shamir Secret Sharing technique to split the data into 'num_fragments', specifying that only a certain 'threshold' number of fragments is needed to reconstruct the data. This approach ensures that, even if some fragments are compromised, they are meaningless alone, enhancing data security.

The 'Select_Cloud_Provider' function randomly assigns each fragment to a different cloud provider from the list available in 'cloud_providers'. This random assignment minimizes the risk of storing all fragments on a single provider, reducing the impact of any single provider's failure or breach. Each fragment is securely transmitted via HTTPS using 'Transmit_HTTPS', ensuring secure communication. By separating storage across multiple providers and implementing independent security at each step, the system achieves both high data confidentiality and reliable multi-cloud data distribution.

Inter-Cloud Authentication with Time-Sync Verification: For the inter-cloud authentication system, the pseudocode uses a time-synchronized token that is unique to each access request and verified across multiple cloud providers. The 'Generate_Auth_Token' function creates an authentication token containing both a TOTP and a timestamp synchronized with an NTP server. This time-bound token is then checked for validity by each cloud provider upon access request, ensuring that only timely and authorized requests are granted.

```
FUNCTION Generate_Auth_Token(user_id, cloud_provider)
  timestamp=Get_NTP_Timestamp( )
  TOTP=Generate_TOTP(user_id)
  auth_token=Combine(timestamp, TOTP)
  RETURN auth_token
END FUNCTION
FUNCTION Verify_Auth_Token(auth_token, cloud_provider)
  timestamp, TOTP=Split_Token(auth_token)
  current_timestamp=Get_NTP_Timestamp( )
  IF Abs(current_timestamp timestamp)<=TIME_WINDOW AND Verify_TOTP(user_id, TOTP) THEN
    RETURN True
  ELSE
    RETURN False
  END IF
END FUNCTION
FUNCTION Combine(timestamp, TOTP)
  RETURN Hash(timestamp+TOTP)
END FUNCTION
```

'Generate_Auth_Token' begins by obtaining a precise timestamp from an NTP server using 'Get_NTP_Timestamp'. This timestamp anchors the request to a specific moment, preventing replay attacks. A TOTP, generated for the user and valid for a limited time window, is then combined with the timestamp to create a unique authentication token. The token is hashed to produce a compact, secure identifier.

The 'Verify_Auth_Token' function splits the token to extract the timestamp and TOTP. It then compares the token's timestamp against the current time to ensure it falls within an allowed 'TIME_WINDOW'. This time-based validation, combined with TOTP verification, ensures that access is permitted only for legitimate, time-bound requests, providing a synchronized, secure authentication mechanism across clouds.

GEN-AI Integration for Key Derivation Optimization: The GEN-AI system pseudocode monitors system behavior and dynamically adapts the key derivation function (KDF) parameters based on detected security risks. If an anomaly is identified, the GEN-AI may increase KDF complexity or adjust the types of inputs used, providing real-time adaptation to the threat environment.

```
FUNCTION Adaptive_KDF(user_id, biometric_data,
  TOTP, env_data, GEN_AI_Model)
  biometric_hash=Secure_Hash(biometric_data)
  TOTP_code=Generate_TOTP(user_id)
  env_hash=Secure_Hash(env_data)
  AI_response=GEN_AI_Model.Assess_Risk(user_id,
    env_data)
  IF AI_response=="Increase Complexity" THEN
    encryption_key=KDF(biometric_hash, TOTP_code,
      env_hash, Extra_Params( )
  ELSE
    encryption_key=KDF(biometric_hash, TOTP_code,
      env_hash)
  END IF
  RETURN encryption_key
END FUNCTION
FUNCTION Extra_Params( )
  RETURN Random_Salt( )+Additional_Env_Factors( )
END FUNCTION
FUNCTION Assess_Risk(user_id, env_data)
  activity_patterns=Analyze(user_id, env_data)
  RETURN AI_Model.Decision(activity_patterns)
END FUNCTION
```

In 'Adaptive_KDF', the GEN-AI model, 'GEN_AI_Model', continuously assesses the risk level by analyzing user behavior and environmental data through 'Assess_Risk'. If the AI model identifies an elevated security risk, it instructs the KDF to increase its complexity by incorporating additional factors using 'Extra_Params'. These extra parameters might include random salts or additional environmental inputs, making it more challenging for unauthorized users to derive or predict the encryption key.

'Assess_Risk' evaluates activity patterns and determines if an adaptive response is necessary. If suspicious activity is detected, the AI model's decision-making process automatically triggers a more secure KDF configuration. This real-time adjustment allows the KDF to adapt to emerging threats, maintaining resilience against attacks. The GEN-AI model's learning capability enables it to refine its decisions over time, further enhancing the security and efficiency of the key derivation process.

Together, these four pseudocode implementations offer a sophisticated, integrated system for securing data across multi-cloud environments. The dynamic key generation eliminates key storage, data fragmentation protects sensitive information across multiple clouds, time-synced inter-cloud authentication prevents unauthorized access, and AI-driven adaptations ensure ongoing, proactive security improvements. Each component is optimized for high security, adaptability, and operational efficiency, creating a robust multi-layered defense against evolving cyber threats.

A skilled artisan, upon reviewing the disclosure, will appreciate that there are numerous alternatives, modifications, combinations, and customizations that can be made to the systems and methods described herein.

For example, in considering alternatives, modifications, combinations, and customizations to the systems and methods outlined in this disclosure, several approaches can expand the versatility, functionality, and adaptability of the invention while remaining within its foundational principles and objectives. Each alternative maintains alignment with the core goals of providing a secure, efficient, and scalable keyless multi-cloud storage solution that leverages deterministic key derivation and GEN-AI technology.

First, alternative approaches to user authentication could incorporate additional biometric modalities, such as voice recognition, retina scans, or behavioral biometrics. These could supplement or replace existing authentication methods, enhancing security for cases where higher assurance levels are required. The choice of biometric modality could be dynamically customized based on the sensitivity of the data or the user's specific security profile, creating a tiered or adaptive approach to data access.

Another modification involves the integration of additional key derivation inputs. The deterministic key derivation function (KDF) could incorporate other factors, such as geolocation data or device-specific identifiers. By adding these elements, the KDF becomes contextually sensitive, generating keys only under predefined conditions, thus enhancing security in scenarios where contextual validation is beneficial. This context-aware key derivation approach would reduce the risk of unauthorized access from unfamiliar devices or locations.

The invention's GEN-AI layer, which provides real-time system monitoring, could be further customized to work with machine learning models trained on specific threat patterns unique to different industries. For example, financial services could focus on detecting fraud-related anomalies. By training AI models with industry-specific datasets, the invention can tailor its threat detection and prevention mechanisms to meet sector-specific regulatory and security requirements.

In terms of combinations, the invention's secure multi-cloud storage method could be adapted to work in hybrid environments, where data is stored across both cloud and on-premise locations. In such setups, the system could differentiate between sensitive and less-sensitive data, designating storage on secure on-premise servers for highly confidential information and using multi-cloud storage for less-sensitive data. This combination approach leverages the flexibility of cloud storage while providing additional layers of security for critical information, particularly useful in industries with strict data residency or localization requirements.

Customizations can also be applied to data dispersion techniques. For example, instead of using only Shamir's Secret Sharing or Reed-Solomon coding, the system could allow for user-defined selection among multiple fragmentation methods, like erasure coding or even custom fragmentation algorithms tailored to the data type or use case. Such flexibility would enable users to select the best dispersion method for their specific needs, balancing data resiliency, speed of access, and storage cost.

Additionally, communication protocols between the user, storage providers, and retrieval processes can be modified to integrate with emerging secure communication standards, such as Quantum Key Distribution (QKD). This would bolster the security of data fragment transmission, particularly in high-risk or highly sensitive applications. Implementing QKD alongside traditional encryption protocols in the communication layer could provide an extra layer of security, future-proofing the system against the rise of quantum computing-based threats.

As an alternative customization, the invention's access control system could be enhanced by enabling policy-driven access management. Users could define policies that govern access rights based on user roles, time of day, data type, and other parameters. Such a policy-driven model would ensure that the invention's access control aligns precisely with organizational security policies, especially useful for enterprises that must enforce strict access rules for compliance purposes.

Combining the invention's storage capabilities with backup and disaster recovery solutions offers another modification. For example, fragments stored across cloud providers could be duplicated into geographically separated data centers or cloud regions, creating an additional layer of redundancy. This approach would make the system more resilient to physical disasters or outages at specific cloud providers, ensuring continuity of access and data integrity under various failure scenarios.

The deterministic key derivation function (KDF) could also be modified to support different cryptographic algorithms, allowing the system to adapt to advancements in cryptography and address diverse regulatory requirements. For instance, organizations operating in regions with specific encryption standards could configure the system to use regionally compliant algorithms. This level of customization could support compliance with data protection laws, like GDPR or CCPA, by allowing encryption settings that meet regulatory standards.

An additional customization could allow for interoperability with other keyless authentication technologies, such as hardware-based security tokens or FIDO2-compliant authentication methods. By supporting these, the invention could provide an added layer of security for users who prefer or require hardware-based authentication mechanisms. This flexibility ensures that the invention integrates seamlessly into environments with diverse security policies and user preferences.

The GEN-AI-driven threat detection system could also be modified to include predictive capabilities that anticipate security breaches based on user activity patterns, access anomalies, or known cyber-attack signatures. By incorporating predictive algorithms, the invention could proactively adjust security measures in anticipation of potential threats, enhancing overall resilience to advanced cyberattacks. This modification would be especially useful for organizations that frequently experience targeted attacks or require stringent security protocols.

The invention's data retrieval process could be further adapted to support offline access capabilities. For instance, in cases where continuous internet connectivity is not feasible, the system could cache encrypted fragments on secure, local storage until reconnection, then synchronize any changes with the cloud providers. This would be valuable in environments with intermittent connectivity, such as remote locations or mobile field operations.

A potential alternative to the multi-cloud storage model could involve integration with private cloud networks, especially for organizations with strict data privacy policies. By supporting storage on a private cloud, the invention would appeal to enterprises that require both the flexibility of cloud storage and the exclusivity of private data centers. This option could address privacy concerns for organizations in sectors like government, where data privacy is paramount.

Finally, the invention could be customized to integrate with audit logging and compliance reporting tools, providing organizations with traceable records of data access, encryption key usage, and fragment retrieval processes. Such integration would enable organizations to conduct detailed security audits, ensure compliance with regulatory requirements, and investigate incidents more effectively. This level of transparency would benefit organizations that operate under stringent regulatory oversight or need thorough documentation of their data security practices.

Each of these alternatives, modifications, combinations, and customizations enriches the invention's applicability, extending its capabilities across diverse storage environments and adapting to industry-specific needs. By allowing extensive adaptability, the invention maintains its core principles while providing users with a flexible, scalable, and highly secure keyless storage solution.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for secure data fragmentation and distribution across multiple cloud storage providers, comprising:

receiving, by a data ingestion module, a data object for storage, wherein the data object contains sensitive information requiring encryption and secure distribution; encrypting, by an encryption module, the data object using a dynamically generated encryption key, wherein the encryption key is derived on demand using a deterministic key derivation function (KDF) that combines user-specific authentication factors and real-time environmental data;

splitting, by a fragmentation module, the encrypted data object into a plurality of distinct data fragments, each fragment containing only a portion of the encrypted data object, such that no single fragment is sufficient to reconstruct the original encrypted data, wherein configuring the fragmentation module to determine an optimal number and size of the plurality of data fragments based on the sensitivity of the data object, wherein more sensitive data objects are fragmented into a greater number of fragments for enhanced security; and selecting, by a cloud provider selection module, a plurality of cloud storage providers based on predetermined security criteria, ensuring that each selected cloud provider has distinct infrastructure and policies to prevent single-point failure and unauthorized access, wherein the cloud provider selection module selects cloud providers from different geographic regions to further reduce the risk of localized breaches or access by unauthorized regional entities, wherein each cloud provider is assigned a security rating based on factors including encryption protocols, infrastructure integrity, compliance certifications, and history of security incidents; distributing, by a distribution module, each of the data fragments across the selected cloud storage providers, wherein each of the data fragment is stored with a unique provider to ensure that no single provider has access to all fragments required for reconstruction of the original data object, wherein the distribution module selecting a different cloud provider for each of the data fragment in a randomized order to reduce predictability and potential targeting by malicious actors and wherein each of the data fragment is uniquely encrypted with a fragment-specific encryption key generated by the KDF, such that each of the fragment's encryption key is distinct and not usable for decrypting any other data fragment;

transmitting, by a secure communication module, each of the encrypted data fragment to its designated cloud storage provider over a secure communication channel, wherein the channel is protected by a protocol selected from the group consisting of HTTPS and TLS to ensure data integrity during transmission;

implementing, by a data access control module, access restrictions on each cloud storage provider to ensure that only authorized users or systems can request data fragments, preventing unauthorized access to sensitive data components;

monitoring, by a data integrity module, availability and integrity of each of the encrypted data fragment stored across the cloud providers, wherein the data integrity module performs periodic checks to verify that each of the encrypted fragment remains unaltered and accessible;

retrieving, by a data retrieval module, the required number of data fragments from the multiple cloud storage providers upon receiving a request for data access, ensuring that each retrieved fragment meets integrity requirements prior to reassembly;

reconstructing, by a reconstruction module, the original encrypted data object from retrieved data fragments using a fragment reassembly algorithm, selected from the group consisting of Shamir's Secret Sharing and Reed-Solomon coding, to verify that a sufficient number of fragments is present for accurate reassembly;

regenerating, by the encryption module, the encryption key by reapplying the deterministic KDF with the same user-specific and environmental inputs used during initial encryption, ensuring secure data access without retaining or transmitting the encryption key; and decrypting, by a decryption module, the reconstructed data object using the regenerated encryption key, wherein the encryption key is discarded immediately after decryption to prevent key retention.

2. The method of claim 1, wherein the secure communication module is configured to verify the security of each transmission channel before initiating fragment transfer, using verification protocols selected from the group consisting of SSL and VPNs.

3. The method of claim 2, wherein the data access control module employs multi-factor authentication (MFA) for fragment access requests, requiring users to authenticate with at least two factors selected from the group consisting of password, biometric data, and time-based tokens.

4. The method of claim 3, further comprising logging each instance of data fragment access, retrieval, and deletion by the data access control module in a secure, immutable ledger to provide an audit trail for compliance with data security standards.

5. The method of claim 4, wherein the data integrity module performs integrity checks using cryptographic hashes, ensuring that each data fragment's integrity is maintained and that any fragment tampering is detected.

6. The method of claim 5, wherein the data retrieval module is configured to activate a failover protocol in event of a retrieval failure, wherein an alternate cloud provider is accessed to retrieve redundant copies of missing fragments.

7. The method of claim 6, further comprising the reconstruction module verifying that all fragments retrieved from the cloud providers meet a specified threshold for reassembly, and initiating an alert if any fragment fails verification.

8. The method of claim 7, wherein the reconstruction module reassembles the data object only if all retrieved fragments meet integrity and accessibility criteria, preventing unauthorized or incomplete reassembly.

9. The method of claim 8, wherein the KDF used to regenerate the encryption key for decryption incorporates additional session-based parameters to further secure the regenerated key against unauthorized reuse.

10. The method of claim 9, wherein the KDF dynamically adjusts key derivation parameters based on security sensitivity of the data object, including increasing hash iterations or incorporating additional entropy sources for higher-security data.

11. The method of claim 10, further comprising automatically updating the TOTP secret key within the KDF periodically to ensure temporal security for each new encryption key generated, thereby preventing key reuse across different data sessions.

12. The method of claim 11, wherein the decryption module includes a timeout mechanism, whereby the regenerated encryption key is valid only for a limited time during the decryption process, after which the key is automatically discarded.

13. The method of claim 12, wherein the data retrieval module records each retrieval request in an event log, including user identity, time, and fragment identifiers, to facilitate monitoring and enhance accountability in data access events.

14. A method for secure data fragmentation, encryption, and distribution across multiple cloud storage providers, comprising: receiving, by a data ingestion module, a data object containing sensitive information for storage, wherein the data ingestion module processes the data object to prepare it for encryption and secure distribution across multiple storage environments; generating, by an encryption key derivation module, an encryption key dynamically on demand using a deterministic key derivation function (KDF), wherein the KDF generates the encryption key based on a combination of user-specific authentication factors comprising biometric data, a time-based one-time password (TOTP), and real-time environmental data specific to a data session; encrypting, by an encryption module, the data object using the dynamically generated encryption key, wherein the encryption key is valid only within a predefined time window and is discarded immediately after encryption is completed, ensuring that the encryption key is not stored or retained post-encryption; splitting, by a fragmentation module, the encrypted data object into a plurality of distinct data fragments based on a cryptographic fragmentation method, selected from the group consisting of Shamir's Secret Sharing and Reed-Solomon coding, wherein each data fragment contains only a portion of the encrypted data and no single fragment is sufficient to reconstruct the original data object independently; determining, by a sensitivity assessment module, number and size of the plurality of data fragments required based on a sensitivity level of the data object, wherein data objects with higher sensitivity levels are fragmented into a greater number of fragments to enhance security; selecting, by a cloud provider selection module, a plurality of cloud storage providers based on predefined security criteria, wherein each selected cloud provider has distinct infrastructure, compliance certifications, and security protocols to minimize a risk of single-point failure and unauthorized access, wherein configuring the fragmentation module to determine an optimal number and size of the plurality of data fragments based on the sensitivity of the data object, wherein more sensitive data objects are fragmented into a greater number of fragments for enhanced security; assigning, by the cloud provider selection module, a security rating to each selected cloud provider, wherein the security rating is based on factors including encryption capabilities, incident history, and regional compliance requirements, and selecting providers with diverse ratings for optimal data security distribution, wherein the cloud provider selection module selects cloud providers from different geographic regions to further reduce the risk of localized breaches or access by unauthorized regional entities, wherein each cloud provider is assigned a security rating based on factors including encryption protocols, infrastructure integrity, compliance certifications, and history of security incidents; distributing, by a distribution module, the encrypted data fragments across the selected cloud storage providers in a randomized order, ensuring that each encrypted fragment is stored with a unique provider to reduce predictability and potential targeting by malicious actors, wherein the distribution module selecting a different cloud provider for each of the encrypted data fragment in a randomized order and wherein the each data fragment is uniquely encrypted with a fragment-specific encryption key generated by the KDE, such that each of the fragment's encryption key is distinct and not usable for decrypting any other data fragment; transmitting, by a secure communication module, each of the encrypted data fragment to its designated cloud storage provider over a validated, secure communication channel, wherein the communication channel is protected by a protocol selected from the group consisting of HTTPS and TLS, ensuring data integrity and confidentiality during transmission; implementing, by a data access control module, multi-factor authentication (MFA) for accessing each of the data fragment, requiring users to authenticate using at least two factors selected from a password, biometric data, or time-based token, to prevent unauthorized access to the individual data fragments; logging, by a data audit module, each instance of data fragment access, retrieval, and deletion in an immutable ledger, wherein each log entry records a timestamp, user identity, and specific fragment identifiers to provide a detailed audit trail for compliance with data security standards; monitoring, by a data integrity module, availability and integrity of each of the encrypted data fragment stored across the cloud providers, performing periodic cryptographic hash checks on each fragment to ensure that all fragments remain unaltered and accessible, and initiating an alert if any fragment fails integrity verification; activating, by the data retrieval module, a failover protocol if a retrieval failure occurs, wherein the data retrieval module accesses an alternative cloud provider to obtain a redundant copy of the missing fragment, thereby ensuring high data availability; retrieving, by the data retrieval module, the required number of data fragments from the multiple cloud storage providers upon receiving a data access request, wherein the data retrieval module verifies that each retrieved fragment meets integrity requirements prior to reassembly; reconstructing, by a reconstruction module, the original encrypted data object from the retrieved data fragments using a reassembly algorithm, selected from the group consisting of Shamir's Secret Sharing and Reed-Solomon coding, to verify that a sufficient number of fragments is present for accurate reassembly; regenerating, by the encryption key derivation module, the encryption key on demand using the same KDF and the identical user-specific biometric, TOTP, and environmental inputs used during initial encryption, ensuring secure access to the reconstructed data without storing or transmitting the encryption key; decrypting, by a decryption module, the reconstructed data object with the regenerated encryption key, wherein the encryption key is discarded immediately after decryption to prevent key retention; incorporating, by the KDF module, additional real-time session-specific parameters in the key derivation process, including device orientation, network type, and device model, to further anchor the encryption key to the specific session and device, preventing unauthorized devices from replicating the key; updating, by the KDF module, the TOTP secret key periodically based on a predefined schedule to ensure that each encryption key generated for new data sessions is unique, preventing key reuse and enhancing temporal security; maintaining, by a data availability module, redundant copies of select data fragments across multiple cloud providers to improve data resilience and availability in the event of an outage or service interruption with one provider; enforcing, by a security policy module, a timeout mechanism in the decryption process, wherein the regenerated encryption key is valid only for a limited time during data decryption, after which the key is automatically discarded to prevent reuse or retention beyond the decryption session; and logging, by an event logging module, each data retrieval request, including user identity, timestamp, and fragment identifiers, in a secure event log to facilitate monitoring and enhance accountability in data access events.

15. A system including a processor and a memory for secure data fragmentation, encryption, and distribution across multiple cloud storage providers, comprising: a data ingestion module configured to receive and process a data object containing sensitive information, preparing it for encryption and secure fragmentation prior to multi-cloud storage; an encryption key derivation module configured to dynamically generate an encryption key using a deterministic key derivation function (KDF), wherein the KDF produces an encryption key based on a combination of user-specific factors, including biometric data, a time-based one-time password (TOTP), and real-time environmental data, such that the encryption key is unique to each session and not retained after encryption; an encryption module configured to encrypt the data object using the encryption key derived by the KDF, wherein the encryption module does not store or retain the encryption key post-encryption, ensuring enhanced security and reducing risk of unauthorized key access; a fragmentation module operatively connected to the encryption module, configured to split the encrypted data object into a plurality of data fragments using a cryptographic fragmentation method selected from the group consisting of Shamir's Secret Sharing and Reed-Solomon coding, wherein each data fragment contains only a portion of the encrypted data object, making it insufficient by itself to reconstruct the original encrypted data; a sensitivity assessment module operatively connected to the fragmentation module, configured to determine number and size of data fragments based on a sensitivity level of the data object, wherein data objects identified as highly sensitive are fragmented into a larger number of fragments to enhance security; a cloud provider selection module configured to select a plurality of cloud storage providers based on predefined security criteria, wherein the criteria include each provider's infrastructure integrity, security protocols, regional compliance certifications, and historical incident rates, reducing the risk of a single-point failure; a multi-cloud distribution module configured to assign and transmit each data fragment to a distinct cloud storage provider in a randomized order, ensuring that no single provider holds all fragments required to reconstruct the data object, and mitigating the risk of unauthorized access by fragmenting data across independent storage environments; a secure communication module configured to transmit each data fragment to its designated cloud storage provider over a validated communication channel, wherein the channel is protected by a secure transmission protocol selected from the group consisting of TLS and HTTPS, ensuring data integrity and confidentiality during inter-cloud data transfer; a data access control module configured to enforce access restrictions for each data fragment stored across cloud providers, wherein multi-factor authentication (MFA) is required for any user or system attempting to access a data fragment, preventing unauthorized access to the fragmented data components; a data integrity module configured to monitor availability and integrity of each data fragment stored with cloud providers, wherein the data integrity module performs periodic checks using cryptographic hash comparisons to verify that each fragment remains unaltered and accessible; a failover protocol module within the data integrity module, configured to initiate an alternative retrieval process in event of a fragment retrieval failure, accessing a redundant copy of the fragment from an alternate cloud provider to ensure high data availability; a data retrieval module configured to retrieve the required number of data fragments from the multiple cloud storage providers upon a request for data access, wherein the module verifies the integrity of each fragment prior to reconstruction to confirm that all fragments are complete and unmodified; a reconstruction module operatively connected to the data retrieval module, configured to reassemble the original encrypted data object from the verified fragments using the same cryptographic reassembly algorithm utilized in fragmentation, ensuring that only authorized and unaltered fragments are used for accurate data reconstruction; a key regeneration module operatively connected to the KDF module, configured to regenerate the encryption key required for decryption by reapplying the KDF with the identical biometric data, TOTP, and environmental inputs used in the initial encryption process, ensuring secure data access without storing or transmitting the encryption key; a decryption module operatively connected to the key regeneration module, configured to decrypt the reconstructed data object using the regenerated encryption key, wherein the encryption key is discarded immediately after use to prevent retention in memory or unauthorized reuse; a logging and audit module configured to record each instance of data fragment access, retrieval, encryption key generation, and disposal, storing these records in a secure, immutable ledger to maintain a verifiable audit trail that meets data security and regulatory compliance standards; a MFA updating module configured to periodically update the TOTP secret key according to a predefined schedule, ensuring that each subsequent encryption key is uniquely derived and preventing key reuse or replay attacks; a security policy module configured to enforce multi-factor authentication (MFA) requirements for initial data access requests and fragment access attempts, wherein each access request must include two or more authentication factors selected from the group consisting of biometric data, password, and time-based token, ensuring strong authentication across the system; a redundancy management module within the data integrity module, configured to replicate select data fragments across multiple cloud providers, thereby maintaining data availability and access in the event of outages or disruptions at a single provider, supporting robust fault tolerance within the multi-cloud environment; a fragment integrity validation module within the data retrieval module, configured to conduct cryptographic integrity checks on each retrieved fragment, confirming that all fragments meet the predefined integrity requirements before they are used in data reassembly; and a compliance and monitoring module configured to provide continuous oversight of access patterns, data fragment availability, and encryption key usage across cloud providers, wherein the module generates alerts upon detecting unauthorized access attempts or deviations from expected security protocols, ensuring ongoing system compliance with data security regulations and best practices.

* * * * *